(12) United States Patent
Takahashi et al.

(10) Patent No.: US 11,573,517 B2
(45) Date of Patent: Feb. 7, 2023

(54) IMAGE READING APPARATUS FOR READING IMAGE FORMED ON SHEET AND IMAGE FORMING SYSTEM INCLUDING IMAGE READING APPARATUS

(71) Applicant: CANON KABUSHIKI KAISHA, Tokyo (JP)

(72) Inventors: Hidekazu Takahashi, Chiba (JP); Taichi Furuya, Kanagawa (JP); Naoki Kamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/318,029

(22) Filed: May 12, 2021

(65) Prior Publication Data

US 2021/0364971 A1 Nov. 25, 2021

(30) Foreign Application Priority Data

May 20, 2020 (JP) .............................. JP2020-088244

(51) Int. Cl.
*G03G 15/00* (2006.01)
*B65H 33/04* (2006.01)

(52) U.S. Cl.
CPC ......... *G03G 15/6538* (2013.01); *B65H 33/04* (2013.01); *B65H 2557/25* (2013.01)

(58) Field of Classification Search
CPC . G03G 15/6538; B65H 33/04; B65H 2557/25
See application file for complete search history.

(56) References Cited

U.S. PATENT DOCUMENTS

| 5,777,633 A | * | 7/1998 | Ejiri | ................... H04N 1/32689 |
| | | | | 347/3 |
| 9,594,059 B1 | * | 3/2017 | Brady | .................. G01N 29/225 |
| 2009/0001819 A1 | * | 1/2009 | Kondo | ................. B41J 2/04548 |
| | | | | 307/116 |

(Continued)

FOREIGN PATENT DOCUMENTS

| EP | 2054778 A1 | 6/2009 |
| JP | 2018-126868 A | 8/2018 |

OTHER PUBLICATIONS

Search Report dated Sep. 1, 2021, in European Patent Application No. 21173832.3.

*Primary Examiner* — David H Banh
(74) *Attorney, Agent, or Firm* — Venable LLP

(57) ABSTRACT

An image reading apparatus connectable to a post-processing apparatus includes an image reading unit for transmitting image data to an inspection processing unit, and a communication unit for outputting a sheet discharge timing signal to the post-processing apparatus through a signal line. The communication unit outputs the sheet discharge timing signal having different waveforms to the post-processing apparatus on the basis of an inspection result of a sheet obtained from the inspection processing unit such that the sheet discharge timing signal includes a first waveform when the sheet determined by the inspection processing unit as that there is no image abnormality is discharged and such that the sheet discharge timing signal includes a second waveform different from the first waveform when the sheet determined by the inspection processing unit as that the image abnormality occurs is discharged.

15 Claims, 33 Drawing Sheets

(56) References Cited

U.S. PATENT DOCUMENTS

| | | | |
|---|---|---|---|
| 2011/0187790 A1* | 8/2011 | Yoshida | B41J 2/165 |
| | | | 347/30 |
| 2013/0257945 A1* | 10/2013 | Shinkawa | B41J 2/04596 |
| | | | 347/10 |
| 2014/0042686 A1 | 2/2014 | Konishi et al. | |
| 2014/0374375 A1* | 12/2014 | Zwiers | B41J 2/16544 |
| | | | 118/712 |
| 2015/0077463 A1* | 3/2015 | Hosokawa | B41J 2/14274 |
| | | | 347/19 |
| 2015/0210503 A1* | 7/2015 | Osada | B65H 37/04 |
| | | | 270/58.08 |
| 2016/0246554 A1* | 8/2016 | Yasuda | G06F 3/1292 |
| 2016/0279929 A1* | 9/2016 | Shinkawa | B41J 2/2142 |
| 2020/0361210 A1* | 11/2020 | Sato | G06N 20/00 |

* cited by examiner

DISCRIMINATING METHOD (a) INSPECTION: OK (FNL SGNL)

(b) INSPECTION: NG (FNL SGNL)

| PATTERN | INSPCTN RSLT | PST-PRCS RSLT |
|---|---|---|
| 1 | OK | SHT ACMDTNG PRCS |
| 2 | NG | ESCP DSCHRG PRCS |

IMAGE READING APPARATUS FOR READING IMAGE FORMED ON SHEET AND IMAGE FORMING SYSTEM INCLUDING IMAGE READING APPARATUS

FIELD OF THE INVENTION AND RELATED ART

The present invention relates to an image reading apparatus for reading an image on a sheet in order to inspect the image, and an image forming system including an image receiving apparatus.

Conventionally, an image forming system in which in-line bookbinding is carried out by a combination of an image forming apparatus and a post-processing apparatus has been known. In such a system, between the image forming apparatus and the post-processing apparatus, a relay apparatus is provided (U.S. Patent Application Publication No. US2014/0042686 A1). The relay apparatus carries out serial communication with the image forming apparatus and parallel communication with the post-processing apparatus. Further, the relay apparatus outputs a bundle (set) separation signal other than a sheet (paper) discharge signal in synchronism with the sheet discharge signal of a final sheet of a bundle (set) of the prints outputted by the image forming apparatus.

The relay apparatus disclosed in US2014/0042686 A1 outputs the sheet discharge signal and the bundle separation signal to the post-processing apparatus by the parallel communication. For that reason, there is a need to provide a signal line for outputting the bundle separation signal separately from a signal line for outputting the sheet discharge signal.

Incidentally, in order to inspect a quality of an output object, an image forming system having an inspection function of performing a inspection processing in which an image formed by an image forming unit is read by using an image sensor and the read image is compared with a reference image has been known. In such a system, in order to change an operation of the post-processing apparatus in accordance with an inspection result, there is a need to notify the post-processing apparatus of the inspection result from the image forming apparatus. However, in the case of the constitution in which the signals are outputted to the post-processing apparatus by the parallel communication as in US2014/0042686 A1, ports for receiving the signal lines for notifying the post-processing apparatus of the inspection result have to be additionally provided. For this reason, in the in-like constitution, a degree of freedom of combination of apparatuses (device) lowers.

SUMMARY OF THE INVENTION

According to an aspect of the present invention, there is provided an image reading apparatus connectable to a post-processing apparatus, comprising: an image reading unit configured to read an image on a sheet conveyed from an image forming unit and configured to transmit image data corresponding to the read image to an inspection processing unit so as to inspect the image formed on the sheet by the image forming unit; and a communication unit configured to output a discharge timing signal, indicating timing when the sheet is discharged to the post-processing apparatus, to the post-processing apparatus through a signal line, wherein the communication unit is configured to output the discharge timing signal having different waveforms to the post-processing apparatus on the basis of an inspection result of the sheet obtained from the inspection processing unit such that the discharge timing signal includes a first waveform in a case that the sheet determined by the inspection processing unit as that there is no image abnormality is discharged and such that the discharge timing signal includes a second waveform different from the first waveform in a case that the sheet determined by the inspection processing unit as that the image abnormality occurs is discharged.

Further features of the present invention will become apparent from the following description of exemplary embodiments with reference to the attached drawings.

Figure 5:
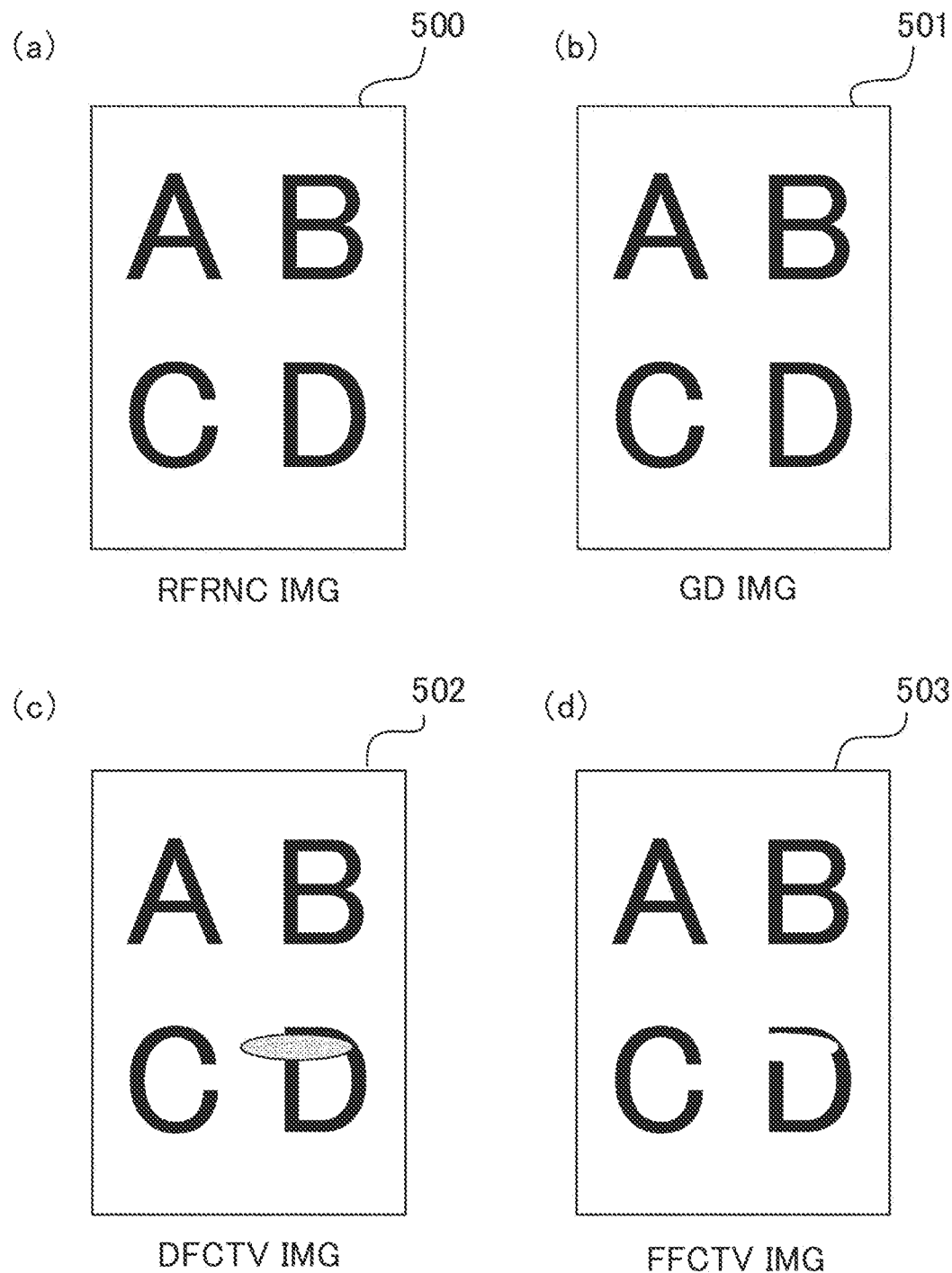

Parts (a) to (d) of FIG. 5 are schematic views, in which part (a) shows a reference image in the embodiment, part (b) shows a good image which coincides with the reference image, part (c) shows a defective image with a contaminant, and part (d) shows a defective image with lack of the image.

Figure 6:
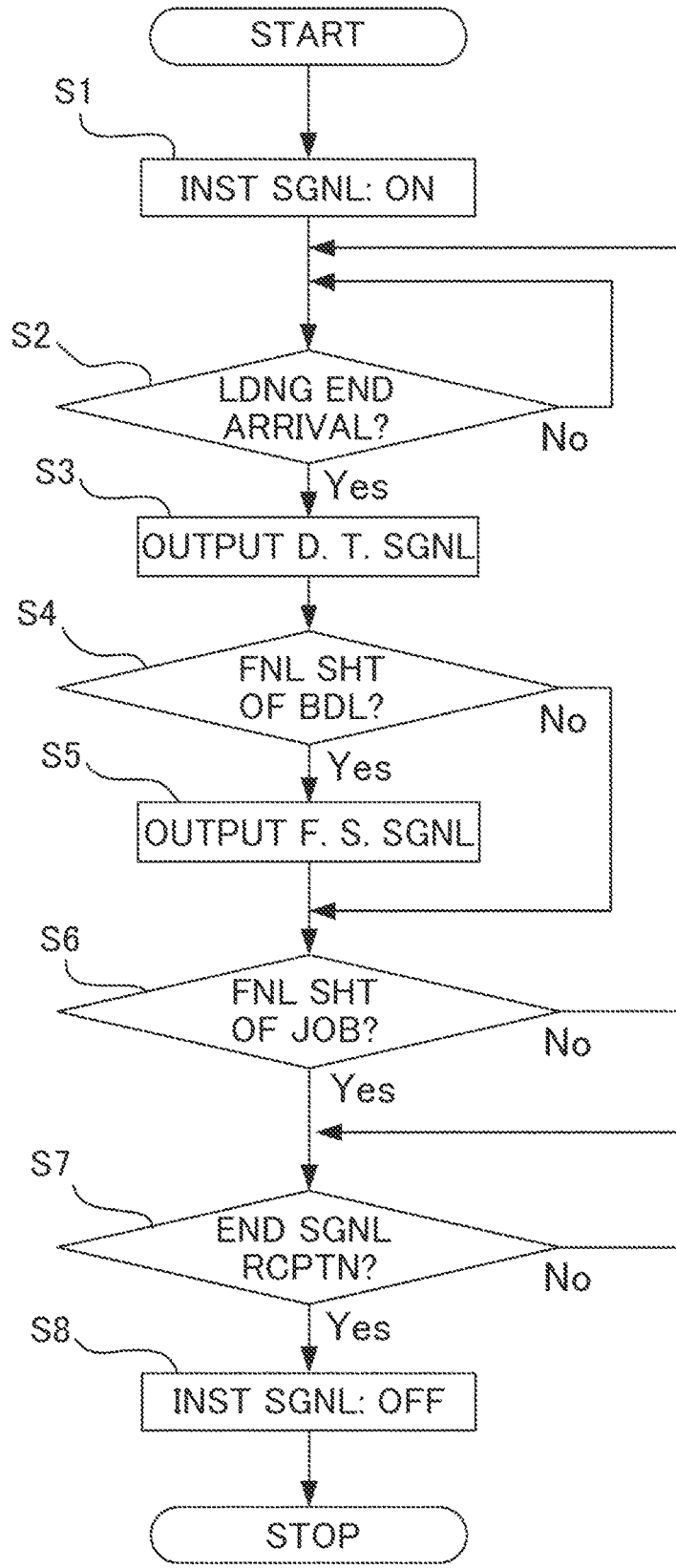

FIG. 6 is a flowchart showing an operation relating to transmission and reception of signals of an image forming apparatus.

Figure 7:
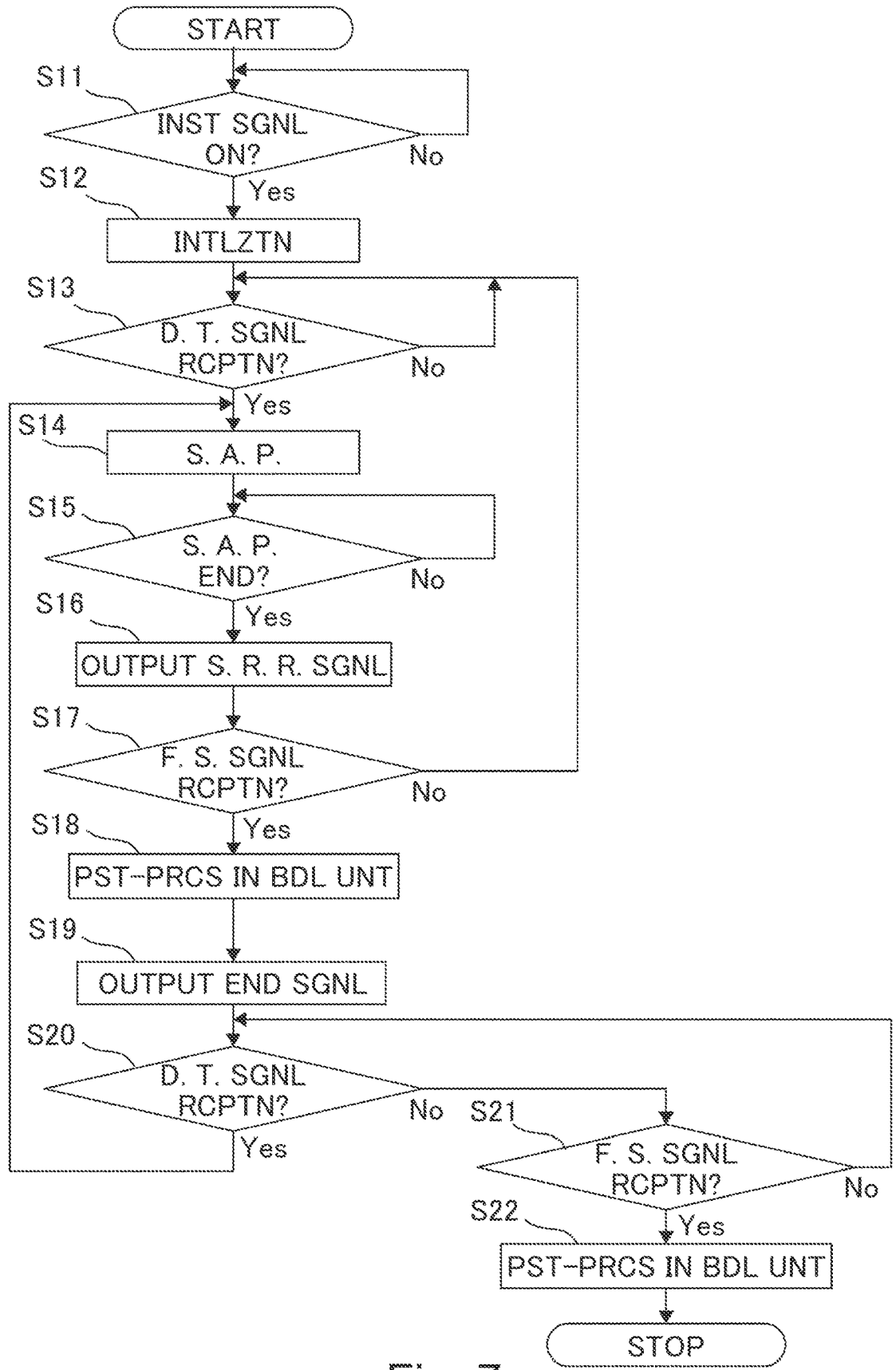

FIG. 7 is a flowchart showing an operation relating to transmission and reception of signals of a sheet processing apparatus.

Figure 8:
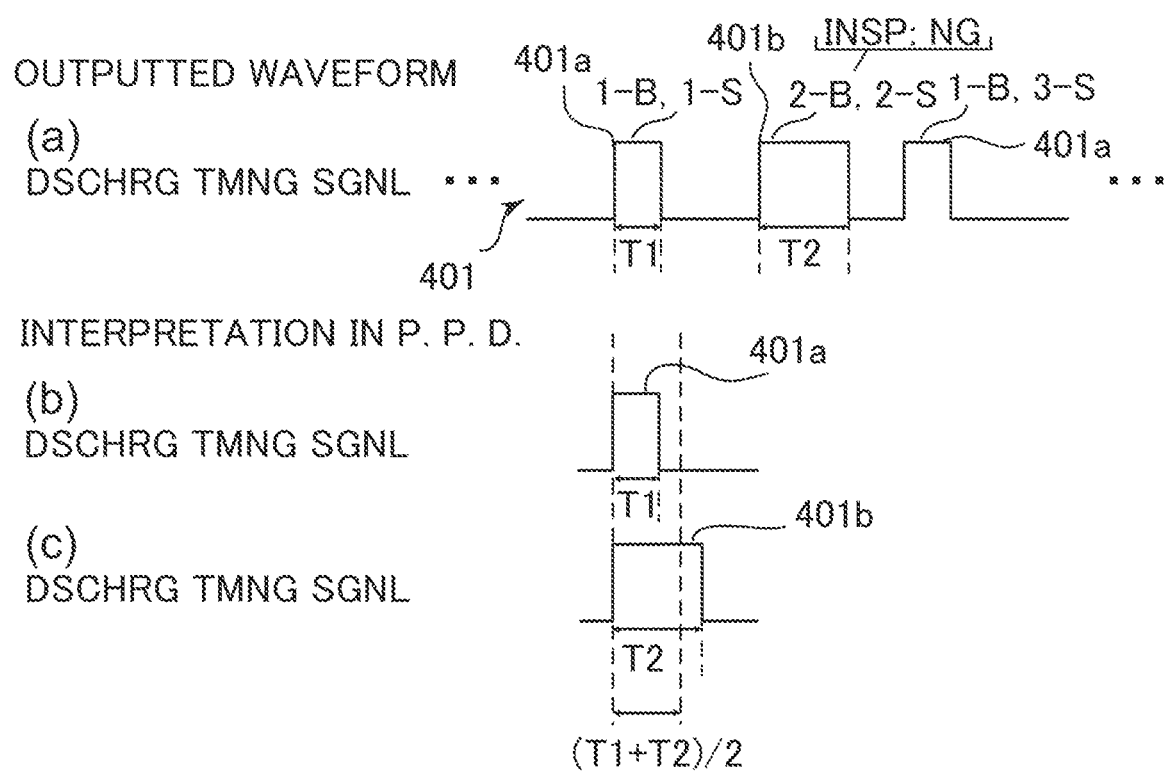

Parts (a) to (c) of FIG. 8 are timing charts showing waveforms of discharge timing signals, in which part (a) shows the discharge timing signal outputted from the image forming apparatus, part (b) shows the discharge timing signal with a pulse width T1, and part (c) shows the discharge timing signal with a pulse width T2.

Figure 9:
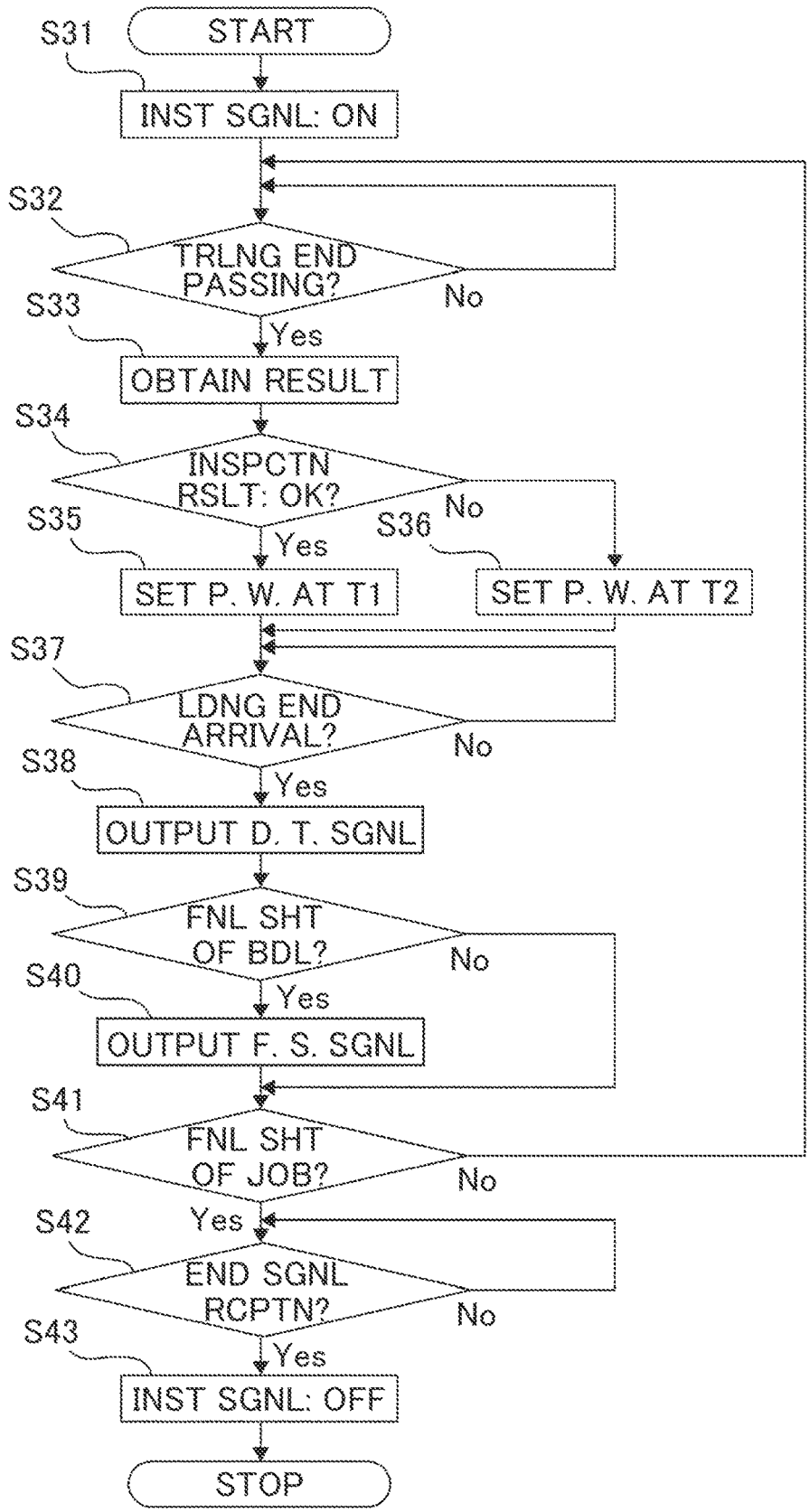

FIG. 9 is a flowchart showing an operation relating to transmission and reception of signals of the image forming apparatus when inspection processing is performed.

Figure 10:
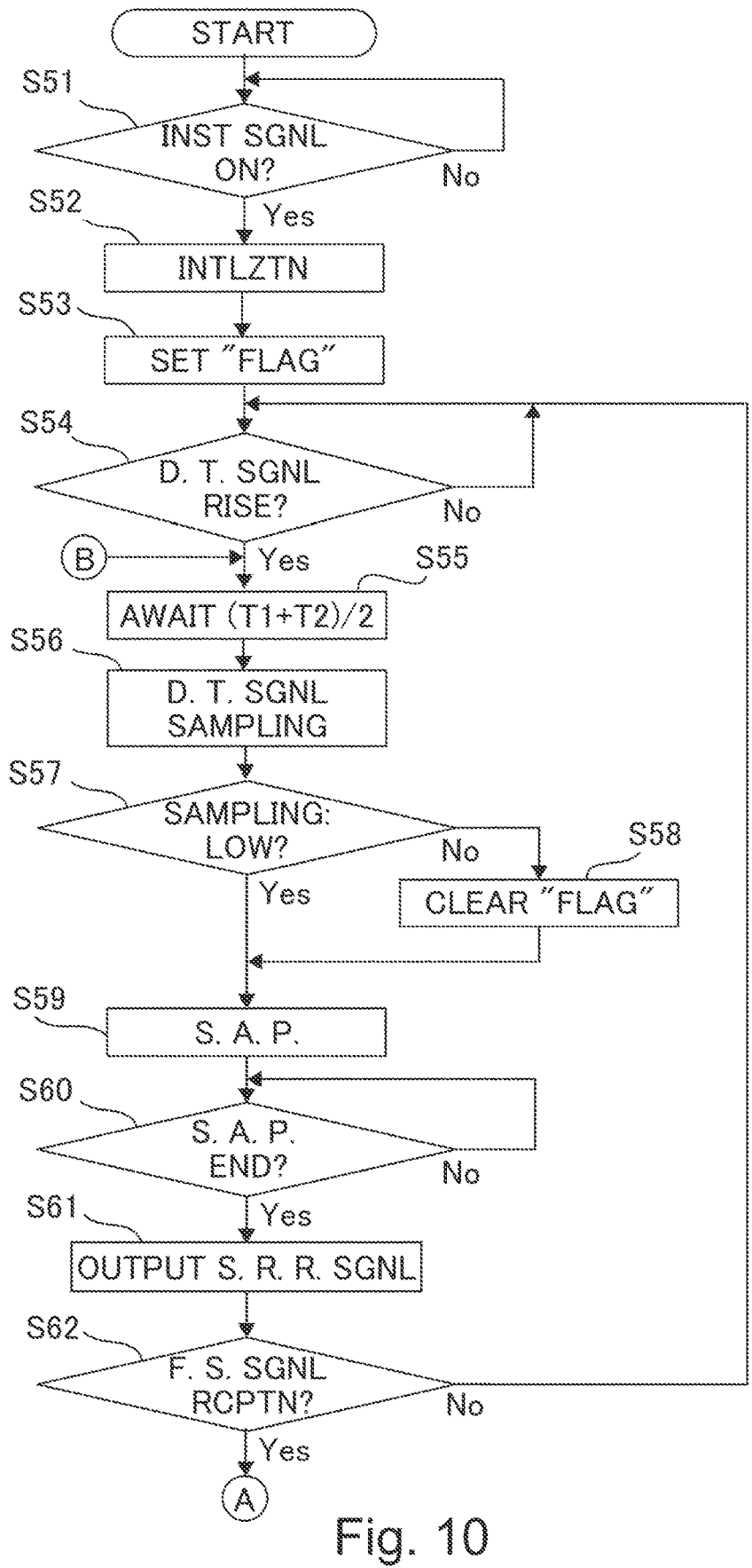

FIG. 10 is a flowchart showing a sorting processing of products in a bundle (set) voltage on the basis of the discharge timing signal.

Figure 11:
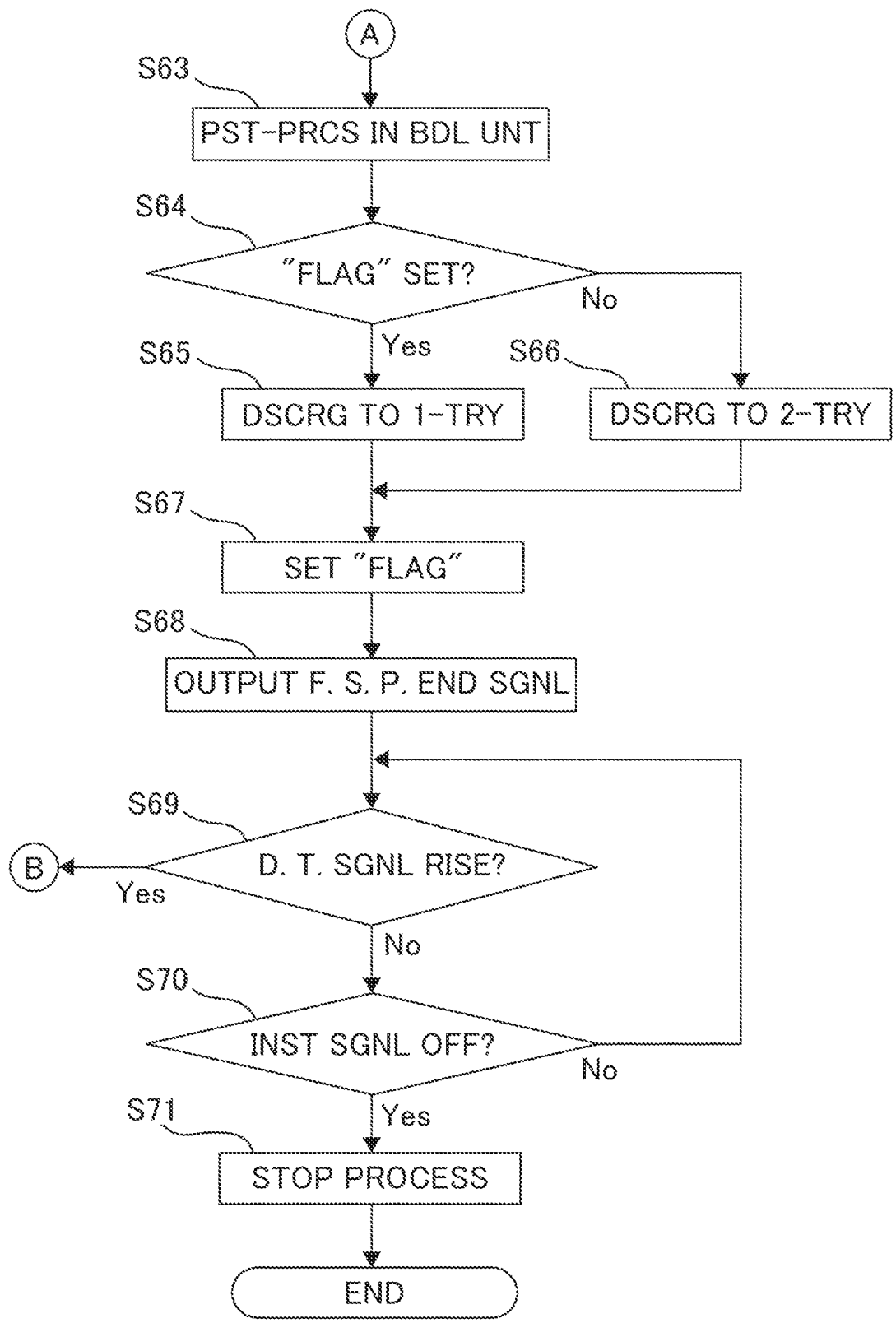

FIG. 11 is a flowchart showing a sorting processing of products in the bundle unit on the basis of the discharge timing signal.

Figure 12:
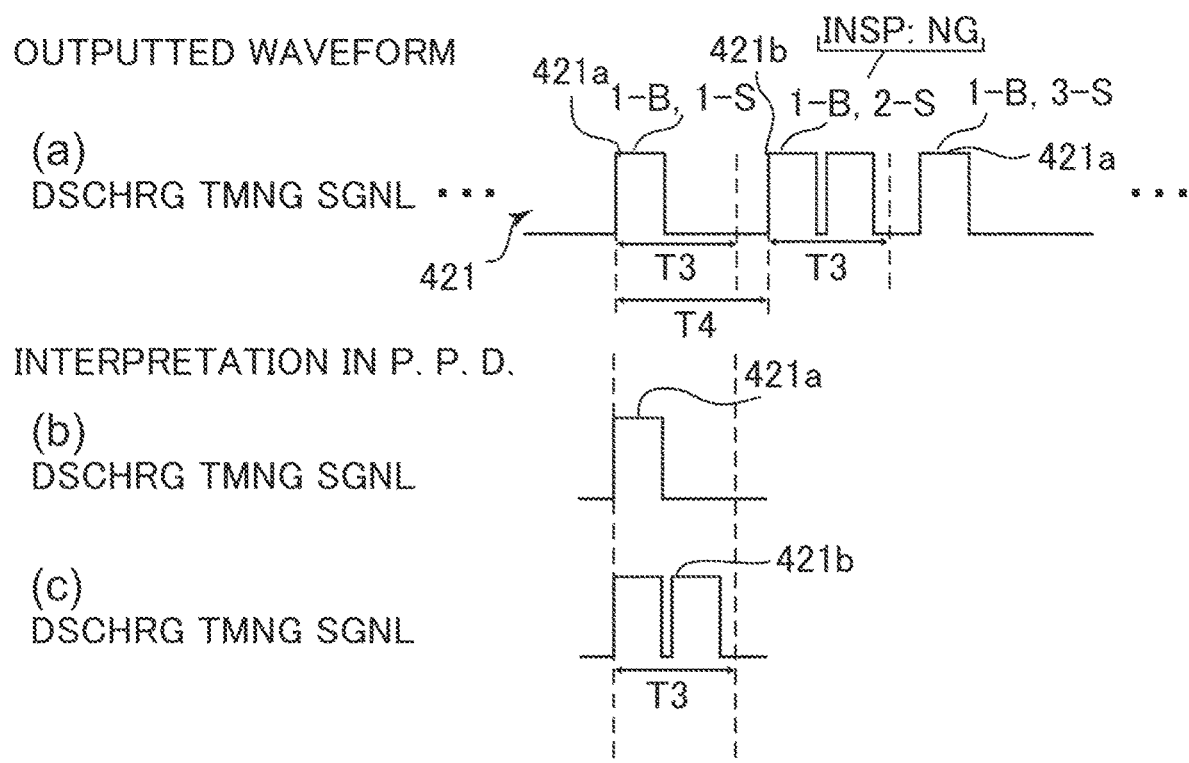

Parts (a) to (c) of FIG. 12 are timing charts showing waveforms of discharge timing signals, in which part (a) shows the discharge timing signal outputted from the image forming apparatus, part (b) shows the discharge timing signal having a pulse number of 1, and part (c) shows the discharge timing signal having the pulse number of 2.

Figure 13:
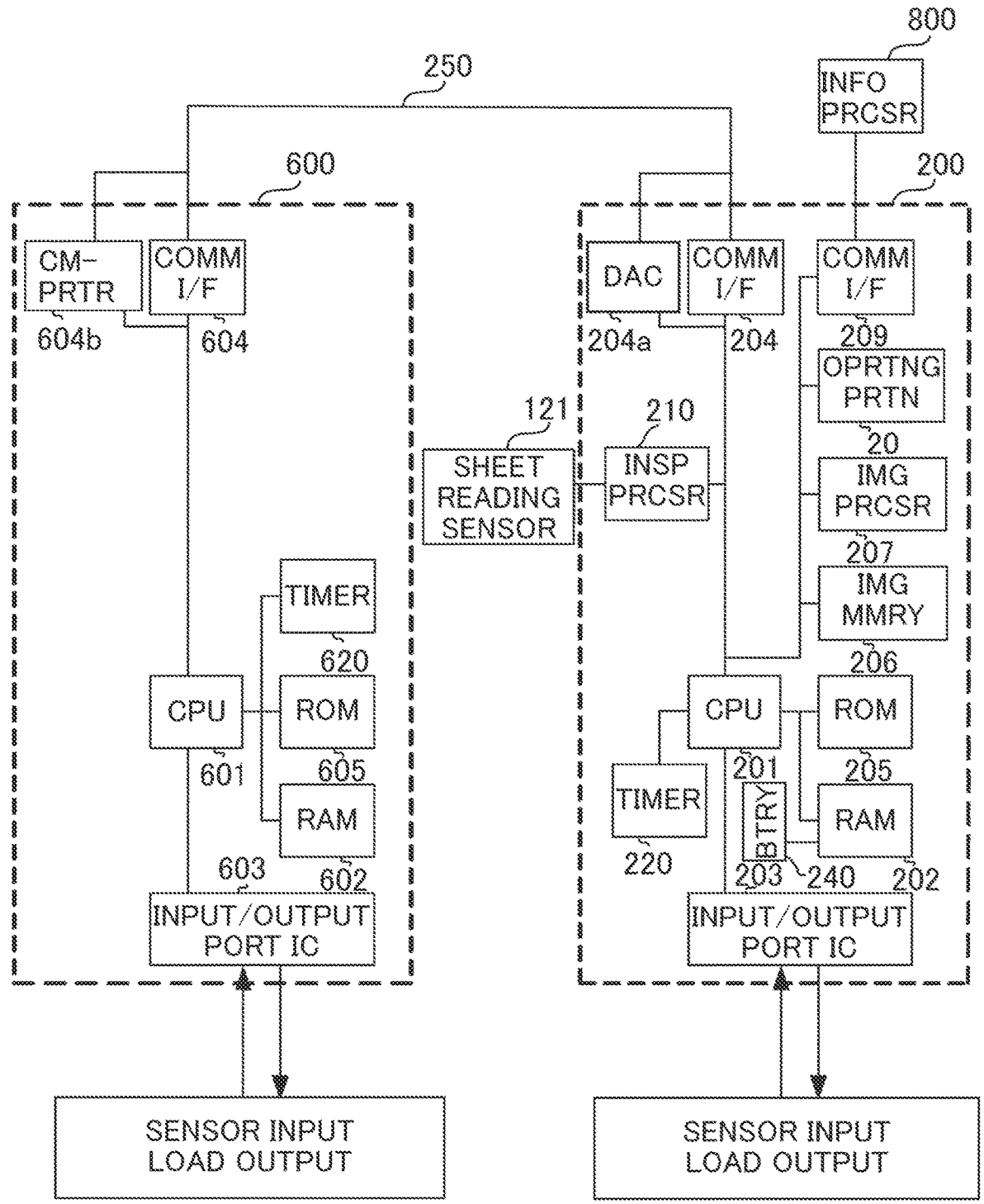

FIG. 13 is a block diagram showing a control block in a third embodiment.

Figure 14:
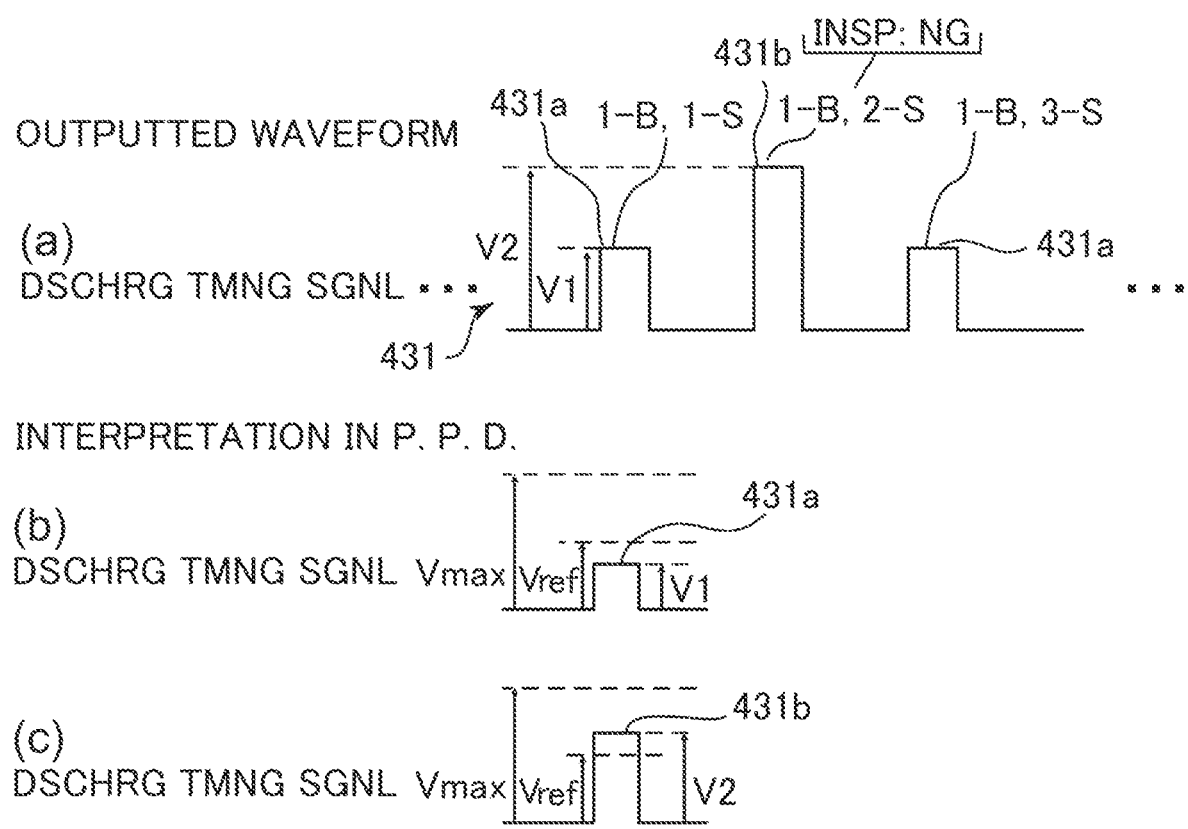

Parts (a) to (c) of FIG. 14 are timing charts showing waveforms of discharge timing signals, in which part (a) shows the discharge timing signal outputted from the image forming apparatus, part (b) shows the discharge timing signal having a voltage V1, and part (c) shows the discharge timing signal a voltage V2.

Figure 15:
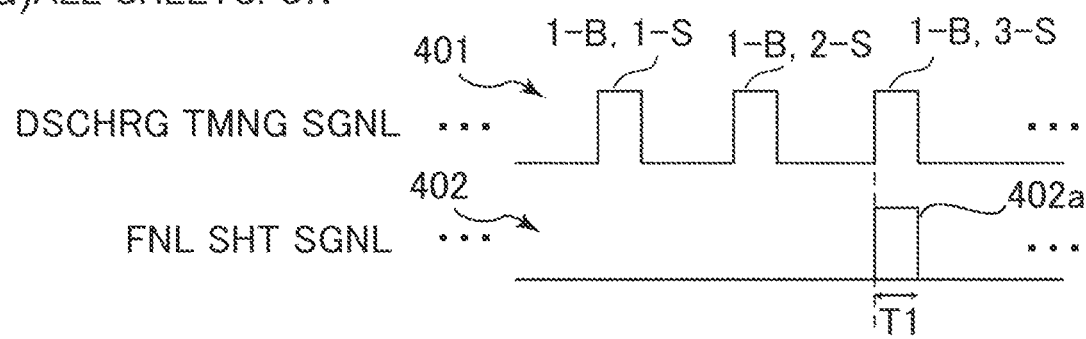
Figure 15:
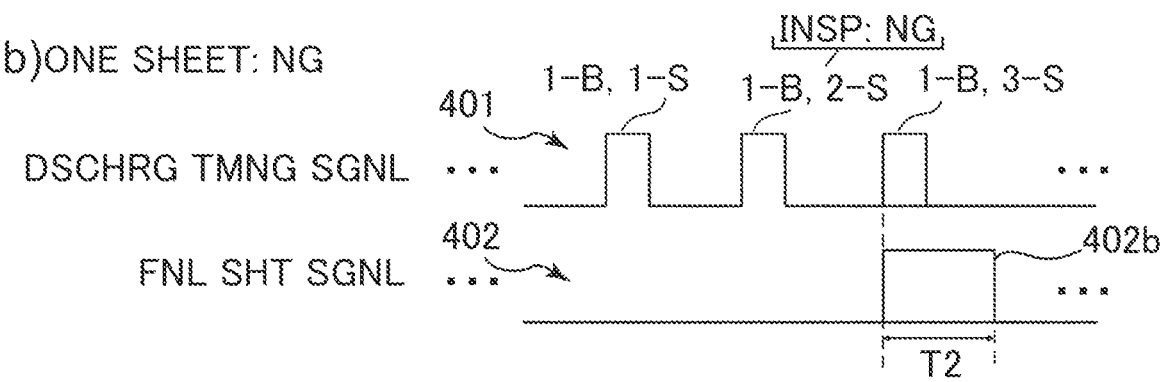

Parts (a) and (b) of FIG. 15 are timing charts showing waveforms of discharge timing signals and final sheet signals in a fourth embodiment, in which part (a) shows the case where all sheets of a sheet bundle (set) are OK in inspection, and part (b) shows the case where the sheet bundle includes an NG sheet in inspection.

Figure 16:
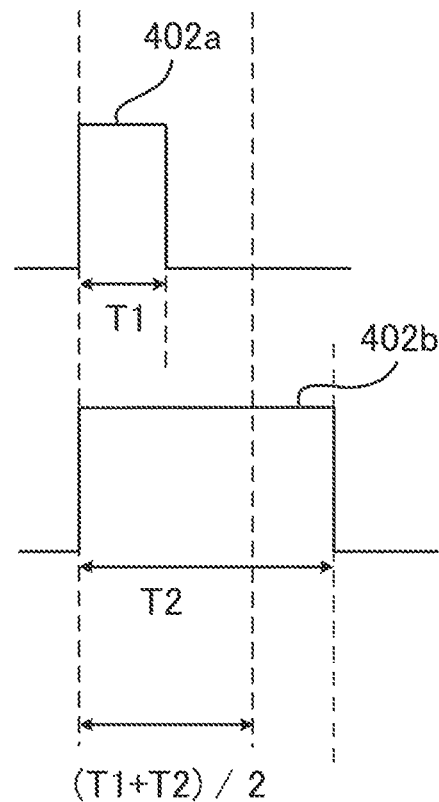

Parts (a) and (b) of FIG. 16 are timing charts, in which part (a) shows a final sheet signal with a pulse width T1, and part (b) shows a final sheet signal with a pulse width T2.

Figure 17:
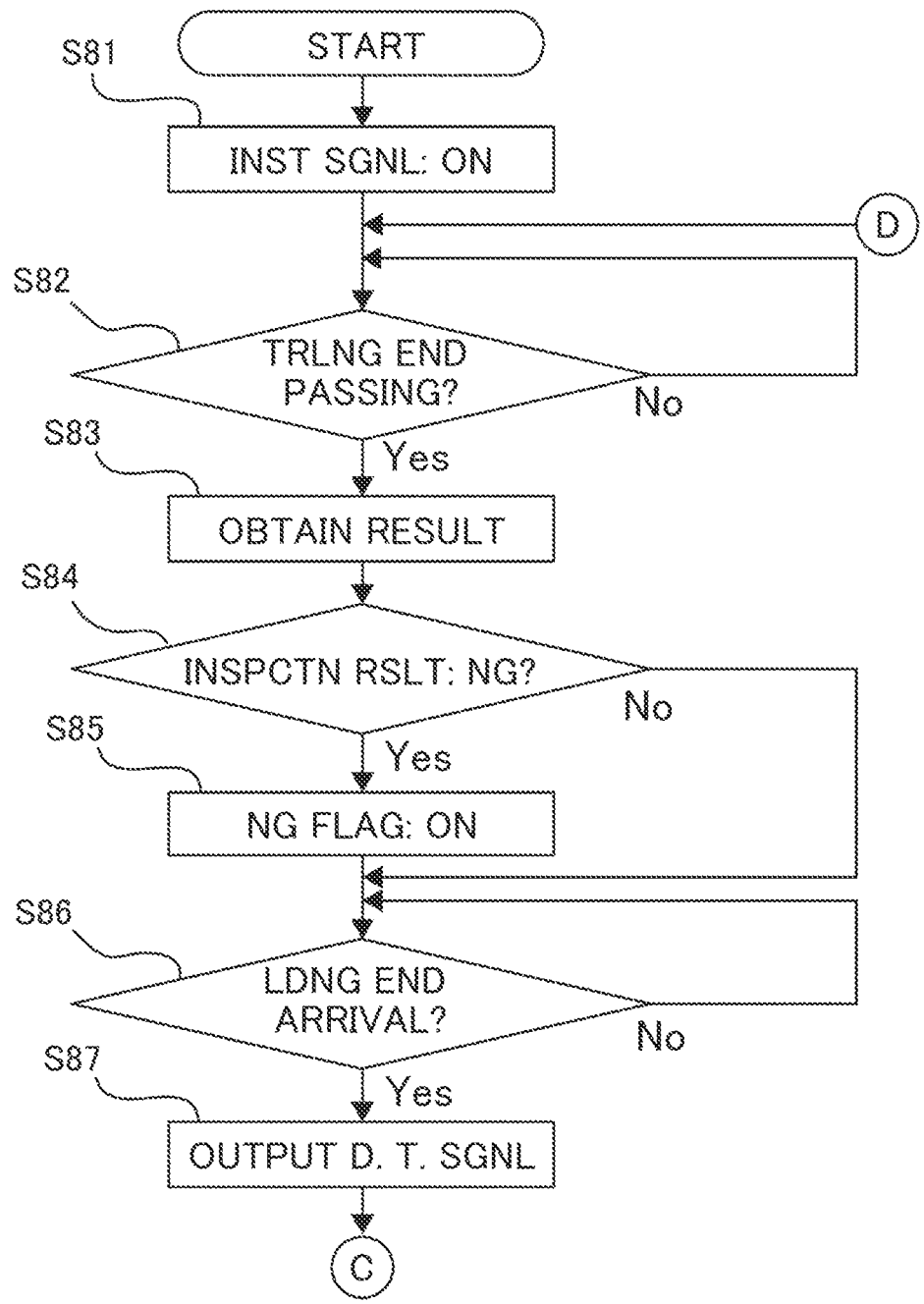
Figure 18:
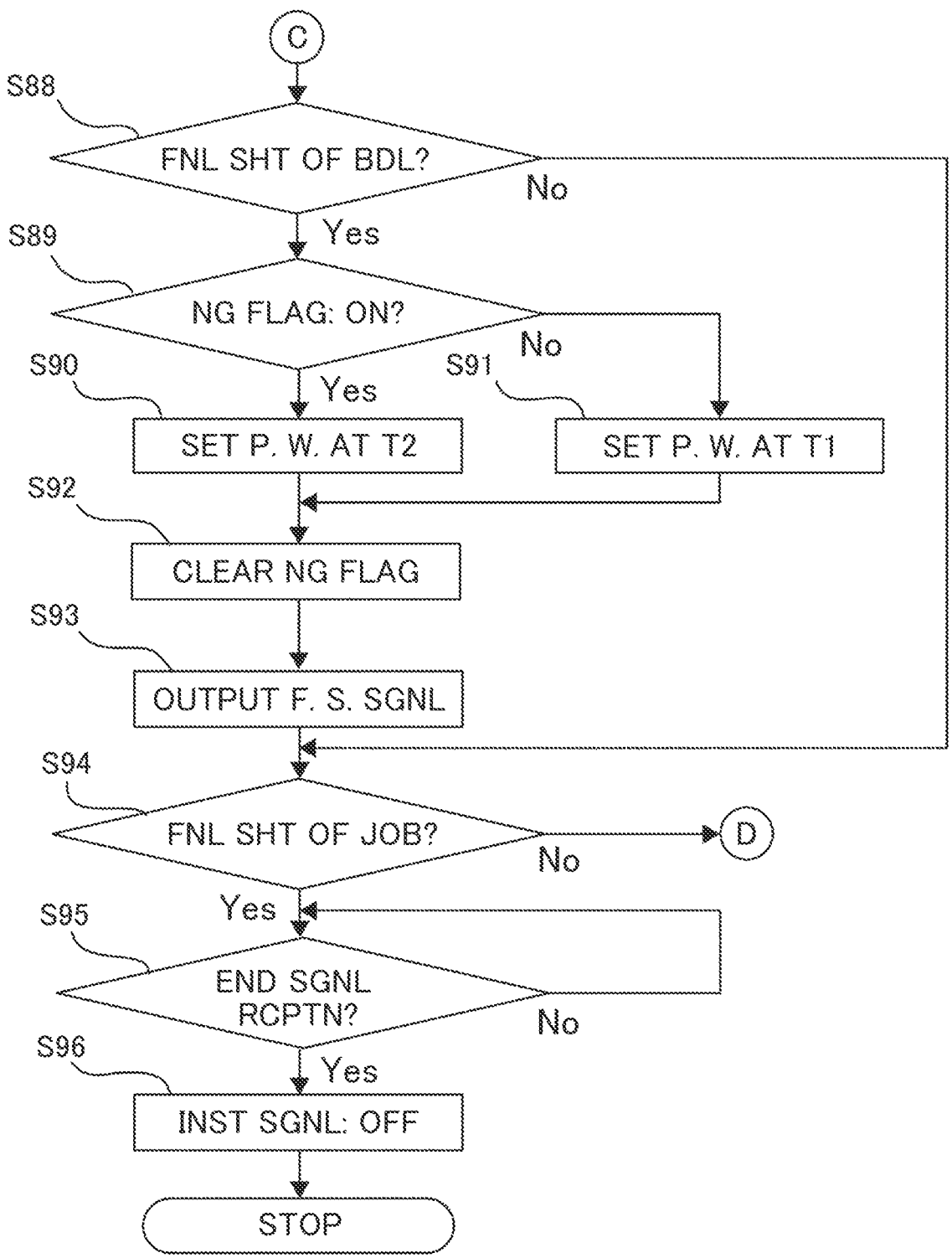

FIGS. 17 and 18 are flowcharts each showing an operation relating to transmission and reception of signals of the image forming apparatus when the inspection processing is performed.

Figure 19:
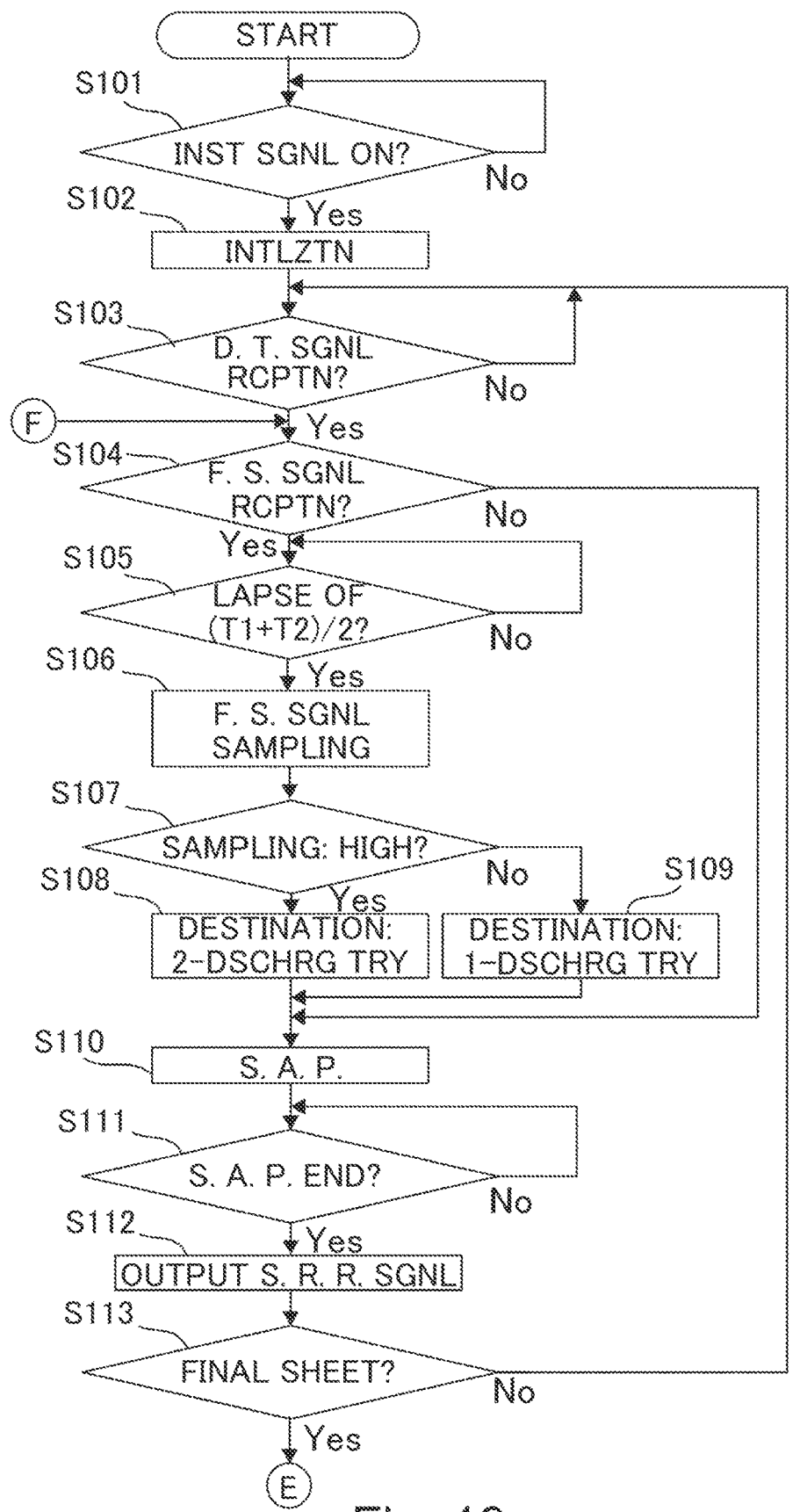
Figure 20:
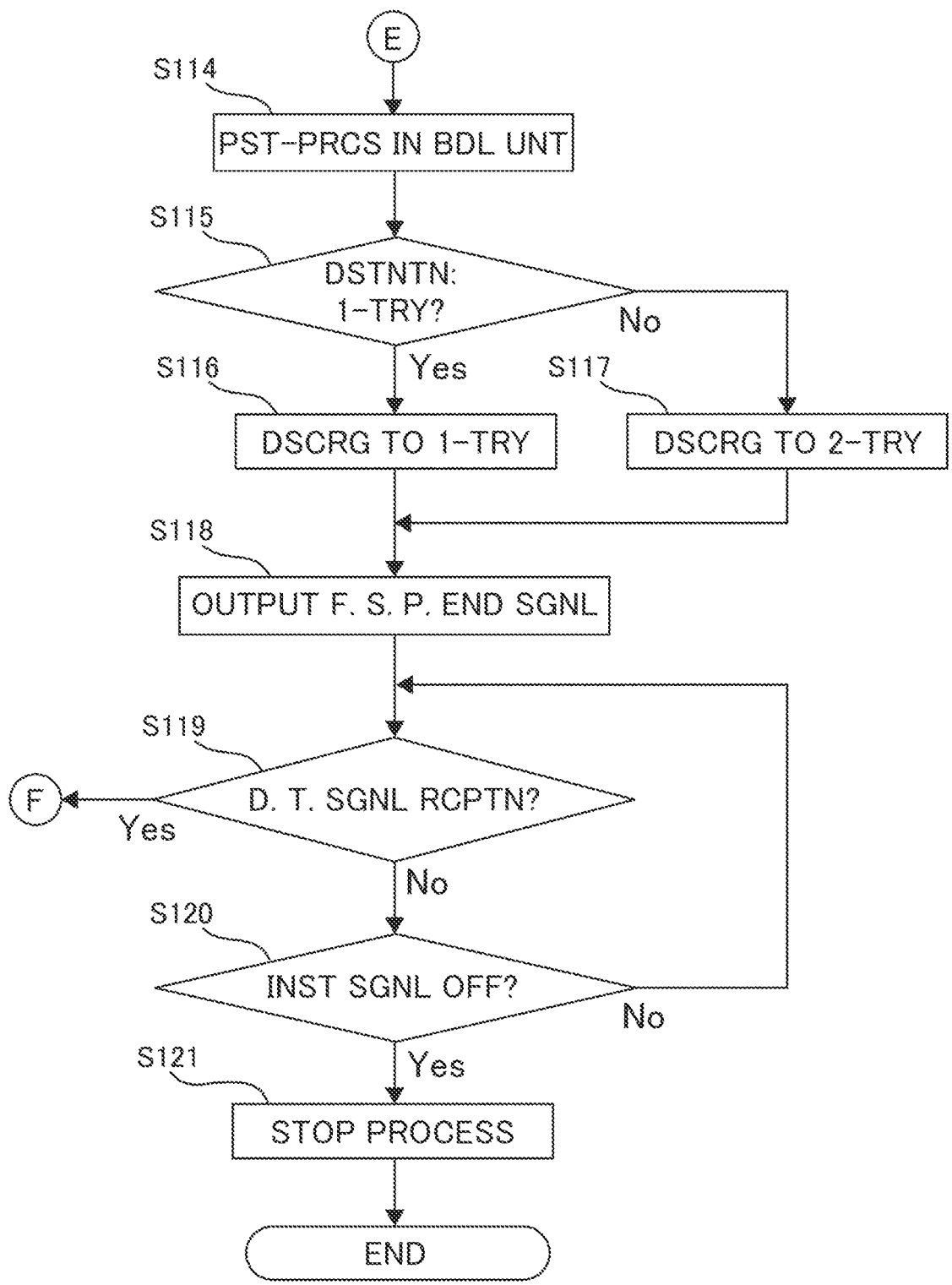

FIGS. 19 and 20 are flowcharts each showing a sorting processing of products in a bundle unit on the basis of the final sheet signal.

Figure 21:
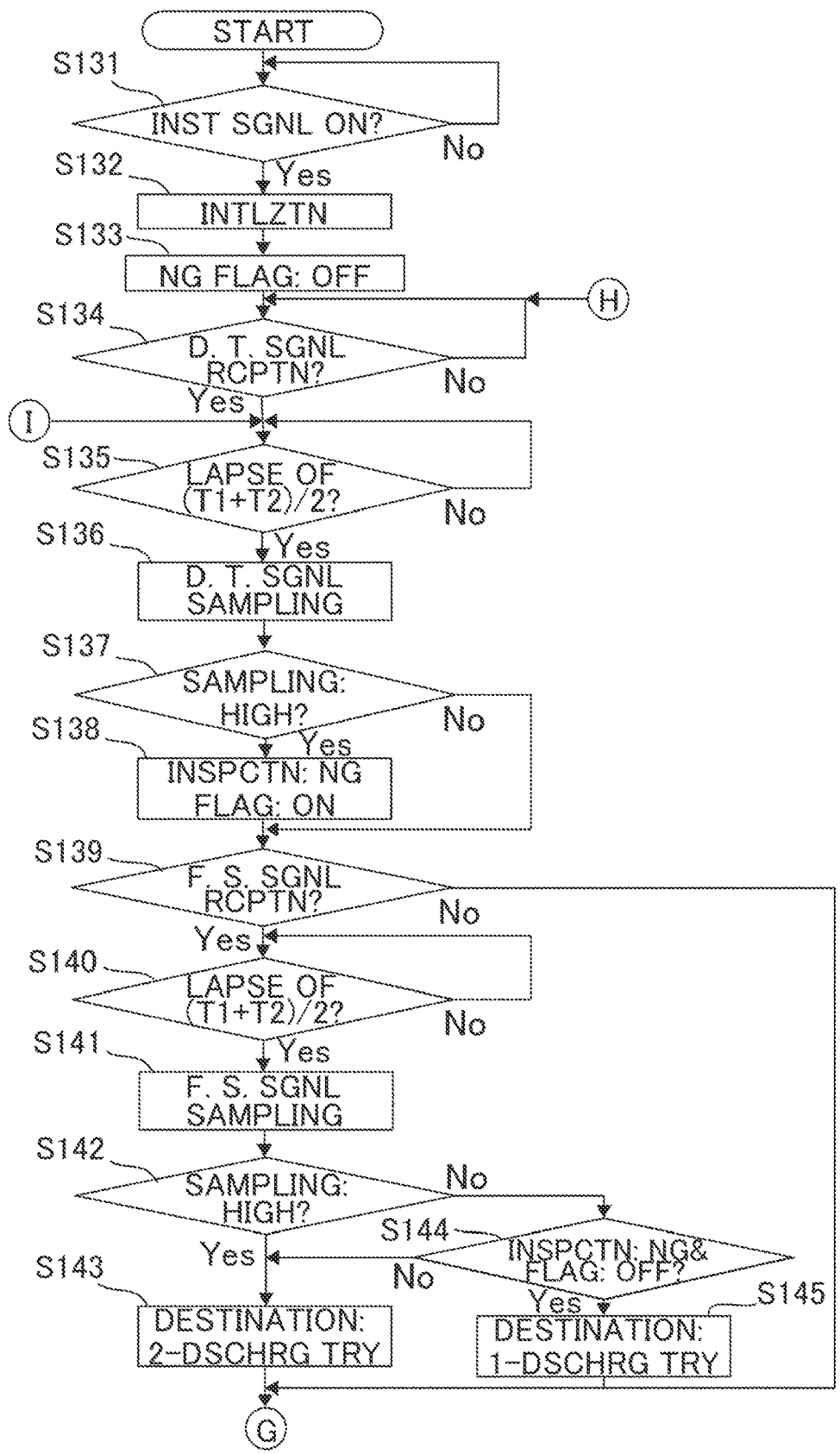
Figure 22:
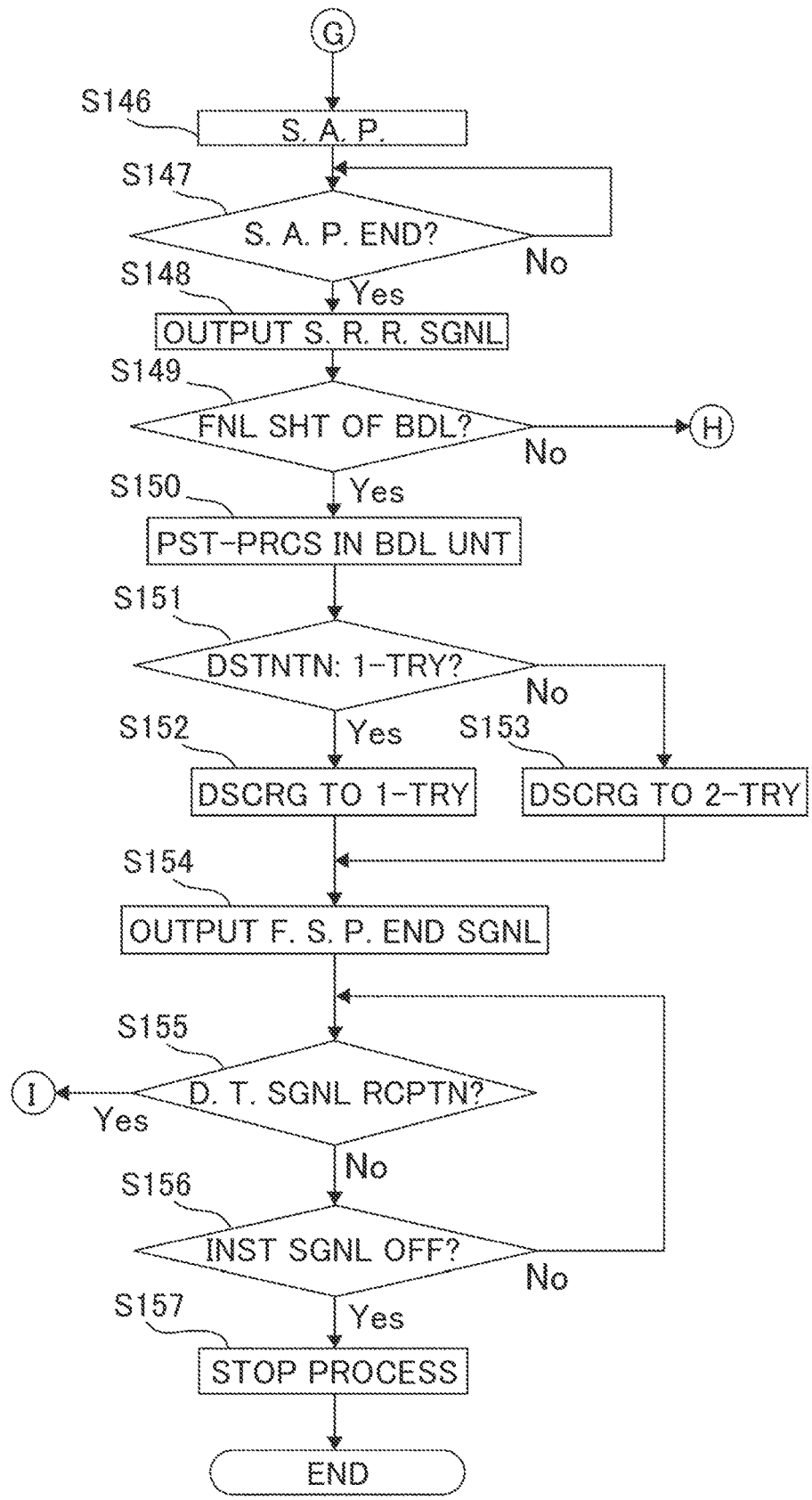

FIGS. 21 and 22 are flowcharts each showing sorting processing of products in a bundle unit on the basis of the discharge timing signal and the final sheet signal.

Figure 23:
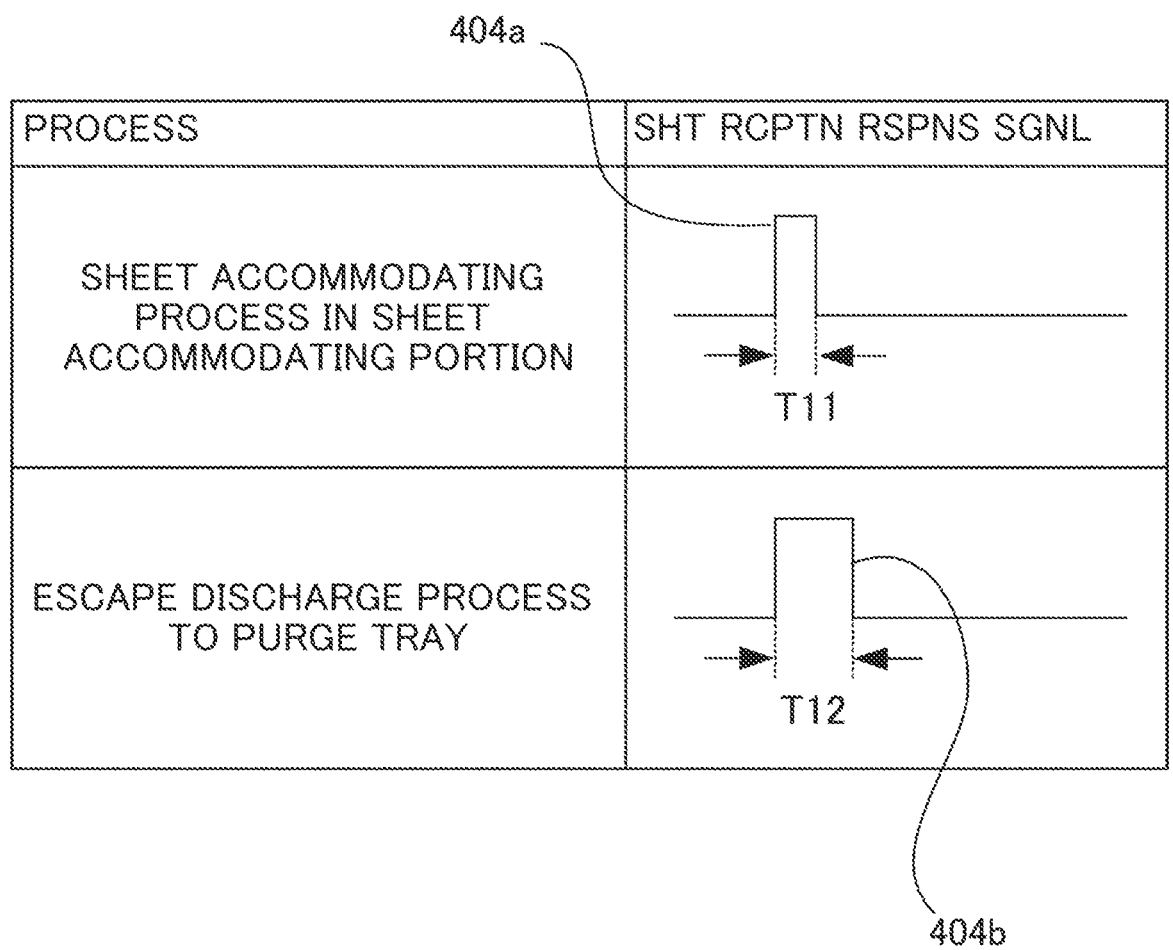

FIG. 23 is a table showing a relationship between contents of processing performed by the sheet processing apparatus and a sheet reception response signal.

Figure 24:
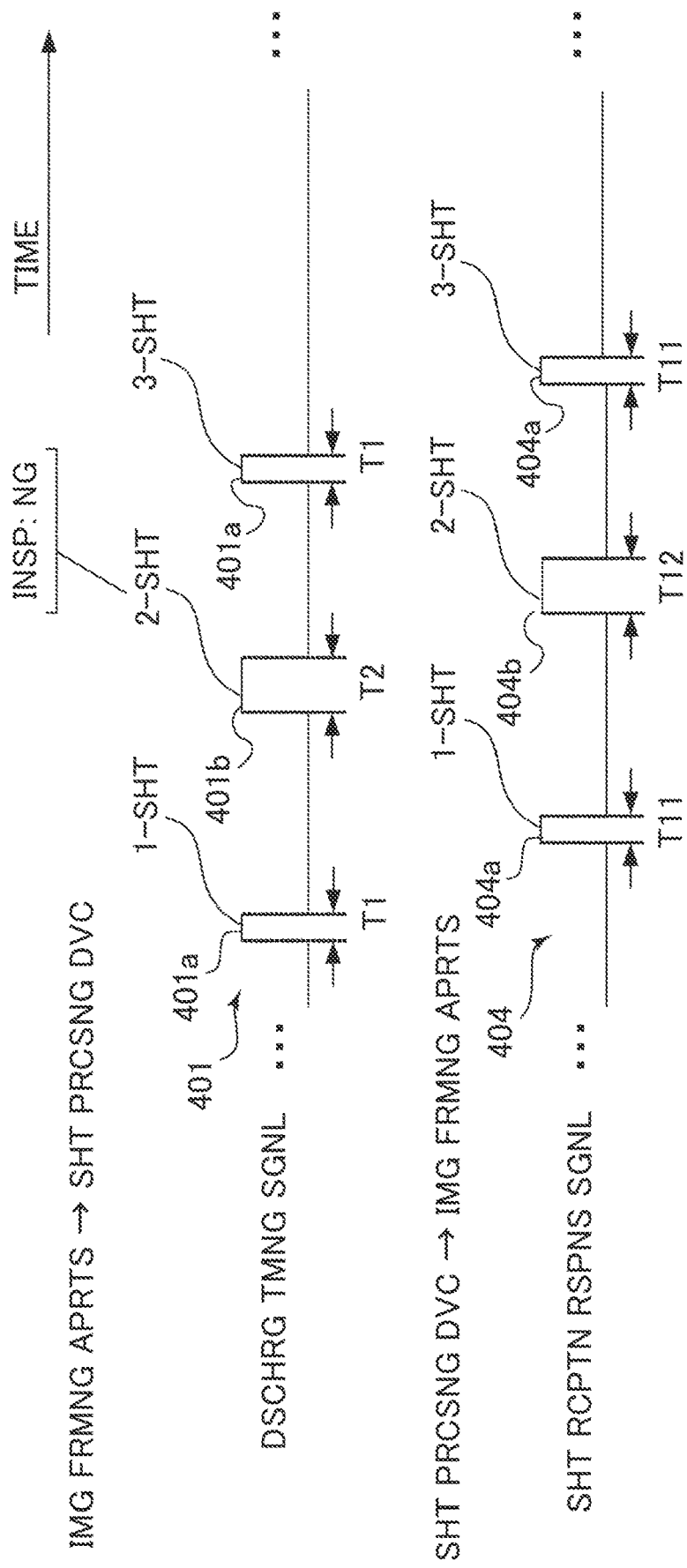

FIG. 24 is a timing chart showing waveforms of a discharge timing signal outputted from the image forming apparatus and a sheet reception response signal outputted from the sheet processing apparatus.

Figure 25:
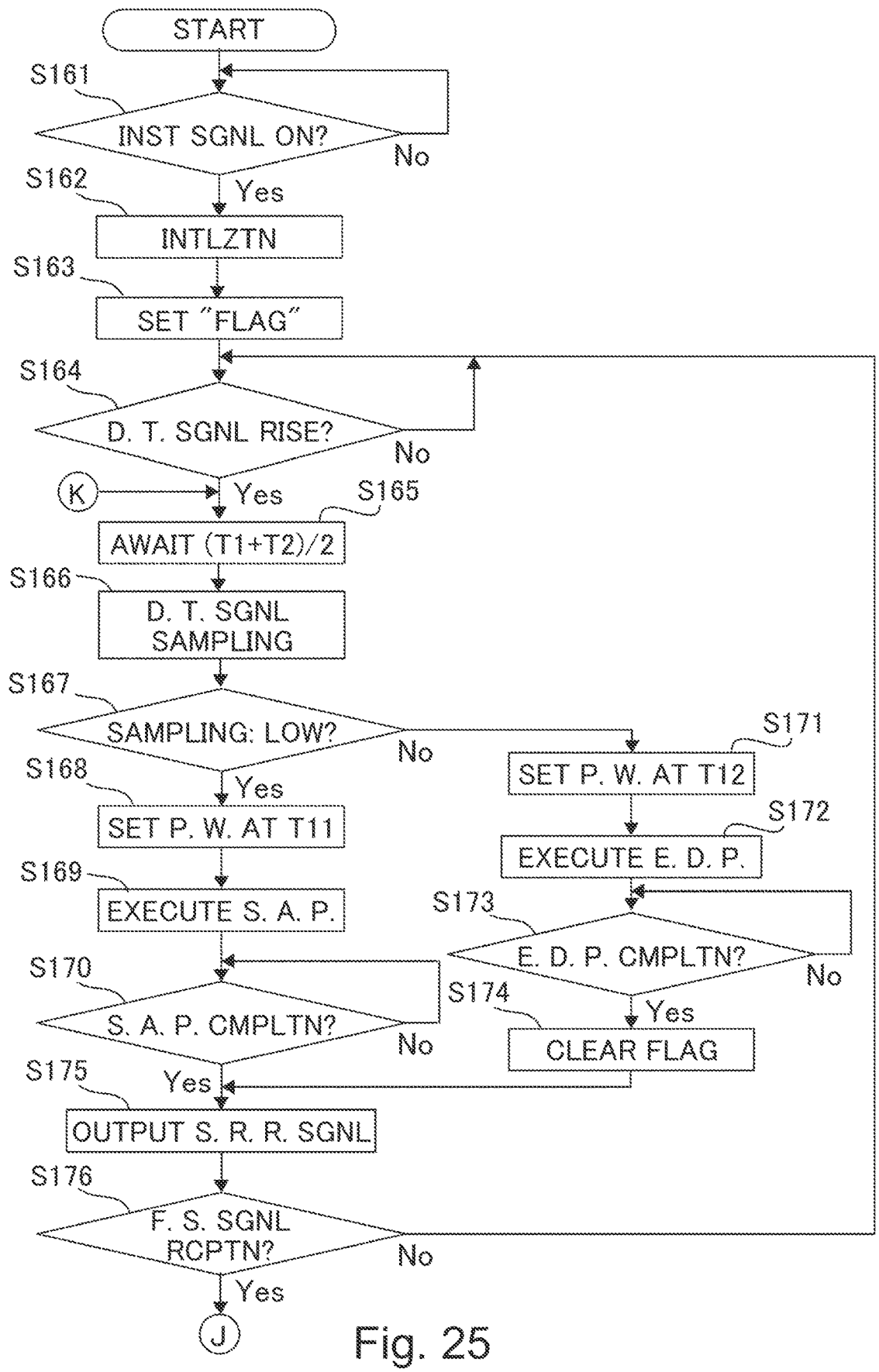
Figure 26:
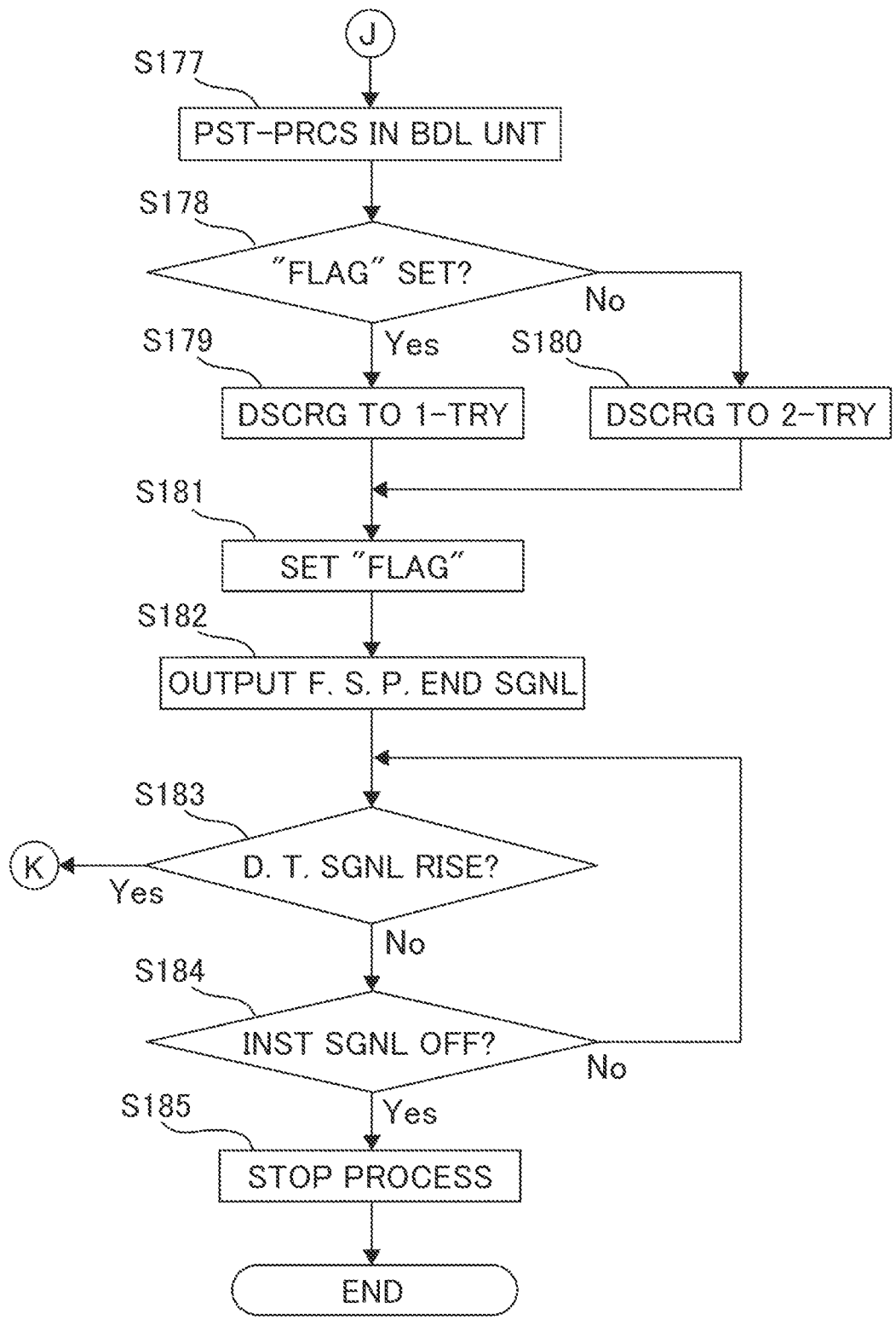

FIGS. 25 and 26 are flowcharts each showing processing of notification of a post-processing result in a sheet unit.

Figure 27:
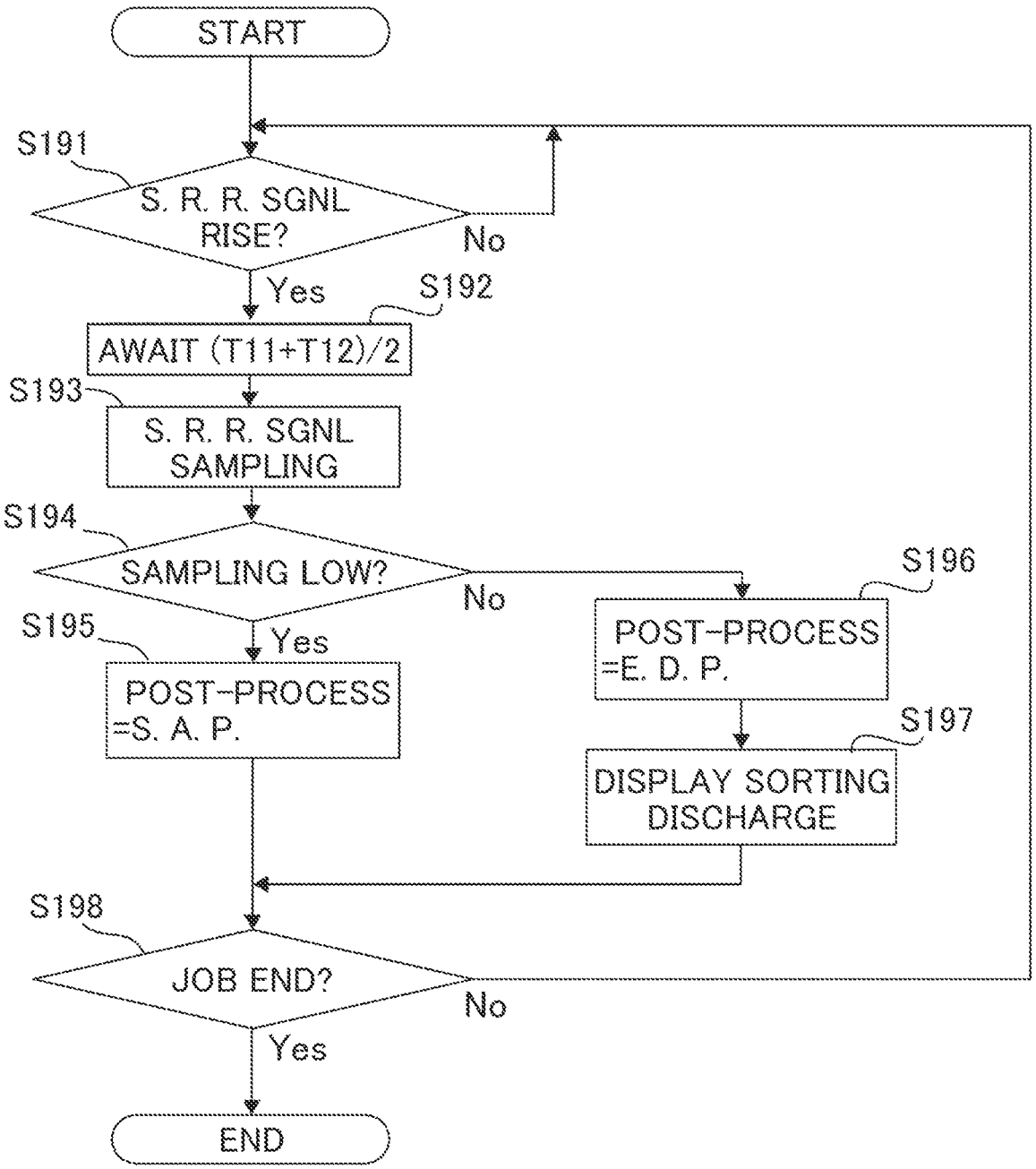

FIG. 27 is a flowchart for illustrating processing notifying an operating portion of execution of escape discharge processing.

Figures 28, 29:
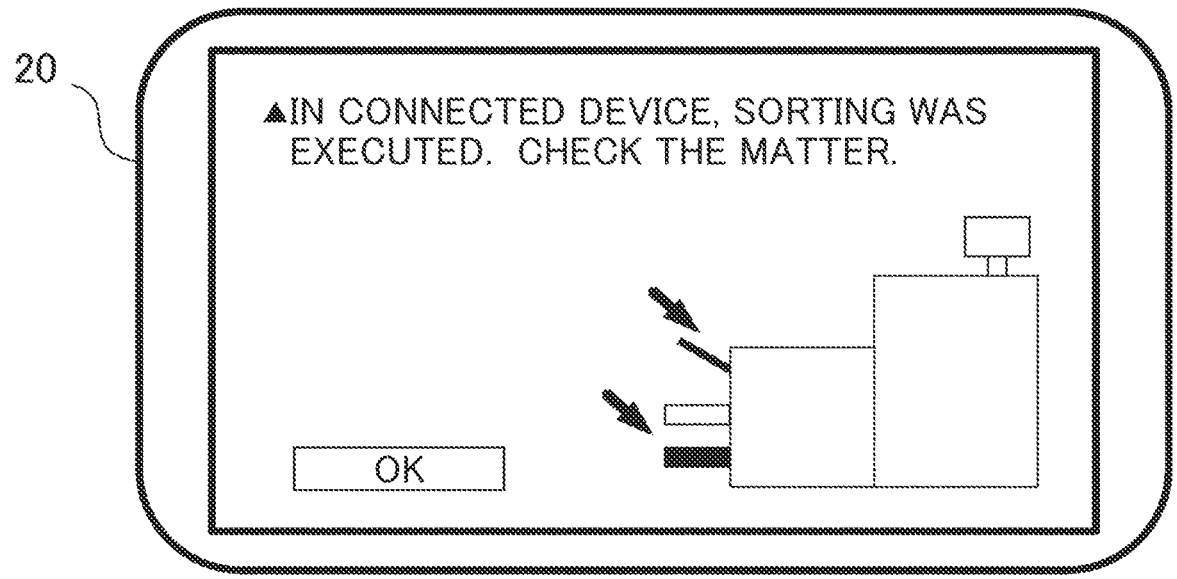

FIG. 28 is a schematic view showing a screen example displayed on an operating portion.

FIG. 29 is a table showing a combination of an inspection result and expected sorting processing.

Figure 30:
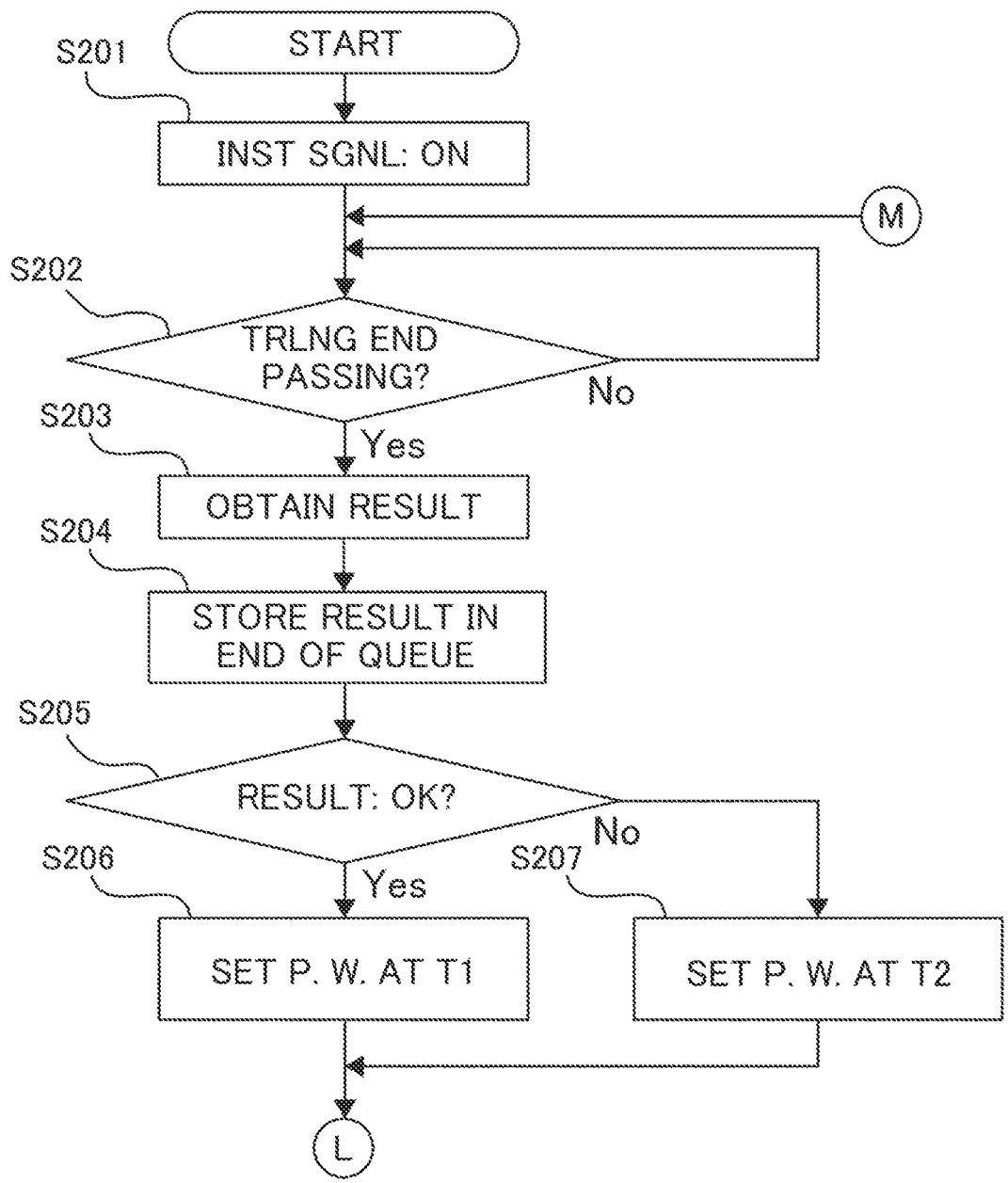
Figure 31:
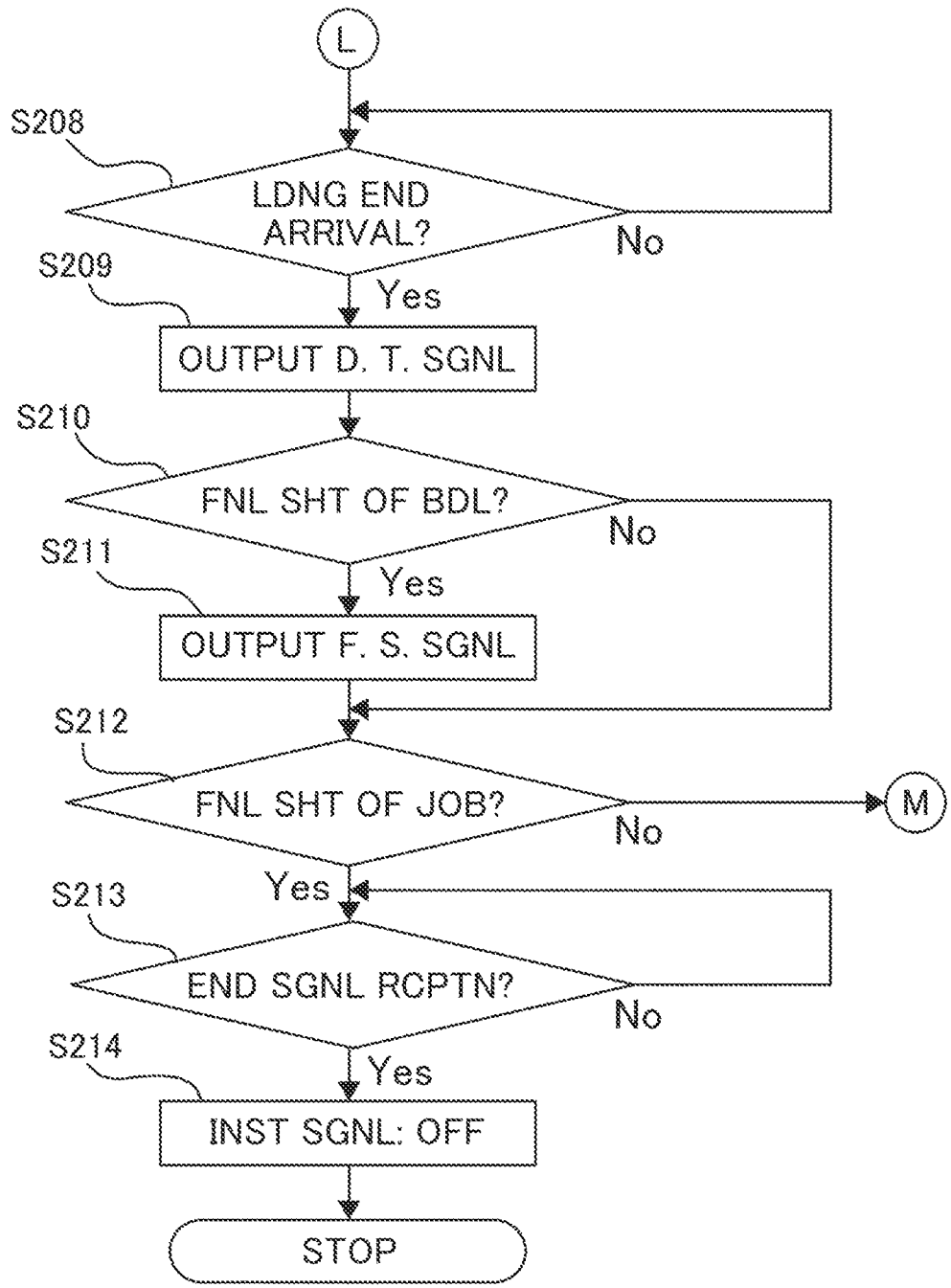

FIGS. 30 and 31 are flowcharts each showing an operation relating to transmission and reception of signals of the image forming apparatus.

Figure 32:
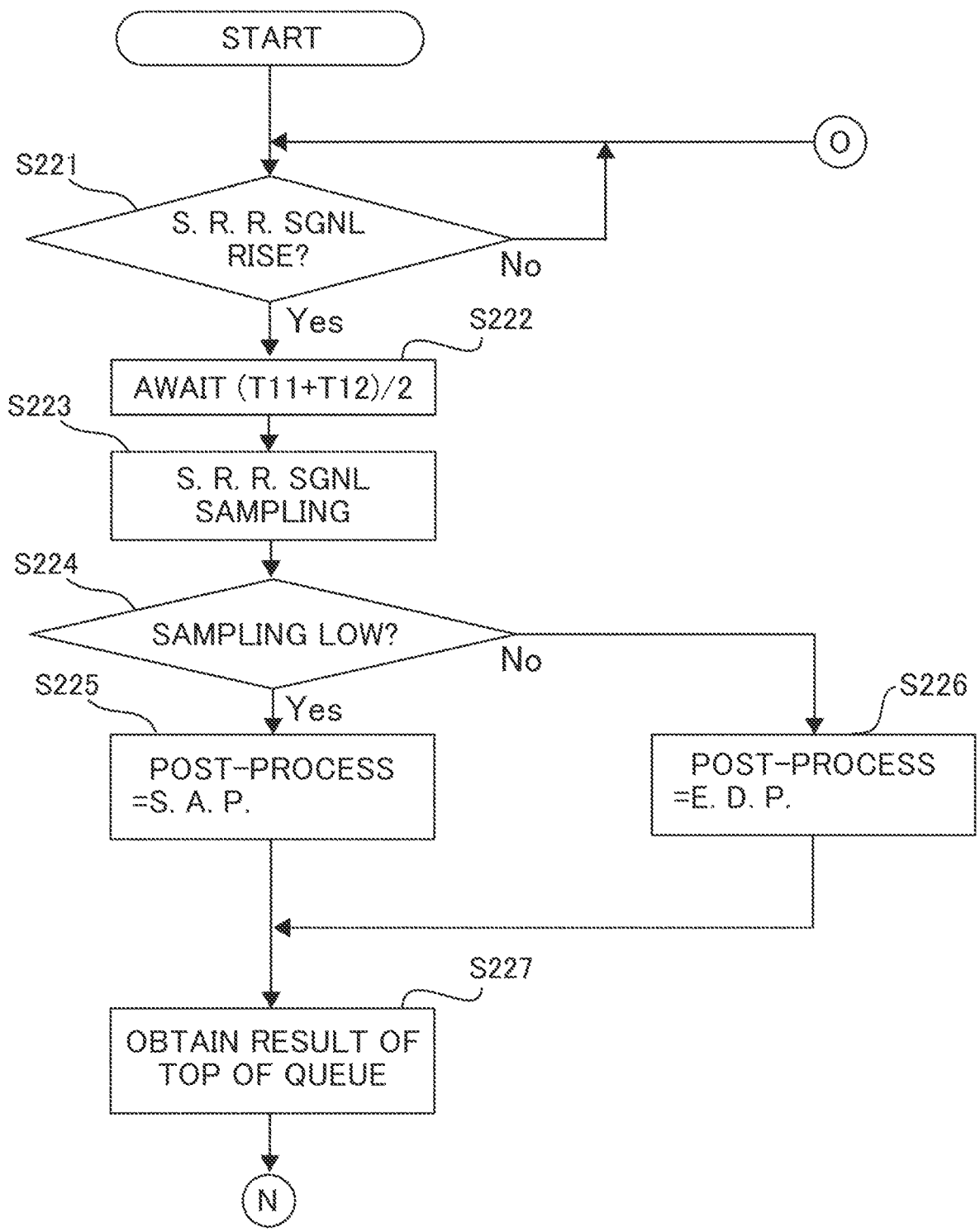
Figure 33:
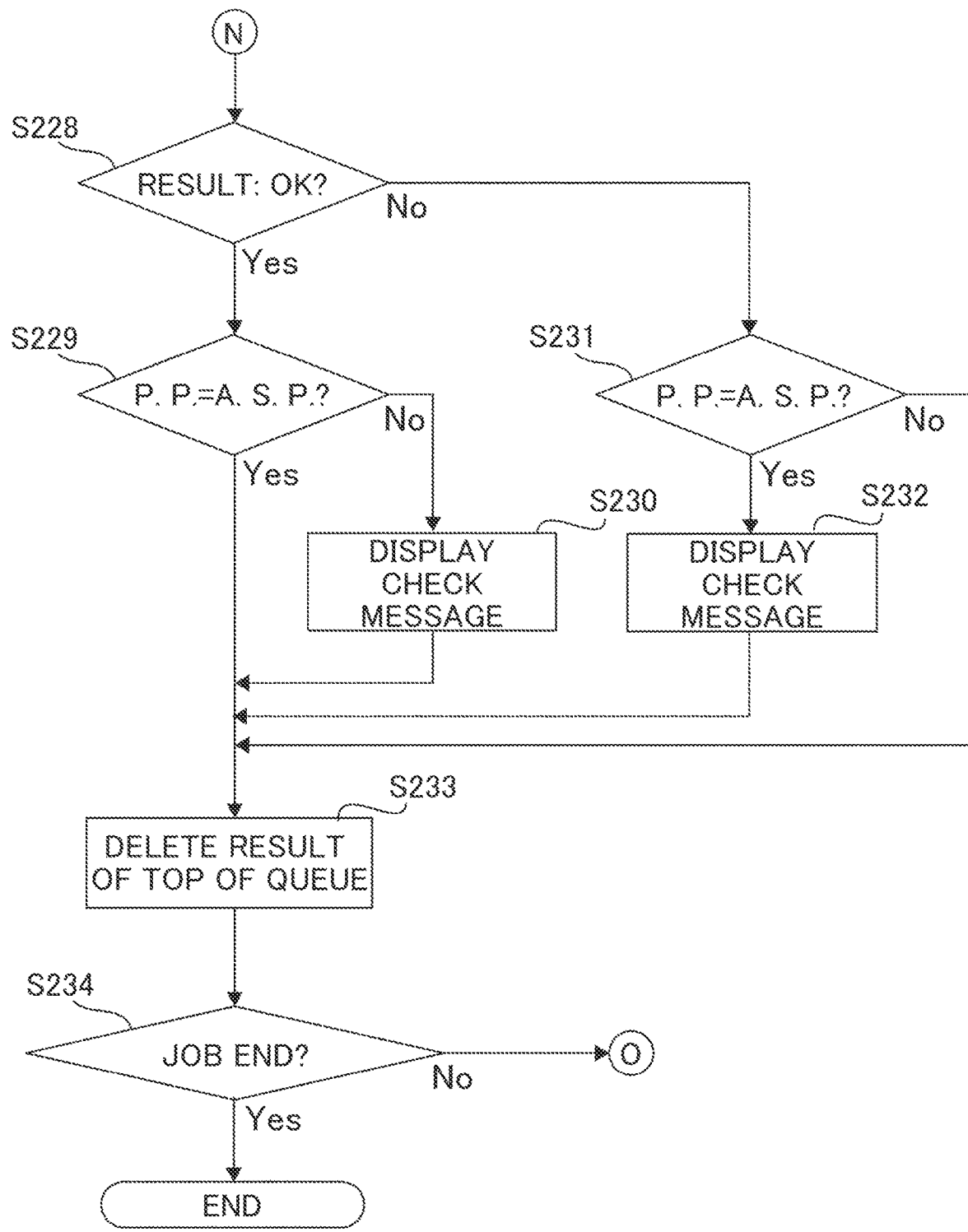

FIGS. 32 and 33 are flowcharts each for illustrating notification processing performed on the basis of a comparison between an inspection result and expected sorting processing.

Figure 34:
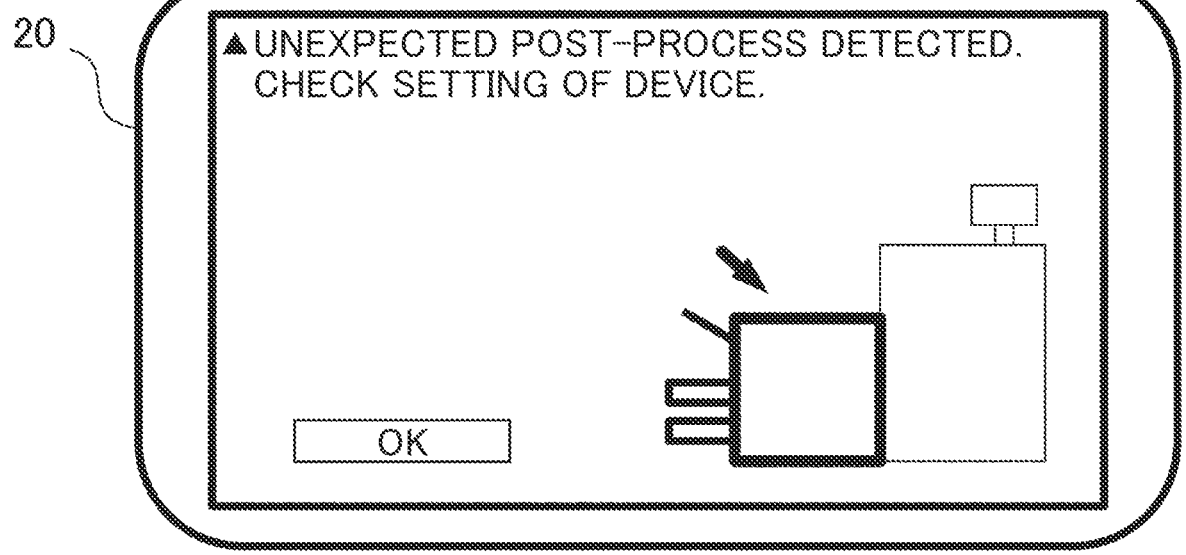

FIG. 34 is a schematic view showing a check message displayed on the operating portion.

DESCRIPTION OF THE EMBODIMENTS

Embodiments of the present invention will be specifically described with reference to the drawings. Dimensions, materials, shapes and relative arrangement of constituent elements described in the following embodiments should appropriately be changed depending on structures and various conditions of apparatuses to which the present invention is applied, and the scope of the present invention is not intended to the limited thereto.

First Embodiment

[General Structure]

First, a first embodiment of the present invention will be described. An image forming system 1 includes an image forming apparatus 10, an operating portion 20, an original reading apparatus 30 and a sheet processing apparatus 1000. On a downstream side of the image forming apparatus 10 with respect to a sheet feeding direction, the sheet processing apparatus 1000 is connected in line.

The original reading apparatus 30 is capable of reading an image of an original, placed on an original tray 31 or an original supporting platen glass 32, by a scanner unit 100. The operating portion 20 includes a liquid panel and various physical buttons, and the like, and is capable of making various settings relating to the image forming system 1 and providing an instruction to execute a job.

The image forming apparatus 10 as an image reading apparatus is a full-color laser printer of an electrophotographic type and forms a toner image on a sheet on the basis of an image signal inputted from an information processing device such as a personal computer or from the original reading apparatus 30. The image forming apparatus 10 is a POD machine capable of meeting printing for purposes (uses) other than a general office purpose (use), and is capable of using, as a recording material (medium), various sheets including paper such as a form or an envelope, glossy paper, a plastic film such as an overhead projector (OHP) sheet, a cloth and the like.

The image reading apparatus 10 includes a feeding unit 40 for feeding the sheet, and an image forming portion 50 for forming a toner image on the sheet fed from the feeding unit 40, and a fixing device 60 for fixing the toner image formed on the sheet by the image forming portion. Further, the image forming apparatus 100 includes a discharging portion 70 for discharging the sheet on which the image is formed and a reverse feeding (conveying) portion 80 for reverse-feeding (conveying) the sheet.

The image forming portion 50 is of a tandem and intermediary transfer type in which process units PY, PM, PC and PK for forming toner images of yellow, magenta, cyan and black, respectively and an intermediary transfer belt 104 which is an intermediary transfer member are provided. Each of the process units PY to PK is an electrophotographic unit including a photosensitive drum which is a photosensitive member.

The process units PY to PK are similarly constituted except that colors of toners used for development are different from each other, and therefore, a structure and a toner image forming process (image forming operation) of the image forming portions will be described by using the process unit PY as an example. The process unit PY includes, in addition to the photosensitive drum 102, a charging device 91, an exposure device 103, a developing device 92, and the like. The photosensitive drum 102 is a drum-shaped photosensitive member including a photosensitive layer at an outer peripheral portion and rotates in a direction along a rotational direction of the intermediary transfer belt 104. A surface of the photosensitive drum 102 is electrically charged by being supplied with electric charges from the charging device 91.

The exposure device 103 emits laser light modulated depending on image information, so that the surface of the photosensitive drum 102 is scanned with the laser light by an optical system and thus an electrostatic latent image is formed on the surface of the photosensitive drum 102. Incidentally, inside the exposure device 103, an unshown exposure controller temperature sensor is provided and is capable of detecting a temperature in the exposure device 103. The developing device 92 accommodates a developer containing the toner and develops the electrostatic latent image into a toner image by supplying the toner to the surface of the photosensitive drum 102. The toner image formed on the photosensitive drum 102 is primary-transferred onto the intermediary transfer belt 104 at a primary transfer portion which is a nip between the intermediary transfer belt 104 and a primary transfer roller 105Y which is a primary transfer device.

Figure 1:
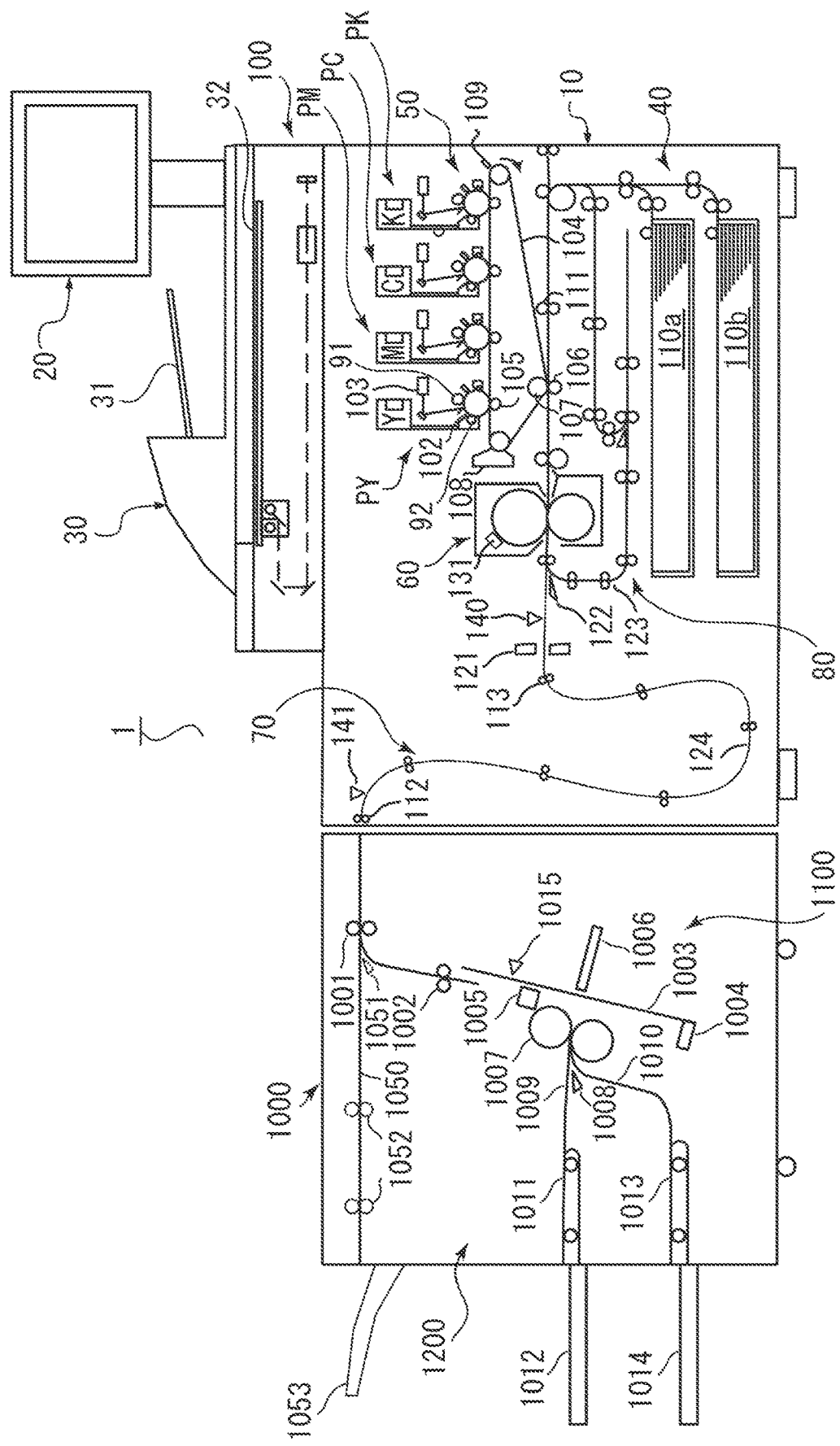
FIG. 1 is a schematic sectional view showing entirety of an image forming system according to a first embodiment.

The intermediary transfer belt 104 is rotationally driven in the clockwise direction in FIG. 1. The image forming operation is performed in the process units in parallel, and the four color toner images are transferred so as to be superposed on each other, so that a full-color toner image is formed on the intermediary transfer belt 104. This toner image is fed to a secondary transfer portion by being carried on the intermediary transfer belt 104. The secondary transfer portion is constituted as a nip between a secondary transfer roller 106 and an inner secondary transfer roller 107.

In parallel to such an image forming operation, the sheet is fed from the feeding unit 40. The feeding unit 40 includes two cassette 110a and 110b. The sheet fed from the feeding unit 40 is fed to a registration roller pair 111 and is subjected to oblique movement correction and timing correction by the registration roller pair 111, and thereafter is fed toward the secondary transfer portion. At this time, the registration roller pair sends the sheet to the secondary transfer portion at timing synchronism with a degree of progression of the process units PY to PK on the basis of a detection signal of an unshown registration sensor.

Onto the sheets sent to the secondary transfer portion, the toner image is secondary-transferred under application of a bias voltage, to the secondary transfer roller 106, of a polarity opposite to a charge polarity of the toner. Residual toner remaining on the intermediary transfer belt 104 after the transfer is removed by a belt cleaner 108. Further, in the neighborhood of the intermediary transfer belt 104, a plurality of color misregistration amount reading sensors 109 are juxtaposed in a main scan direction perpendicular to a movement direction of the intermediary transfer belt 104. The color misregistration amount reading sensor 109 reads the toner image on the intermediary transfer belt 104. Then, the image forming apparatus 1 calculates a deviation amount between a predetermined reference color and each color by using a reading result of the color misregistration reading sensor 109 and feeds back the calculated value to the image forming condition.

The sheet P on which the toner image is transferred is delivered to a fixing device 60. The fixing device 60 includes a fixing roller pair for feeding the sheet while nipping the sheet, a heat source such as a halogen heater, and a temperature sensor 131, and applies heat and pressure to the toner image carried on the sheet. By this, toner particles are melted and fixed, so that an image fixed on the sheet is obtained.

The sheet on which the image is fixed by the fixing device 60 is switched in feeding destination to a reverse path 123 or a feeding path 124 by a switching member 122. In the case where image formation on the sheet is completed, the sheet is guided to the feeding path 124, so that a loading end of the sheet is detected by an inspection inlet sensor 140. On the basis of a detection result of the inspection inlet sensor 140, sheet reading sensors 121 as a reading portion start reading of images on front and back surfaces of the sheet.

With respect to the sheet feeding direction, on a side downstream of the sheet reading sensors 121, an inspection outlet roller pair 113, an outlet sensor 141 and a discharging roller pair 112 are provided, and the feeding path 124 includes a curved portion between the inspection outlet roller pair 113 and the discharging roller pair 112. This curved portion is alternately curved with respect to a front-back direction of the sheet and is constituted so as to be longer than a longest sheet feedable by the image forming apparatus 10. By this, as regards the sheet passing through the feeding path 124, a degree of a curl generated by heat supplied from the fixing device 60 is alleviated. The outlet sensor 141 is utilized for monitoring a sheet feeding status and generation of a discharge timing signal sent to a sheet processing apparatus 1000 described later.

In the case where the image is formed on a back surface (side) of the sheet, the sheet is guided to the reverse path 123. The sheet guided along the reverse path 123 is fed again to the registration roller pair 111 in a state in which the front surface and the back surface of the sheet are reversed to each other by the reverse feeding portion 80. Then, the image is formed on the back surface of the sheet, and then the sheet is delivered to the sheet processing apparatus 1000.

Incidentally, the above-described constitution is an example of the image forming apparatus, and an image forming apparatus including, for example, an image forming means of an ink jet type in place of the electrophotographic type may also be used.

[Sheet Processing Apparatus]

Next, a structure of the sheet processing apparatus 1000 which is an example of a post-processing apparatus will be described. The sheet processing apparatus 1000 is an apparatus having a function of performing post-processing such as sheet accommodating processing for accommodating a plurality of sheets in a sheet accommodating portion 1003, a bundle alignment processing for bundling the sheets, accommodated in the sheet accommodating portion 1003, as a sheet bundle, binding processing, sorting processing and the like. The binding processing is processing in which the sheet bundle is stapled together, and the sorting processing is processing in which the sheets or the sheet bundles are discharged onto different trays.

The sheet processing apparatus 1000 includes a bending processing portion 1100 capable of executing binding processing of the sheets and a discharging portion 1200 as a post-processing portion for discharging the sheets. The binding processing portion 1100 includes the sheet accommodating portion 1003, a positioning member 1004 against which the leading end of the sheet abuts, a stapler 1005, a projecting member 1006, and a folding roller pair 1007. The discharging portion 1200 includes a purge feeding path 1050, a feeding branch guide 1051, a purge tray 1053, a first discharging path 1009, a second discharging path 1010, a switching member 1008, a first discharge tray 1012, and a second discharge tray 1014.

When the sheet is discharged to the purge tray 1053, the feeding branch guide 1051 is driven, so that the sheet is guided to the purge feeding path 1050 by the feeding branch guide 1051. The sheet guiding along the purge feeding path 1050 is discharged to the purge tray 1053 by a plurality of roller pairs 1052. The switching member 1009 switches the sheet feeding destination to either one of the first discharging path 1009 and the second discharging path 1010.

In the case where the sheet is not purged, the sheet fed by the inlet roller pair 1001 is guided toward a feeding roller pair 1002 by the feeding branch guide 1051. Then, the sheet is discharged to the sheet accommodating portion 1003 by the feeding roller pair 1002. The sheet accommodating portion 1003 accommodates the sheet while guiding the sheet to the positioning member 1004. The positioning member 1004 is supported movably in an up-down direction, and positions a leading end position of the sheet depending on the position thereof.

For example, in the case where the sheets are subjected to saddle stitching bookmaking processing, the positioning member 1004 is positioned so that a central portion of the sheet bundle corresponds to a position of the stapler 1005. Then, after the central portion of the sheet bundle is subjected to the binding processing, the positioning member 1004 moves so that the central portion of the sheet bundle corresponds to a position of the projecting member 1006.

Thereafter, the sheet bundle is pushed to a nip of the folding roller pair 1007 by the projecting member 1006, so that the sheet bundle is subjected to folding processing by the folding roller pair 1007. By this, the sheet bundle has been subjected to the saddle stitching bookmaking processing.

The sheet bundle subjected to the saddle stitching bookmaking processing is discharged to an outside of the apparatus by the discharging portion 1200. In the case where the sheet bundle is guided to the first discharging path 1009 by the switching member 1008, the sheet bundle is discharged to the first discharge tray 1012 by a feeding belt 1011. In the case where the sheet bundle is guided to the second discharging path 1010, the sheet bundle is discharged to the second discharge tray 1014 by a feeding belt 1013.

Thus, the binding processing portion 1100 performs the bundle alignment processing for bundling the sheets as the sheet bundle by aligning the plurality of sheets and the binding processing for stapling the sheet bundle, and the discharging portion 1200 performs the sorting processing in which the sheets or the sheet bundles are discharged to the different trays.

Incidentally, in this embodiment, in the case where the image formed on the sheet is discriminated as being normal, i.e., that there is no image defect by inspection processing using a detection result of the sheet reading sensor 121, the sheet bundle is discharged to the first discharge tray 1012. In the case where the image formed on the sheet is discriminated as being abnormal, i.e., that the image defect occurs by the inspection processing, the sheet bundle is discharged to the second discharge tray 1014. That is, in the inspection processing, occurrence or non-occurrence of the image defect on the sheet is discriminated, and the discharging portion 1200 of the sheet processing apparatus 1000 switches the discharge destination of the sheet bundle depending on a result of the inspection processing.

Further, in this embodiment, the case where the saddle stitching bookmaking processing is performed by the sheet processing apparatus 1000 was described as an example, but the binding processing portion 1100 may also perform only the folding processing without subjecting the sheet bundle to the binding processing with the stapler 1005. Further, the portion where the binding processing of the sheet bundle with the stapler 1005 is performed is not limited to the central portion of the sheet but may also be another portion. Further, the sheet processing apparatus 1000 may also discharge the sheets or the sheet bundles to the first discharge tray 1012 or the second discharge tray 1014 in a sorting manner.

[Control Black]

Figure 2:
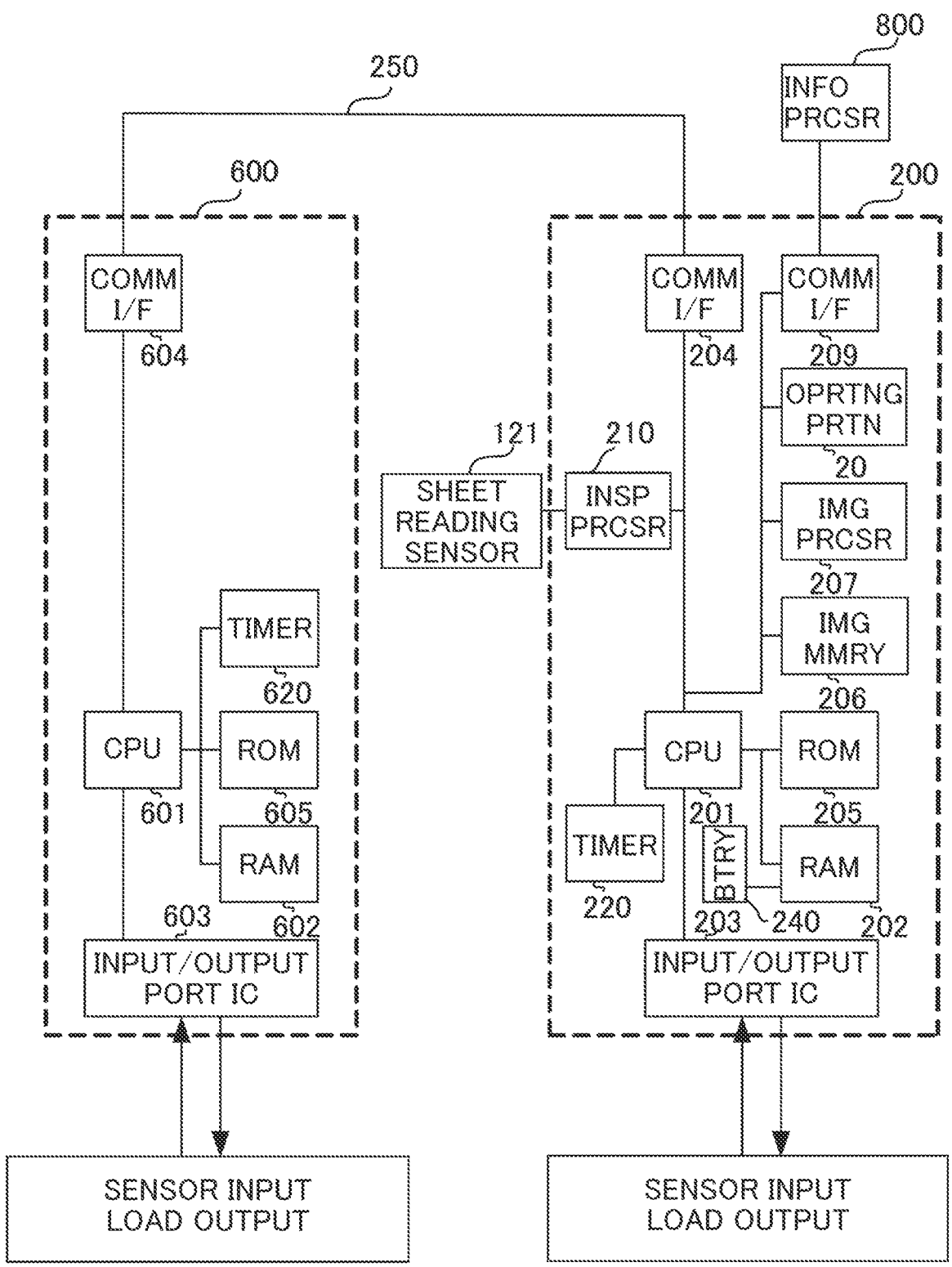
FIG. 2 is a block diagram showing a control block.

Next, a control block of the image forming system 1 according to this embodiment will be described. As shown in FIG. 2, the image forming system 1 includes a printer controller 200 provided in the image forming apparatus and a post-processing controller 600 provided in the sheet processing apparatus 1000. The printer controller 200 and the post-processing controller 600 are connected to each other by a communication cable 250.

The printer controller 200 includes a CPU 201 for carrying out basic control of the image forming apparatus 10, a RAM 205 in which a control program and an application program are stored, and a RAM 202 functioning as a work area in which processing of the control program is to be carried out. Further, the printer controller 200 includes an input/output port IC 203, communication/Fs 204 and 209, an image memory portion 206, an image processing portion 207, an operating portion 208, an inspection processing portion 210, a timer 220, and a battery 240. Incidentally. I/F is abbreviation of an interface.

The image memory portion 206 accumulates image data. The image processing portion 207 processes an image signal converted to an electric signal. The inspection processing portion 210 as an obtaining (acquiring) portion performs inspection processing described later and obtains (acquires) a result of the inspection processing. The battery 240 is connected to the RAM 202, and data in the RAM 202 is held even when a main switch of the image forming apparatus 10 is turned off.

The inner/output port I/C 203 is connected to the CPU 201 through an address bus and a data bus. In accordance with contents of the control program stored in the ROM 205, the CPU 201 inputs signals of sensors or the like (not shown) and outputs control signals to various loads (not shown) such as a motor, and a clutch, by the input/output port V/C 203. Then, the CPU 201 outputs the control signals and thus carries out pieces of control such as sheet feeding and image formation on the sheet.

To the inspection processing portion 210, the sheet reading sensors 121 for reading the front surface and the back surface of the sheet after the image formation are connected. The inspection processing portion 210 receives image data of an image signal converted to an electric signal and compares the image data with a reference image (data), and thus performs inspection processing as to whether the image data is good image data or defective image data. As the reference image (data), for example, an original image data accumulated in the image memory portion 206 is used.

The CPU 201 is connected to the operating portion 20 and carries out display control and key input in the operating portion 20. A user is capable of instructing the CPU 201 to perform an operation in an operation mode of the image forming apparatus 10 and switching of display in the operating portion 20. Further, the CPU 201 is capable of display control by causing a display portion such as a liquid crystal panel of the operating portion 20 to display an operation state of the image forming apparatus 10 and an operation mode set through key input.

Further, the printer controller 200 is connected to information processing apparatus 800 through the communication I/F 209. The CPU 201 accumulates image data, transmitted from the information processing apparatus 800, in the image memory portion 206 and performs image processing by the image processing portion 207. Further, the CPU 201 transmits and receives parallel signals between itself and the post-processing controller 600 through the communication/F 204 and the communication cable 250 which are used as a communication portion, and thus carries out control relating to the sheet processing apparatus 1000, such as delivery of the sheet and a state display.

Here, information contained in the parallel signals for establishing communication of the CPU 201 with the post-processing controller 600 will be described. The parallel signals include pieces of information for providing an instruction to turn on and off of the operation of the post-processing controller 600, such as a discharge timing signal 401, a final sheet signal 402, an operation instruction signal 403, a sheet reception response signal 404, a final sheet processing end signal 405, and the like which are described later. Thus, the CPU 201 carries out not only the image formation but also processing relating to the constitution of the image forming system.

The post-processing controller 600 includes a CPU 601 for carrying out basic control of the sheet processing apparatus 1000, a RAM 605 in which a control program and an application program are stored, and a RAM 602 functioning as a work area in which processing of the control program is to be carried out. Further, the post-processing controller 600 includes an input/output port 603, a communication I/F 604, and a timer 620.

The inner/output port I/C 603 is connected to the CPU 601 through an address bus and a data bus. In accordance with contents of the control program stored in the ROM 605, the CPU 601 inputs signals of sensors or the like (not shown) and outputs control signals to various loads (not shown) such as a motor, and a clutch, by the input/output port I/C 603. Then, the CPU 601 outputs the control signals and thus carries out pieces of control such as sheet feeding and post-processing of the sheet.

The CPU 601 transmits and receives the parallel signals between itself and the printer controller 200 through the communication I/F 604 and the communication capable 250 and thus carries out operation control of an inline post-processing function such as delivery and post-processing of the sheet fed from the image forming apparatus 10. Further, the CPU 601 counts that the sheet delivered from the image forming apparatus 10 corresponds to which sheet counted from a first sheet of a sheet bundle subjected to the display, and the number of the sheet count is stored as the number of sheets delivered, in the RAM 602.

[Signal Line of Communication Cable]

Figure 3:
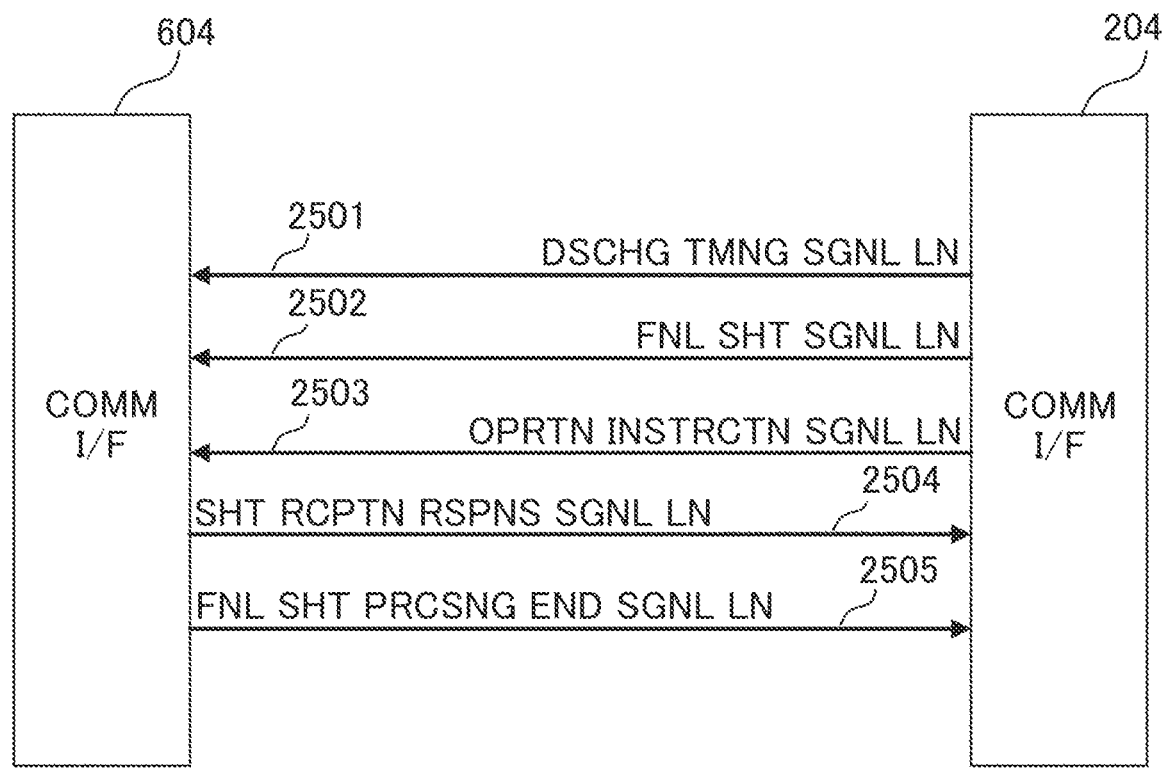
FIG. 3 is a sectional view showing signal lines of communication cables.

Next, with reference to FIG. 3, signal lines of the communication cable 250, of a parallel communication type, connecting the communication L/Fs 204 and 604 will be described. As shown in FIG. 3, the communication cable 250 includes, as output signal lines from the image forming apparatus 10 to the sheet processing apparatus 1000, a discharge timing signal line 2501, a final sheet signal line 2502 and an operation instruction signal line 2503. Further, the communication cable 250 includes, as signal lines for sending signals from the sheet processing apparatus 1000 to the image forming apparatus 10, a sheet reception response signal line 2504 and a final sheet processing end signal line 2505. A function and timing of signals transmitted by each of the above-described five signal lines will be described later.

[Details of Signals]

Figure 4:
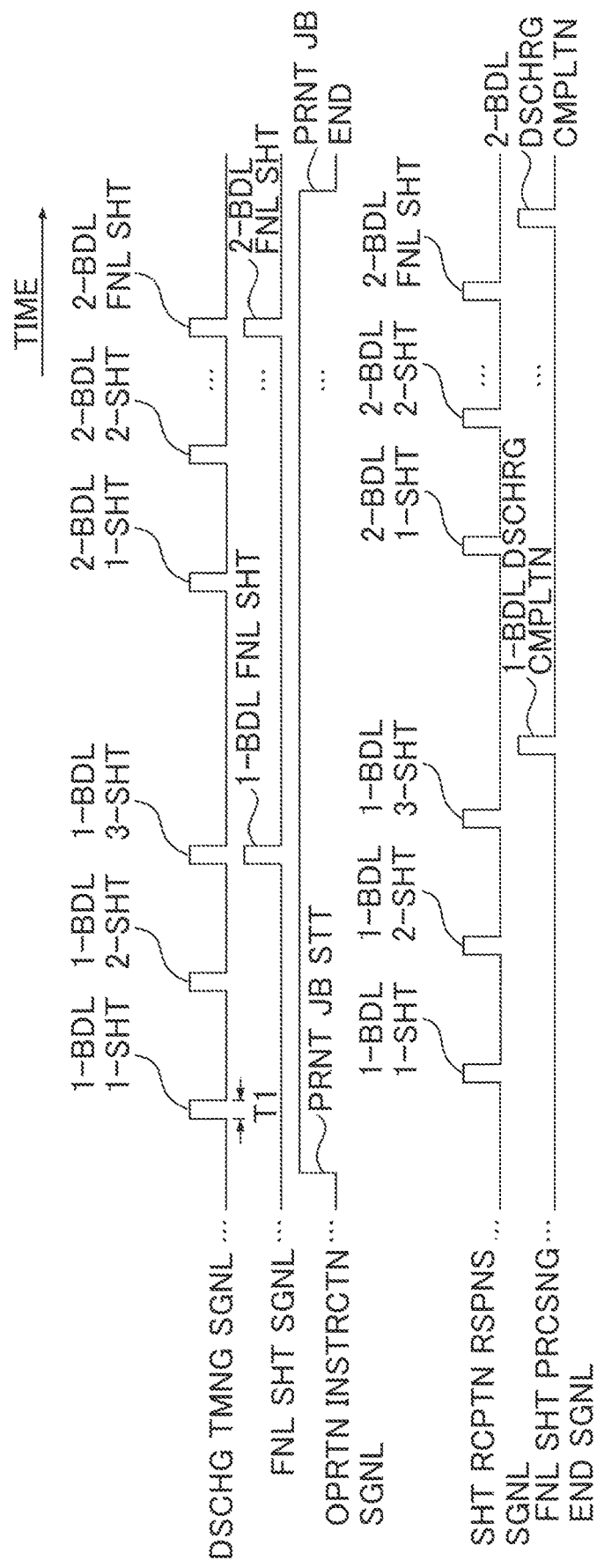
FIG. 4 is a timing chart showing a change in respective signals.

Next, with reference to FIG. 4, details of the signals sent by the respective signal lines of the communication cable 250 will be described. FIG. 4 is a timing chart showing a change in each of the respective signals transferred between the image forming apparatus 10 and the sheet processing apparatus according to this embodiment.

First, the function of each of the signals will be described. As shown in FIG. 4, the discharge timing signal 401 is a signal controlled by the image forming apparatus 10, and is transmitted to the sheet processing apparatus 1000 through the discharge timing signal line 2501 as the above-described signal line. The discharge timing signal 401 is a signal used for generating timing when a sheet reception preparatory processing is started by rotating the inlet roller pair 1001 at a sheet reception speed by the sheet processing apparatus 1000 or by the like operation. For this reason, a sheet position and signal issuance timing are determined in advance between the image forming apparatus 10 and the sheet processing apparatus 1000. In this embodiment, on the basis of a detection result of the outlet sensor 141, the discharge timing signal 401 is issued at timing when a leading end of the sheet reaches a sheet reception port of the sheet processing apparatus 1000. That is, the discharge timing signal 401 shows discharge timing of the sheet from the image forming apparatus 10.

The final sheet signal 402 is a signal controlled by the image forming apparatus 10 and is transmitted to the sheet processing apparatus 1000 by the final sheet signal line 2502 as the signal line. The final sheet signal 402 is a signal showing that the sheet delivered from the image forming apparatus 10 to the sheet processing apparatus 1000 is a final sheet of a bundle (or set) of sheets (sheet bundle). i.e., final paper. On the basis of the final sheet signal 402, the sheet processing apparatus 1000 discriminates whether or not the post-processing of the sheet bundle held in the sheet accommodating portion 1003 can be carried out.

The operation instruction signal 403 is a signal controlled by the image forming apparatus 10 and is transmitted to the sheet processing apparatus 1000 by the operation instruction signal line 2503. The operation instruction signal 403 is a signal for notifying the sheet processing apparatus 1000 of a start and an end of a job by the image forming apparatus 10. The sheet processing apparatus 1000 carries out an initialization processing for putting the sheet processing apparatus 100 in a post-processing enable state through rising edge detection of the operation instruction signal 403 and carries out operation stop processing of the sheet processing apparatus 1000 through falling edge detection of the operation instruction signal 403.

The sheet reception response signal 404 is a signal controlled by the sheet processing apparatus 1000 and is transmitted to the image forming apparatus 10 by the sheet reception response signal line 2504. The sheet reception response signal 404 is a signal for outputting that necessary processing for the sheet received by the sheet processing apparatus 1000 is ended. The processing for the sheet refers to, for example, the sheet accommodation into the sheet accommodating portion 1003 and the discharge of the sheet to the second discharge tray 1014 which are described above.

The final sheet processing end signal 405 is a signal controlled by the sheet processing apparatus 1000 and is transmitted to the image forming apparatus 10 by the final sheet processing end signal line 2505. The final sheet $1o$ processing end signal 405 is a signal for outputting that the sheet processing apparatus 1000 receives the final sheet signal 402 and execution of post-processing of the sheet bundle is ended. The post-processing of the sheet bundle refers to, for example, the binding processing and the sorting processing which are described above. The image forming apparatus 10 discriminates that all the processes of the job are ended through reception of the final sheet processing end signal 405 for the final sheet bundle of the job, and turns off the above-described operation instruction signal 403.

The discharge timing signal 401, the final sheet signal 402, the sheet reception response signal 404 and the final sheet processing end signal 405 are notification through pulse signals and define in advance that a pulse width is made T1 or more between the image forming apparatus 10 and the sheet processing apparatus 1000. The operation instruction signal 403 is notification through a signal level and means during job execution at High (level) and during job non-execution at LOW (level).

Incidentally, all the pulse widths shown in FIG. 4 are unified into the pulse width T1, but may also be not unified.

Next, change timing of the above-described five signals during the job will be described using FIG. 4. The CPU 201 of the image forming apparatus 10 starts print job processing when a print job is instructed from the operating portion 20, the information processing apparatus 800, or the like. When the CPU 201 starts the job, the CPU 201 turns on the operation instruction signal 403 through the communication I/F 204. Then, the CPU 601 of the sheet processing apparatus 1000 detects a rising edge of the operation instruction signal 403 through the communication I/F 604 and starts initialization processing such as home position detect of a various mechanism and a start of drive of a motor.

Then, the image forming apparatus 10 discharges the sheet after the sheet is subjected to image formation and inspection processing. At this time, the CPU 201 outputs the discharge timing signal 401 through the communication I/F 204. The discharge timing signal 401 is defined as described above such that the discharge timing signal 401 is issued at timing when the leading end of the sheet reaches the sheet reception port (inlet) of the sheet processing apparatus 1000, so that the CPU 201 generates the discharge timing signal 401 on the basis of this timing.

Specifically, after the outlet sensor 141 connected to the input/output port IC 203 detects the sheet leading end, the CPU 201 is on stand-by for a time required for feeding the sheet from the outlet sensor 141 to the discharge opening (outlet) of the image forming apparatus 10, by using the timer 220 and then outputs the discharge timing signal 401. A stand-by time is obtained from, for example, a length from the outlet sensor 141 to the discharge opening of the image forming apparatus 10 and a sheet feeding speed. In addition, in the case where the sheet is a final sheet of the bundle (sheet bundle), the CPU 201 outputs the final sheet signal 402 through the communication I/F.

The sheet processing apparatus 1000 starts sheet reception processing by using reception of the discharge timing signal 401 as a trigger. When accommodation of the sheet, received from the image forming apparatus 10, in the sheet accommodating portion is completed, the sheet processing apparatus 1000 outputs the sheet reception response signal 404 to the image forming apparatus 10.

Further, in the case where the sheet processing apparatus 1000 receives the final sheet signal 402 simultaneously with the discharge timing signal 401, the CPU 601 discriminates that the sheet is the final sheet of the sheet bundle. After completion of the reception of the sheet, the sheet bundle in the sheet accommodating portion 1003 is subjected to the post-processing. Then, when discharge of the sheet bundle to the first discharge tray 1012 or the second discharge tray 1014 through the feeding belt 1011 or the feeding belt 1013 is completed, the CPU 601 of the sheet processing apparatus 1000 outputs the final sheet signal 405 to the image forming apparatus 10.

When the CPU 201 of the image forming apparatus 10 receives the final sheet processing end signal 405 through the communication I/F, the CPU 201 not only turns off the operation instruction signal 403 but also stops the operation of the image forming apparatus 10 by performing stop processing of the operation of the image forming apparatus 10. Further, when the CPU 601 of the sheet processing apparatus 1000 detects the falling edge of the operation instruction signal 403 through the communication I/F 604, the CPU 601 discriminates that the job is ended and stops the operation through the stop processing.

[Inspection Processing]

Part (a) of FIG. 5 is a schematic view showing a reference image in this embodiment, and parts (b) to (d) are schematic views each showing an image formed on the sheet. As shown in part (a) of FIG. 5, as a reference image 500, an original image accumulated in the image memory portion 206 is used. The inspection processing portion 210 performs inspection processing by comparing the reference image 500 read from the image memory portion 206 with image data on the sheet read by the sheet reading sensor 121. As shown in part (b) of FIG. 5, in the case where an image 501 is obtained from the sheet reading sensor 121, when compared with the reference image 5X), the image 501 coincides with the reference image 500, so that the inspection processing portion 210 discriminates that the image 501 is a good image.

On the other hand, as shown in part (c) of FIG. 5, when an image 502 is compared with the reference image 500, a portion "D" is contaminated, so that the inspection processing portion 210 discriminates that the image 502 is a defective image. Similarly, as shown in part (d) of FIG. 5, when an image 503 is compared with the reference image 500, a portion "D" partially lacks, so that the inspection processing portion 210 discriminates that the image 503 is a defective image. That is, the inspection processing portion 210 discriminates that the image 501 has no image defect and that the images 502 and 503 have the image defect. Incidentally, the inspection processing portion 210 may also be constituted so as to obtain a result of inspection processing performed by another apparatus other than the image forming apparatus 10.

[Image Forming Operation]

FIG. 6 is a flowchart showing an operation relating to transmission and reception of signals of the image forming apparatus 10 according to this embodiment. Incidentally, the flowchart shown in FIG. 6 shows the operation relating to the transmission and reception of the signals of the image forming apparatus 10 in the case where the inspection processing by the inspection processing portion 210 is not performed. First, as shown in FIG. 6, the CPU 201 of the discharge printer controller 200 turns on the operation instruction signal 403 through the communication I/F 204 (step S1). Next, the CPU 201 awaits until the leading end of the sheet fed reaches the discharge opening of the image forming apparatus 10 (step S2). For example, the CPU 201 can know whether or not the leading end of the sheet reaches the discharge opening, by the outlet sensor 141 connected to the input/output port IC 203. Then, in the case where discrimination that the sheet leading end reaches the discharge opening of the image forming apparatus 10 is made (step S2: Yes), the CPU 201 outputs the discharge timing signal 401 through the communication I/F 204 (step S3).

Subsequently, the CPU 201 discriminates whether or not the sheet is the final sheet of the bundle (step S4). This discrimination is realized by, for example, control information stored in the RAM 202, such as the number of sheets in a print job, a sequential number from a start of the job on the sheet of which leading end is positioned at the discharge opening, or the like information. In the case where the sheet is discriminated as the final sheet of the sheet bundle (step S4: Yes), the CPU 201 outputs the final sheet signal 402 through the communication I/F (step S5). On the other hand, in the case where the CPU 201 discriminates that the sheet is not the final sheet of the sheet bundle (step S4: No), the CPU 201 does not provide an instruction to output the final sheet signal 402 through the communication I/F.

Then, the CPU 201 discriminates whether or not the sheet is the final sheet of the job (step S6). This discrimination is realized by, for example, control information stored in the RAM 202, such as the number of sheets in the print job, the number of jobs, the sequential number from the start of the job on the sheet of which leading end is positioned at the discharge opening, or the like information. In the case where the sheet is discriminated as the final sheet of the job (step S6: Yes), the CPU 201 awaits reception of the final sheet processing end signal 405 through the communication I/F 204 (step S7). In the case where the CPU 201 receives the final sheet processing end signal 405 (step S7: Yes), the CPU 201 turns off the operation instruction signal 403 (step S8), and then ends the flow. On the other hand, in the step S6, in the case where discrimination that the sheet is not the final sheet of the job (step S6: No), the CPU 201 returns to the processing of the step S2.

FIG. 7 is a flowchart showing an operation relating to transmission and reception of signal of the sheet processing apparatus 1000 according to this embodiment. Incidentally, the flowchart shown in FIG. 7 shows the operation relating to the transmission and reception of the signals of the sheet processing apparatus 1000 in the case where the inspection processing by the inspection processing portion 210 is not performed. First, as shown in FIG. 7, the CPU 601 discriminates whether or not the operation instruction signal 403 is turned on through the communication I/F 604 (step S11). In the case where the operation instruction signal 403 is turned on is made step S11: Yes), the CPU 601 performs initialization processing (step S12). Here, the initialization processing refers to drive control of the inlet roller pair 1001 for receiving the sheet discharged from the image forming apparatus 10 or the like processing.

Subsequently, the CPU 601 discriminates whether or not the discharge timing signal 401 is received (step S13). In the case where discrimination that the discharge timing signal 401 is received is made (step S13: Yes), the CPU 601 performs sheet accommodating processing (step S14). Then, the CPU 601 discriminates whether or not the sheet accommodating processing is ended (step S15). Incidentally, an inlet portion of the sheet accommodating portion 1003 is provided with the accommodating portion inlet sensor 1015 which is turned on when the sheet reaches the sensor 1015. The CPU 601 discriminates that the sheet accommodating processing is ended on the basis of a lapse of a time, corresponding to a distance from a detecting position of the accommodating portion inlet sensor 1015 to the positioning member 1004, from turning-on the accommodating portion inlet sensor 1015.

In the case where discrimination that the sheet accommodating processing is ended is made (step S15: Yes), the CPU 60 outputs the sheet reception response signal 404 to the image forming apparatus 10 (step S16). Subsequently, the CPU 601 discriminates whether or not the final sheet signal 402 is received (step S17). In the case where discrimination that the final sheet signal 402 is not received (step S17: No), the CPU 601 returns to the processing of the step S13. On the other hand, in the case where discrimination that the final sheet signal 402 is received is made (step S17: Yes), the CPU 601 performs the post-processing in a bundle unit (step S18). To the post-processing in the bundle unit, for example, in the case of saddle stitching bookmaking, the folding processing and binding processing with a staple correspond. Subsequently, the CPU 601 outputs the sheet bundle from the sheet accommodating portion 1003 to the first discharge tray 1012 or the second discharge tray 1014 and outputs the final sheet signal 405 to the image forming apparatus 10 (step S19).

Subsequently, the CPU 601 discriminates whether or not the discharge timing signal 401 is received (step S20). In the case where discrimination that the discharge timing signal 401 is received is made (step S20: Yes), the CPU 601 returns to the processing of the step S14. On the other hand, in the case where discrimination that the discharge timing signal 401 is received is made (step S20: No), the CPU 601 discriminates whether or not the operation instruction signal 403 is turned off (step S21). In the case where discrimination that the operation instruction signal 403 is turned on is made (step S21: No), the CPU 601 returns to the processing of the step S20.

Further, in the case where discrimination that the operation instruction signal 403 is turned off is made (step S21: Yes), the CPU 601 performs step processing (step S22), and then ends the flow. Here, the step processing refers to a stop of drive of the inlet roller pair 1001 or the like processing.

[Superposition of Inspection Result on Discharge Timing Signal]

Parts (a) to (c) of FIG. 8 are timing charts for illustrating a means for superposing an inspection result in a sheet unit on the discharge timing signal 401 in this embodiment and a method of interpreting the inspection result from the discharge timing signal 401 by the sheet processing apparatus 1000. Specifically, part (a) of FIG. 8 is the timing chart showing a waveform of the discharge timing signal 401 outputted from the image forming apparatus 10. Parts (b) and (c) of FIG. 8 are the timing charts for illustrating interpretation on the discharge timing signal 401 received by the sheet processing apparatus 1000. The discharge timing signal 401 includes two kinds consisting of discharge timing signals 401a and 401b described later.

In this embodiment, the CPU 201 makes an inquiry of the inspection processing portion 210 about an inspection result of the sheet when the discharge timing signal 401 is outputted. Then, in the case where the inspection processing is "OK", i.e., in the case where the inspection result is a good inspection result and there is no image defect, as shown in part (a) of FIG. 8, the CPU 201 outputs the discharge timing signal 401a with a pulse width T1 as a first pulse width to the sheet processing apparatus 1000 through the communication I/F. That is, the discharge timing signal 401a includes a first waveform.

On the other hand, in the case where the inspection result is "NG", i.e., in the case where the inspection result is a defective inspection result and the image defect occurs, the CPU 201 outputs the discharge timing signal 401b with a pulse width T2 as a second pulse width to the sheet processing apparatus 1000 through the communication I/F 204. The pulse width T2 is larger than the pulse width T1, and therefore, the discharge timing signal 401b includes a second waveform different from the first waveform. For example, the signal outputted from the image forming apparatus 10 includes the discharge timing signal 401a corresponding to a first sheet, the discharge timing signal 401b corresponding to a second sheet, and the discharge timing signal 401a corresponding to a third sheet. This output signal is a signal when printing of three sheets per bundle is carried out and shows that inspection results on the first sheet and the third sheet and "OK" and that an inspection result on the second sheet is "NG".

Subsequently, by using parts (b) and (c) of FIG. 8, the interpretation of the inspection result by the sheet processing apparatus 1000 will be described. When the discharge timing signal 401 is outputted from the image forming apparatus 10, first, the CPU 601 of the sheet processing apparatus 1000 detects a rising edge of the discharge timing signal 401 through the communication IF 604. Then, the CPU 601 conducts sampling of a logical value of the discharge timing signal 401 at timing whben a time of (T1+T2)/2 has elapsed from detection timing of the rising edge.

In the case where a result of the sampling is "Low", the inspection result is "OK", and in other cases, the inspection result is "NG". For example, as shown in part (b) of FIG. 8, in the case where the discharge timing signal 401a with the pulse width T1 is received, the sampling result becomes "Low", so that the CPU 601 interprets the inspection result of the sheet as "OK". On the other hand, as shown in part (c)

of FIG. 8, in the case where the discharge timing signal 401b with the pulse width T2 is received, the sampling result becomes "High", so that the CPU 601 interprets the inspection result of the sheet as "NG".

Incidentally, in this embodiment, setting is made so that the pulse width T1 is smaller than the pulse width T2 (T1<T2), but may also be made so that the pulse width T1 is larger than the pulse width T2 (T1>T2). Further, in the case of T1>T2, when the sampling result is "High", the inspection result is interpreted as "OK". Accordingly, "when the sampling result is "Low" and T1<T2 holds or when the sampling results is "High" and T1>T2 holds" is a condition for interpreting the inspection result as "OK".

Further, in this embodiment, sampling of the logical value of the discharge timing signal 401 is conducted at timing of a lapse of the time of (T1+T2)/2 from the detection timing of the rising edge, but the present invention is not limited thereto. For example, the sampling of the logical value of the discharge timing signal 401 may also be conducted at timing of a lapse of a time a from the detection timing of the rising edge. The time a is longer than a time corresponding to the pulse width T1 and is shorter than a time corresponding to the pulse width T2.

[Output Processing of Discharge Timing Signal on the Basis of Inspection Result]

FIG. 9 is a flowchart showing an operation relating to transmission and reception of signals of the image forming apparatus 10 in the case where the inspection processing is performed. Particularly, as regards the flowchart of FIG. 9, steps S32 to S36 are added to the flowchart of FIG. 6, so that processing in which the discharge timing signal depending on the inspection result is added.

First, as shown in FIG. 9, the CPU 201 of the printer controller 200 turns on the operation instruction signal 403 through the communication I/F 204 (step S31). Then, the CPU 201 discriminates whether or not a trailing end of the sheet passes through the sheet reading sensor 121 (step S32). In the case where discrimination that the sheet trailing end passes through the sheet reading sensor 121 is made (step S32: Yes), the CPU 201 obtains the inspection result from the inspection processing portion 210 (step S33).

Incidentally, as described above with reference to FIG. 1, the feeding path 124 is longer than the maximum-length sheet feedable by the image forming apparatus 10. Accordingly, the image forming apparatus 10 is capable of ending the reading by the sheet reading sensor 121 and the inspection processing before the sheet leading end reaches the discharge opening of the image forming apparatus 10.

Next, the CPU 201 discriminates whether or not the obtained inspection result is "OK" (step S34). In the case where the inspection result is "OK" (step S34: Yes), the CPU 201 sets the pulse width of the discharge timing signal at T1 (step S35). In the case where the inspection result is "NG" (step S34: No), the CPU 201 sets the pulse width of the discharge timing signal at T2 (step S36).

Then, the CPU 201 awaits that the sheet corresponding to the inspection result obtained in the step S33 reaches the discharge opening of the image forming apparatus 10 (step S37). In the case where discrimination that the sheet leading end reaches the discharge opening of the image forming apparatus 10 is made (step S37: Yes), the CPU 201 outputs the discharge timing signal 401 through the communication I/F 204 (step S38). At this time, the pulse width of the discharge timing signal 401 becomes a width set in the step S35 or S36. That is, in the step S38, when the inspection result of the sheet is "OK", the discharge timing signal 401a (part (b) of FIG. 8) is outputted, and when the inspection result of the sheet is "NG", the discharge timing signal 401b (part (c) of FIG. 8) is outputted.

Subsequently, the CPU 201 discriminates whether or not the sheet is the final sheet of the sheet bundle (step S39). In the case where the sheet is discriminated being the final sheet of the sheet bundle (step S39: Yes), the CPU 201 outputs the final sheet signal 402 toner the communication I/F (step S40). On the other hand, in the case where the sheet is discriminated as being not the final sheet of the sheet bundle (step S39: No), the CPU 201 does not provide an instruction to output the final sheet signal 402 through the communication I/F 204.

Next, the CPU 201 discriminates whether or not the sheet is the final sheet of the job (step S41). In the case where the sheet is discriminated as being the final sheet of the job (step S41: Yes), the CPU 201 awaits reception of the final sheet processing end signal 405 through the communication I/F 204 (step S42). In the case where the final sheet processing end signal 405 is received (step S42: Yes), the CPU 201 turns off the operation instruction signal 403 (step S43) and ends the flow. On the other hand, in the step S41, in the case where the sheet is discriminated as being not the final sheet of the job (step S41: No), the CPU 201 returns to the processing of the step S32.

[Sorting Processing of Products in Bundle Unit on the Basis of Discharge Timing Signal]

FIGS. 10 and 11 are flowcharts for illustrating sorting processing of products in bundle unit in accordance with the discharge timing signal by the sheet processing apparatus 1000. Particularly, as regards the flowcharts of FIGS. 10 and 11, steps S53, S55 to S58, and S64 to S67 are added to the flowchart of FIG. 7, so that the sorting processing depending on the inspection result is performed.

First, as shown in FIG. 10, the CPU 601 of the sheet processing apparatus 1000 discriminates whether or not the operation instruction signal 403 is turned on through the communication I/F 604 (step S51). In the case whbere the operation instruction signal 403 is discriminated as being turned on (step S51: Yes), the CPU 601 performs initialization processing (step S52). Then, the CPU 601 sets a "good (sheet) bundle flag" (step S53). The "good bundle flag" is a variable indicating whether or not the product is a good product as the (sheet) bundle and is used for sorting the products as the bundles. Entirety of the "good bundle flag" is stored in, for example, the RAM 602 of the post-processing controller 600. In the step S52, by setting the "good bundle flag", a bundle of the sheets received from now on by the sheet processing apparatus 1000 can be treated as a good bundle (product) in advance, and at a time when a defective sheet is received, a bundle including the defective sheet can be treated as a defective bundle (product).

Subsequently, the CPU 601 awaits detection of rise of the discharge timing signal 401 (step S54). In the case where the rise of the discharge timing signal 401 is detected (step S54: Yes), the CPU 601 awaits for a period of (T1+T2)/2 (step S55). Then, the CPU 601 conducts sampling of a logical value of the discharge timing signal 401 (step S56).

Next, the CPU 601 discriminates whether or not the sampled logical value of the discharge timing signal 401 is "Low" (step S57). In the case where the result of the sampling is "Low" (step S57: Yes), the sequence goes to a step S59. On the other hand, the result of the sampling is not "Low" (step S57: No), the CPU 601 clears the "good bundle flag" (step S58), and the sequence goes to a step S59.

Subsequently, the CPU 601 performs sheet accommodating processing (step S59). Then, the CPU 601 discriminates whether or not the sheet accommodating processing is ended similarly as in the step S15 of FIG. 7 (step S60). The CPU 60 discriminates that the sheet accommodating processing ends, on the basis of a lapse of a time from the turning-on of the accommodating portion inlet sensor 1015 until the sheet passes through a distance from the detection position of the accommodating portion inlet sensor 1015 to the positioning member 1014.

In the case where discrimination that the sheet accommodating processing ends (step S60: Yes), the CPU 601 outputs the sheet reception response signal 404 to the image forming apparatus 10 (step S61). Subsequently, the CPU 601 discriminates wihether or not the final sheet signal 402 is received (step S62). In the case where the final sheet signal 402 is not detected (step S62: No), the CPU 601 returns to the step S54. On the other hand, in the case where the final sheet signal 402 is received (step S62: Yes), the CPU 601 performs the post-processing in bundle unit as shown in FIG. 11 (step S63).

Next, the CPU 601 discriminates whether or not the "good bundle flag" is set (step S64). In the case where the "good bundle flag" is set (step S64: Yes), the CPU 601 provides an instruction to discharge loads such as a motor and a roller which are provided beyond the input/output IC 603 so that the product is discharged onto the first discharge tray 1012 (step S65). That is, the sheet is subjected to first processing. Further, in the case where the "good bundle flag" is not set (step S64: No), the CPU 601 provides an instruction to discharge loads such as a motor and a roller so that the product is discharged onto the second discharge tray 1014 (step S66). That is, the sheet is subjected to second processing different from the first processing.

Next, the CPU 601 sets the "good bundle flag" (step S67), and outputs the final sheet processing end signal 405 to the image forming apparatus 10 (step S68). Subsequently, the CPU 601 discriminates whether or not rise of the discharge timing signal 401 is detected (step S69). In the case where discrimination that the rise of the discharge timing signal 401 is detected is made (step S69: Yes), the CPU 601 returns to the step S55. On the other hand, discrimination that the rise of the discharge timing signal 401 is not detected is made (step S69: No), the CPU 601 discriminates whether or not the operation instruction signal 403 is turned off (step S70).

In the case where discrimination that the operation instruction signal 403 is turned on is made (step S70: No), the CPU 601 returns to the step S69. Further, in the case where discrimination that the operation instruction signal 403 is turned off is made, (step S70: Yes), the CPU 601 performs stop processing (step S71), and ends the flow. Here, the stop processing refers to a stop of drive of the inlet roller pair 1001 or the like processing.

As described above, in this embodiment, in the case where the inspection result is "OK", the discharge timing signal 401a with the pulse width T1 is outputted to the sheet processing apparatus 1000 through the communication I/F 204 of the image forming apparatus 10. Further, in the case where the inspection result is "NG", the discharge timing signal 401b with the pulse width T2 (T2>T1) is outputted to the sheet processing apparatus 1000 through the communication/F 204 of the image forming apparatus 10. That is, depending on the inspection result, the discharge timing signals different in waveform are outputted to the sheet processing apparatus 1000 through the communication I/F 204 via the discharge timing signal line 2501.

Further, in the case where the sheet processing apparatus 1000 receives the discharge timing signal 401aa, the sheet processing apparatus 1000 discharges the sheet which is the product to the first discharge tray 1012, and in the case where the sheet processing apparatus 1000 receives the discharge timing signal 401b, the sheet processing apparatus 1000 discharges the sheet to the second discharge tray 1014. Thus, by sending the discharge timing signal with the waveform depending on the inspection result, the discharge timing signal can include two pieces of information of "that the sheet is discharged from the image forming apparatus 10" and "OK/NG of the inspection result".

For this reason, in addition to the discharge timing signal line 2501, there is no need to prepare a dedicated signal line for transmitting the "OK/NG of the inspection result", so that there is no need to provide the image forming apparatus 10 and the sheet processing apparatus 1000 with ports for connecting the signal line. Therefore, it is possible to obtain the image forming apparatus 10 and the image forming system which are improved in degree of freedom of a condition of apparatuses in an in-line constitution while suppressing the number of signals of the parallel/F.

Incidentally, in the step S63 of FIG. 11, the flow in which the post-processing is always performed without depending on the inspection result is employed, but the present invention is not limited thereto. For example, a constitution in which the step S58, the bundle for which the "good bundle flag" is cleared, i.e., the bundle including the inspection NG sheet is not subjected to the post-processing may also be employed.

Further, in this embodiment, the inspection OK sheet is subjected to discharge processing to the first discharge tray 1012 and the inspection NG sheet is subjected to discharge processing to the second discharge tray 1014, but the present invention is not limited thereto. That is, when the processing for the inspection OK sheet and the processing for the inspection NG sheet are different from each other, the processing performed may also be set arbitrarily.

Second Embodiment

Next, although a second embodiment will be described, the second embodiment is constituted by changing only the waveform of the discharge timing signal and the method of interpreting the inspection result from the discharge timing signal by the sheet processing apparatus 1000 in the first embodiment. For this reason, constituent elements similar to those in the first embodiment will be omitted from illustration or will be described by adding the same reference numerals or symbols in the drawings.

[Superposition of Inspection Result on Discharge Timing Signal]

Parts (a) to (c) of FIG. 12 are timing charts for illustrating a means for superposing an inspection result in a sheet unit on the discharge timing signal 421 in this embodiment and a method of interpreting the inspection result from the discharge timing signal 421 by the sheet processing apparatus 1000. Specifically, part (a) of FIG. 12 is the timing chart showing a waveform of the discharge timing signal 421 outputted from the image forming apparatus 10. Parts (b) and (c) of FIG. 12 are the timing charts for illustrating interpretation on the discharge timing signal 421 received by the sheet processing apparatus 1000. The discharge timing signal 421 includes two kinds consisting of discharge timing signals 421a and 421b described later.

A period T3 in parts (a) to (c) of FIG. 12 shows a period in which the number of pulses is counted by the sheet processing apparatus 1000, and a storing point of the period T3 is rise of a first pulse corresponding to each of the sheets.

A cyclic period T4 shows a cyclic period of sheet discharge, and a relationship of T4>T3 is satisfied.

The CPU 201 (FIG. 2) makes an inquiry of the inspection processing portion 210 about an inspection result of the sheet when the discharge timing signal 421 is outputted. Then, in the case where the inspection processing is "OK", i.e., in the case where the inspection result is a good inspection result and there is no image defect, as shown in part (a) of FIG. 12, the CPU 201 outputs the discharge timing signal 421a with a first pulse number as the pulse number to the sheet processing apparatus 1000 through the communication I/F. That is, the discharge timing signal 421a includes a first waveform.

On the other hand, in the case where the inspection result is "NG", i.e., in the case where the inspection result is a defective inspection result and the image defect occurs, the CPU 201 outputs the discharge timing signal 421b with a second pulse number as the pulse number to the sheet processing apparatus 1000 through the communication I/F 204. The discharge timing signal 421b is different in pulse number from the discharge timing signal 421a, and therefore, the discharge timing signal 421b includes a second waveform different from the first waveform. For example, the signal outputted from the image forming apparatus 10 includes the discharge timing signal 421a corresponding to a first sheet, the discharge timing signal 421b corresponding to a second sheet, and the discharge timing signal 421a corresponding to a third sheet. This output signal is a signal when printing of three sheets per bundle is carried out and shows that inspection results on the first sheet and the third sheet and "OK" and that an inspection result on the second sheet is "NG".

Subsequently, by using parts (b) and (c) of FIG. 12, the interpretation of the inspection result by the SHEET PROCESSING APPARATUS 1000 will be described. When the discharge timing signal 421 is outputted from the image forming apparatus 10, first, the CPU 601 of the sheet processing apparatus 1000 detects a rising edge of the discharge timing signal 401 through the communication/F 604. Then, the CPU 601 counts the number of occurrences of the rise of the pulse from detection timing of the rising edge to a lapse of the period T3 (including the starting point of the period T3).

In the case of a single (one) rising edge, the inspection result is "OK", and in the case of two rising edges, the inspection result is "NG". For example, as shown in part (b) of FIG. 12, in the case where the discharge timing signal 421a with the pulse number of 1 is received, the CPU 601 interprets the inspection result of the sheet as "OK". On the other hand, as shown in part (c) of FIG. 12, in the case where the discharge timing signal 421b with the pulse number of 2 is received, the CPU 601 interprets the inspection result of the sheet as "NG". By such a constitution, an effect similar to the effect of the first embodiment is achieved.

Incidentally, in this embodiment, setting is made so that the pulse number when the inspection result is "OK" is 1 and that the pulse number when the inspection result is "NG" is 2, but the pulse number in the period T3 may also be set arbitrarily when the inspection result can be discriminated. Further, in this embodiment, the number of the rising edges of the pulse is counted, but the pulse number may also be recognized by counting the number of falling edges of the pulse.

Third Embodiment

Next, although a second embodiment will be described, the second embodiment is constituted by changing only the waveform of the discharge timing signal and the method of interpreting the inspection result from the discharge timing signal by the sheet processing apparatus 1000 in the first embodiment. For this reason, constituent elements similar to those in the first embodiment will be omitted from illustration or will be described by adding the same reference numerals or symbols in the drawings.

[Control Block]

FIG. 13 is a block diagram for illustrating the image forming system according to this embodiment. In FIG. 13, a DAC 204a is added to the printer controller 200 and a comparator 604a is added to the post-processing controller 600 in the block diagram of FIG. 2.

The DAC 204a of the printer controller 200 is an apparatus capable of outputting a discharge timing signal 431 with an arbitrary voltage to the discharge timing signal line 2501. The CPU 201 is capable of outputting the discharge timing signal 431 with the arbitrary voltage through the DAC 204a.

Further, the comparator 604b of the post-processing controller 600 is capable of knowing whether the voltage of the discharge timing signal line 2501 is not less than or less than a reference voltage Vref (not shown). The CPU 201 is capable of knowing whether the voltage of the discharge timing signal 431 is not less than or less than the reference voltage Vref (not shown) through the comparator 604b.

[Superposition of Inspection Result on Discharge Timing Signal]

Parts (a) to (c) of FIG. 14 are timing charts for illustrating a means for superposing an inspection result in a sheet unit on the discharge timing signal 431 in this embodiment and a method of interpreting the inspection result from the discharge timing signal 431 by the sheet processing apparatus 1000. Specifically, part (a) of FIG. 14 is the timing chart showing a waveform of the discharge timing signal 431 outputted from the image forming apparatus 10. Parts (b) and (c) of FIG. 14 are the timing charts for illustrating interpretation 1o on the discharge timing signal 431 received by the sheet processing apparatus 1000. The discharge timing signal 431 includes two kinds consisting of discharge timing signals 431a and 431b described later.

A maximum voltage Vmax in parts (b) and (c) of FIG. 14 shows a maximum voltage capable of being received by the sheet processing apparatus 1000, and the reference voltage Vref is a threshold for permitting the CPU 601 to discriminate, through the comparator 604a, whether the inspection result is "OK" or "NG".

The CPU 201 (FIG. 13) makes an inquiry of the inspection processing portion 210 about an inspection result of the sheet when the discharge timing signal 431 is outputted. Then, in the case where the inspection processing is "OK", i.e., in the case where the inspection result is a good inspection result and there is no image defect, as shown in part (a) of FIG. 14, the CPU 201 outputs the discharge timing signal 431a with a voltage V1 as a first voltage to the sheet processing apparatus 1000 through the communication I/F. That is, the discharge timing signal 431a includes a first waveform.

On the other hand, in the case where the inspection result is "NG", i.e., in the case where the inspection result is a defective inspection result and the image defect occurs, the CPU 201 outputs the discharge timing signal 431b with a voltage V2 as a second voltage to the sheet processing apparatus 1000 through the communication I/F 204. Here, a magnitude relationship between the respective voltages is as follows. The voltage V1 is smaller than the reference voltage Vref, and the voltage V2 is not less than the reference voltage Vref and is smaller than the maximum voltage Vmax (V1<Vref≤V2<Vmax). The discharge timing signal 431b is different in voltage from the discharge timing signal 431a, and therefore, the discharge timing signal 431b includes a second waveform different from the first waveform.

For example, the signal outputted from the image forming apparatus 10 includes the discharge timing signal 431a corresponding to a first sheet, the discharge timing signal 431b corresponding to a second sheet, and the discharge timing signal 431a corresponding to a third sheet. This output signal is a signal when printing of three sheets per bundle is carried out and shows that inspection results on the first sheet and the third sheet and "OK" and that an inspection result on the second sheet is "NG".

Subsequently, by using parts (b) and (c) of FIG. 14, the interpretation of the inspection result by the SHEET PROCESSING APPARATUS 1000 will be described. When the discharge timing signal 431 is outputted from the image forming apparatus 10, first, the CPU 601 of the sheet processing apparatus 1000 detects a rising edge of the discharge timing signal 401 through the communication/F 604. Then, the CPU 601 checks, by the comparator 604b, whether the voltage of the discharge timing signal 431 is less than the reference voltage Vref or not less than the reference voltage Vref.

In the case where the voltage of the discharge timing signal 431 is less than the reference voltage Vref, the inspection result is "OK", and in the case where the voltage of the discharge timing signal 431 is not less than the reference voltage Vref, the inspection result is "NG". For example, as shown in part (b) of FIG. 14, in the case where the discharge timing signal 431a with the voltage V1 (<Vref) is received, the CPU 601 interprets the inspection result of the sheet as "OK". On the other hand, as shown in part (c) of FIG. 14, in the case where the discharge timing signal 431b with the voltage 2 (≥Vref) is received, the CPU 601 interprets the inspection result of the sheet as "NG". By such a constitution, an effect similar to the effect of the first embodiment is achieved.

Incidentally, in this embodiment, whether the inspection result is "OK" or "NG" is discriminated by using the reference voltage Vref as the threshold, but when the inspection result can be discriminated, the voltages V1 and V2 and the reference voltage Vref may also be set in any manner. For example, the magnitude relationship between the respective voltages may also be V2<Vref≤V1.

Fourth Embodiment

Next, although a fourth embodiment will be described, the fourth embodiment is constituted by superposing an inspection result on a final sheet signal. For this reason, constituent elements similar to those in the first embodiment will be omitted from illustration or will be described by adding the same reference numerals or symbols in the drawings.

[Superposition of Inspection Result on Final Sheet Signal]

Part (a) of FIG. 15 to part (b) of FIG. 16 are timing charts for illustrating a means for superposing an inspection result in a bundle unit on the final sheet signal 402 in this embodiment. As shown in parts (a) and (b) of FIG. 15, as signals sent from the image forming apparatus 10 to the sheet processing apparatus 1000, the discharge timing signal 401 and the final sheet signal 402 exist. The discharge timing signal 401 is outputted corresponding to each of the sheets discharged from the image forming apparatus 10 to the sheet processing apparatus 1000, and the final sheet signal 402 is outputted corresponding to only the final sheet constituting the (sheet) bundle. The final sheet signal 402 includes two kinds consisting of final sheet signals 402a and 402b described later.

In this embodiment, the CPU 201 makes an inquiry of the inspection processing portion 210 about an inspection result of entirety of the bundle (sheet bundle) when the final sheet signal 402 is outputted. Then, in the case where the inspection processing of the entire bundle is "OK", i.e., in the case where the inspection result is a good inspection result and there is no image defect, as shown in part (a) of FIG. 15, the CPU 201 outputs the final sheet signal 402a with a pulse width T1 as a first pulse width to the sheet processing apparatus 1000 through the communication IF. That is, the final sheet signal 402a includes a first waveform. Incidentally, the "OK" of the inspection result of the entire bundle means the case where discrimination that there is no image defect in all the sheets constituting the sheet bundle is made.

On the other hand, in the case where the inspection result of the entire bundle is "NG", i.e., in the case where the inspection result is a defective inspection result and the image defect occurs, as shown in part (b) of FIG. 15, the CPU 201 outputs the final sheet signal 402b with a pulse width T2 as a second pulse width to the sheet processing apparatus 1000 through the communication I/F 204. The pulse width T2 is larger than the pulse width T1, and therefore, the final sheet signal 402b includes a second waveform different from the first waveform. Incidentally, the "NG" of the inspection result of the entire bundle means the case where discrimination that either one of the sheets constituting the sheet bundle has image defect is made.

Subsequently, by using parts (a) and (b) of FIG. 16, the interpretation of the inspection result by the SHEET PROCESSING APPARATUS 1000 will be described. When the final sheet signal 402 is outputted from the image forming apparatus 10, first, the CPU 601 of the sheet processing apparatus 1000 detects a rising edge of the final sheet signal 402 through the communication I/F 604. Then, the CPU 601 conducts sampling of a logical value of the final sheet signal 402 at timing when a time of (T1+T2)/2 has elapsed from detection timing of the rising edge.

In the case where a result of the sampling is "Low", the inspection result is "OK", and in other cases, the inspection result is "NG". For example, as shown in part (a) of FIG. 16, in the case where the discharge timing signal 402a with the pulse width T1 is received, the sampling result becomes "Low", so that the CPU 601 interprets the inspection result of the bundle (sheet bundle) as "OK". On the other hand, as shown in part (b) of FIG. 16, in the case where the discharge timing signal 402b with the pulse width T2 is received, the sampling result becomes "High", so that the CPU 601 interprets the inspection result of the bundle (sheet bundle) as "NG".

Incidentally, in this embodiment, setting is made so that the pulse width T1 is smaller than the pulse width T2 (T1<T2), but may also be made so that the pulse width T1 is larger than the pulse width T2 (T1>T2). Further, in the case of T1>T2, when the sampling result is "High", the inspection result is interpreted as "OK". Accordingly. "when the sampling result is "Low" and T1<T2 holds or when the sampling results is "High" and T1>T2 holds" is a condition for interpreting the inspection result as "OK".

[Output Processing of Final Sheet Signal on the Basis of Inspection Result]

FIGS. 17 and 18 are flowcharts showing an operation relating to transmission and reception of signals of the image forming apparatus 10 in the case where the inspection processing is performed. First, as shown in FIG. 17, the CPU 201 of the printer controller 200 turns on the operation instruction signal 403 through the communication I/F 204 (step S81). Then, the CPU 201 discriminates whether or not a trailing end of the sheet passes through the sheet reading sensor 121 (step S82). In the case where discrimination that the sheet trailing end passes through the sheet reading sensor 121 is made (step S82: Yes), the CPU 201 obtains the inspection result from the inspection processing portion 210 (step S83).

Next, the CPU 201 discriminates whether or not the obtained inspection result is "NG" (step S84). In the case where the inspection result is "NG" (step S84: Yes), the CPU 201 turns on a bundle inspection NG flag, and the sequence goes to a step S86. In the case where the inspection result is "NG" (step S84: No), the CPU 201 does not turn on the bundle inspection NG flag, and the sequence goes to the step S86.

Then, the CPU 201 awaits that the sheet corresponding to the inspection result obtained in the step S83 reaches the discharge opening of the image forming apparatus 10 (step S87). In the case where discrimination that the sheet leading end reaches the discharge opening of the image forming apparatus 10 is made (step S87: Yes), the CPU 201 outputs the discharge timing signal 401 through the communication I/F 204 (step S88).

Subsequently, the CPU 201 discriminates whether or not the sheet is the final sheet of the bundle (sheet bundle) (step S88). In the case where the sheet is discriminated being the final sheet of the sheet bundle (step S88: Yes), the CPU discriminates whether or not the bundle inspection flag is turned on (S89).

In the case where the bundle inspection flag is turned on (step S89: Yes), the CPU 201 sets the pulse width of the final sheet signal at T2 (step S90). On the other hand, in the case where the bundle inspection flag is turned off (step S89: No), the CPU 201 sets the pulse width of the final sheet signal at T1 (step S91).

Then, the CPU 201 clears the bundle inspection NG flag (step S92), and outputs each of the final sheet signals set in the steps S90 and S91. That is, the CPU 201 outputs the final sheet signal 402b with the pulse width T2 or the final sheet signal 402a with the pulse width T1 through the communication/F 204 (step S93). Incidentally, in the step S88, in the case where discrimination that the sheet is not the final sheet signal is made (step S88: No), the sequence goes to a step S94.

Next, the CPU 201 discriminates whether or not the sheet is the final sheet of the job (step S94). In the case where the sheet is discriminated as being the final sheet of the job (step S94: Yes), the CPU 201 awaits reception of the final sheet processing end signal 405 through the communication I/F 204 (step S95). In the case where the final sheet processing end signal 405 is received (step S95: Yes), the CPU 201 turns off the operation instruction signal 403 (step S96) and ends the flow. On the other hand, in the step S94, in the case where the sheet is discriminated as being not the final sheet of the job (step S94: No), the CPU 201 returns to the processing of the step S82.

[Sorting Processing of Products in Bundle Unit on the Basis of Final Sheet Signal]

FIGS. 19 and 20 are flowcharts for illustrating sorting processing of products in bundle unit in accordance with the final sheet signal by the sheet processing apparatus 1000.

First, as shown in FIG. 19, the CPU 601 of the sheet processing apparatus 1000 discriminates whether or not the operation instruction signal 403 is turned on through the communication I/F 604 (step S101). In the case where the operation instruction signal 403 is discriminated as being turned on (step S101: Yes), the CPU 601 performs initialization processing (step S102).

Subsequently, the CPU 601 awaits reception of the discharge timing signal 401 (step S103). In the case where the discharge timing signal 401 is received (step S103: Yes), the CPU 601 discriminates whether or not the final sheet signal 402 is received (step S104). In the case where discrimination that the final sheet signal is not received is made (step S104: No), the sequence goes to a step S110. In the case where discrimination that the final sheet signal 402 is received is made (step S104: Yes), the CPU 601 discriminates whether or not the period of (T1+T2)/2 has elapsed (step S105). In the case where the period of (T1+T2)/2 has elapsed (step S105: Yes), the CPU 601 conducts sampling ofa logical value of the final sheet signal 402 (step S106).

Next, the CPU 601 discriminates whether or not a result of the sampling is "High" (step S107). In the case where the result of the sampling is "High" (step S107: Yes), the CPU 601 sets a discharge destination of the bundle (sheet bundle) at the second discharge tray 1014 (step S108). On the other hand, the result of the sampling is not "Low" (step S107: No), the CPU 601 sets the discharge destination of the bundle (sheet bundle) at the first discharge tray 1012 (step S109).

Subsequently, the CPU 601 performs sheet accommodating processing (step S110). Then, the CPU 601 discriminates whether or not the sheet accommodating processing is ended (step S11). The CPU 60 discriminates that the sheet accommodating processing ends, on the basis of a lapse of a time from the tuming-on of the accommodating portion inlet sensor 1015 until the sheet passes through a distance from the detection position of the accommodating portion inlet sensor 1015 to the positioning member 1004.

In the case where discrimination that the sheet accommodating processing ends (step S11: Yes), the CPU 601 outputs the sheet reception response signal 404 to the image forming apparatus 10 (step S112). Subsequently, the CPU 601 discriminates whether or not the sheet is the final sheet of the bundle (sheet bundle) (step S113). In the case where discrimination that the sheet is not the final sheet of the bundle (sheet bundle) is made (step S113: No), the CPU 60I returns to the step S103.

In the case where discrimination that the sheet is the final sheet of the bundle (sheet bundle) is made (step S113: Yes), the CPU 601 performs the post-processing in bundle unit as shown in FIG. 20 (step S114). Next, the CPU 601 discriminates whether or not the discharge destination of the bundle is the first discharge tray 1012 (step S115).

In the case where discrimination that the bundle discharge destination is the first discharge tray 1012 is made (step S115: Yes), the CPU 601 provides an instruction to discharge loads such as a motor and a roller so that the bundle (sheet bundle) is discharged onto the first discharge tray 1012 (step S116). That is, the sheet bundle is subjected to first processing. Further, in the case where discrimination that the bundle discharge destination is not the first discharge tray 1012 is made (step S115: No), the CPU 601 provides an instruction to discharge loads such as a motor and a roller so that the bundle is discharged onto the second discharge tray 1014 (step S117). That is, the sheet bundle is subjected to second processing different from the first processing.

Next, the CPU 601 outputs the final sheet processing end signal 405 to the image forming apparatus 10 (step S118). Subsequently, the CPU 601 discriminates whether or not the discharge timing signal 401 is received (step S119). In the case where discrimination that the discharge timing signal 401 is received is made (step S119: Yes), the CPU 601 returns to the step S104. On the other hand, discrimination that the discharge timing signal 401 is not received is made (step S119: No), the CPU 601 discriminates whether or not the operation instruction signal 403 is turned off (step S120).

In the case where discrimination that the operation instruction signal 403 is turned on is made (step S120: No), the CPU 601 returns to the step S119. Further, in the case where discrimination that the operation instruction signal 403 is turned off is made, (step S120: Yes), the CPU 601 performs stop processing (step S121), and ends the flow. Here, the stop processing refers to a stop of drive of the inlet roller pair 1001 or the like processing.

Incidentally, in the step S114 of FIG. 20, the flow in which the post-processing is always performed without depending on the inspection result is employed, but the present invention is not limited thereto. For example, a constitution in which the step S108, the bundle for which the discharge destination is set at the second discharge tray 1014, i.e., the bundle including the inspection NG sheet is not subjected to the post-processing may also be employed. By such a constitution, it is possible to achieve an effect similar to the effect of the first embodiment.

Further, in this embodiment, the inspection OK sheet bundle is subjected to discharge processing to the first discharge tray 1012 and the inspection NG sheet bundle is subjected to discharge processing to the second discharge tray 1014, but the present invention is not limited thereto. That is, when the processing for the inspection OK sheet bundle and the processing for the inspection NG sheet bundle are different from each other, the processing performed may also be set arbitrarily.

Further, in this embodiment, the inspection result is superposed on the final sheet signal 402 by changing the pulse width of the final sheet signal 402 to the pulse width T1 or T2, but the present invention is not limited thereto. For example, as in the second embodiment, the inspection result may also be superposed on the final sheet signal 402 by changing the number of the pulses of the final sheet signal 402. Further, as in the third embodiment, the inspection result may also be superposed on the final sheet signal 402 by changing the voltage of the final sheet signal 402.

Fifth Embodiment

Next, although a fifth embodiment will be described, the fifth embodiment is constituted by superposing an inspection result on a discharge timing signal and a final sheet signal. For this reason, constituent elements similar to those in the fourth embodiment will be omitted from illustration or will be described by adding the same reference numerals or symbols in the drawings. Incidentally, in this embodiment, the case where the inspection result is superposed on the discharge timing signal 401 and the final sheet signal 402 by changing the pulse width of the pulse signal to T1 and T2 will be described as an example.

[Sorting Processing of Products in Bundle Unit on the Basis of Discharge Timing Signal and Final Sheet Signal]

FIGS. 20 and 21 are flowcharts for illustrating sorting processing of products in bundle unit in accordance with the discharge timing signal and the final sheet signal by the sheet processing apparatus 1000.

First, as shown in FIG. 21, the CPU 601 of the sheet processing apparatus 1000 discriminates whether or not the operation instruction signal 403 is turned on through the communication I/F 604 (step S131). In the case where the operation instruction signal 403 is discriminated as being turned on (step S131: Yes), the CPU 601 performs initialization processing (step S132).

Subsequently, the CPU 601 turns off the sheet inspection NG flag (step S133), and awaits reception of the discharge timing signal 401 (step S134). In the case where the discharge timing signal 401 is received (step S134: Yes), the CPU 601 discriminates whether or not the period of (T1+T2)/2 has elapsed (step S135). In the case where the period of (T1+T2)/2 has elapsed (step S135: Yes), the CPU 601 conducts sampling of a logical value of the discharge timing signal 401 (step S136).

Next, the CPU 601 discriminates whether or not a result of the sampling is "High" (step S137). In the case where the result of the sampling is "High", (step S136: Yes), the sheet inspection NG flag is turned on (step S138), and the sequence goes to a step S139. In the case where the result of the sampling is "Low" (step S137: No), the sequence goes to the step S139 without turning on the sheet inspection NG flag.

Next, the CPU 601 discriminates whether or not the final sheet signal 402 is received (step S139). In the case where discrimination that the final sheet signal 402 is not received is made (step S139: No), the sequence goes to a step S146. In the case where discrimination that the final sheet signal is received is made (step S139: Yes), the CPU 601 discriminates whether or not the period of (T1+T2)/2 has elapsed (step S140). In the case where the period of (T1+T2)/2 has elapsed (step S140: Yes), the CPU 601 conducts sampling of a logical value of the final sheet signal 402 (step S141).

Next, the CPU 601 discriminates whether or not a result of the sampling is "High" (step S142). In the case where the result of the sampling is "High" (step S142: Yes), the CPU 601 sets a discharge destination of the bundle (sheet bundle) at the second discharge tray 1014 (step S142), and the sequence goes to a step S146. On the other hand, in the case where the result of the sampling is "Low" (step S142: No), the CPU 601 discriminates whether or not the sheet inspection NG flag is turned off (step S144). In the case where the sheet inspection NG flag is turned off (step S144: Yes), the CPU 601 sets a discharge destination of the bundle (sheet bundle) at the first discharge tray 1012 (step S145), and the sequence goes to a step S146. In the case where the sheet inspection NG flag is turned on (step S144: No), the sequence goes to a step S143.

Subsequently, the CPU 601 performs sheet accommodating processing (step S146). Then, the CPU 601 discriminates whether or not the sheet accommodating processing is ended (step S147). In the case where discrimination that the sheet accommodating processing ends (step S147: Yes), the CPU 601 outputs the sheet reception response signal 404 to the image forming apparatus 10 (step S148). Subsequently, the CPU 601 discriminates whether or not the sheet is the final sheet of the bundle (sheet bundle) (step S149). In the case where discrimination that the sheet is not the final sheet of the bundle (sheet bundle) is made (step S149: No), the CPU 601 returns to the step S134.

In the case where discrimination that the sheet is the final sheet of the bundle (sheet bundle) is made (step S149: Yes), the CPU 601 performs the post-processing in bundle unit as shown in FIG. 22 (step S150). Next, the CPU 601 discriminates whether or not the discharge destination of the bundle is the first discharge tray 1012 (step S151).

In the case where discrimination that the bundle discharge destination is the first discharge tray 1012 is made (step S151: Yes), the CPU 601 provides an instruction to discharge loads such as a motor and a roller so that the bundle (sheet bundle) is discharged onto the first discharge tray 1012 (step S152). Further, in the case where discrimination that the bundle discharge destination is not the first discharge tray 1012 is made (step S151: No), the CPU 601 provides an instruction to discharge loads such as a motor and a roller so that the bundle is discharged onto the second discharge tray 1014 (step S153).

Next, the CPU 601 outputs the final sheet processing end signal 405 to the image forming apparatus 10 (step S154). Subsequently, the CPU 601 discriminates whether or not the discharge timing signal 401 is received (step S155). In the case where discrimination that the discharge timing signal 401 is received is made (step S155: Yes), the CPU 601 returns to the step S135. On the other hand, discrimination that the discharge timing signal 401 is not received is made (step S155: No), the CPU 601 discriminates whether or not the operation instruction signal 403 is turned off (step S156).

In the case where discrimination that the operation instruction signal 403 is turned on is made (step S156: No), the CPU 601 returns to the step S155. Further, in the case where discrimination that the operation instruction signal 403 is turned off is made, (step S156: Yes), the CPU 601 performs stop processing (step S157), and ends the flow. Here, the stop processing refers to a stop of drive of the inlet roller pair 1001 or the like processing.

Incidentally, in the step S146 of FIG. 22, the flow in which the post-processing is always performed without depending on the inspection result is employed, but the present invention is not limited thereto. For example, a constitution in which the step S143, the bundle for which the discharge destination is set at the second discharge tray 1014, i.e., the bundle including the inspection NG sheet is not subjected to the post-processing may also be employed.

By the above-described constitution, it is possible to achieve an effect similar to the effect of the first embodiment. Further, the inspection result is superposed on both the discharge timing signal 401 and the final sheet signal 402, so that the post-processing in the sheet processing apparatus 1000 depending on the inspection result can be performed with accuracy.

Sixth Embodiment

Next, although a sixth embodiment will be described, the sixth embodiment is constituted so that in addition to the constitution of the first embodiment, a result of post-processing is superposed on the sheet reception response signal 404 outputted by the sheet processing apparatus 1000. For this reason, constituent elements similar to those in the first embodiment will be omitted from illustration or will be described by adding the same reference numerals or symbols in the drawings. Incidentally, the image forming apparatus 10 in this embodiment is constituted so that an inspection result is superposed on the discharge timing signal 401 by setting the pulse width of the pulse signal at T1 and T2 similarly as in the first embodiment.

FIG. 23 is a table showing a correspondence relationship between contents of processing performed by the sheet processing apparatus 1000 and the sheet reception response signal 404. The sheet reception response signal 404 as a post-processing end signal includes two kinds of sheet reception response signals 404a and 404b described later. The sheet processing apparatus 1000 carries out either one of the following two processes for each of sheets fed from the image forming apparatus 10.

A first process is sheet accommodating processing in which the sheet is accommodated in the sheet accommodating portion 1003. In that case, the sheet processing apparatus 1000 outputs a sheet reception response signal 404a with a pulse width T11 as a first pulse width as shown in FIG. 23 at the time when the sheet accommodating processing is completed. That is, the sheet reception response signal 404a has a first waveform and is outputted when processing of the sheet for which discrimination that there is no image defect is made in the inspection processing is ended.

A second process is escape discharge processing in which the sheet is discharged onto the purge tray 1053. In that case, the sheet processing apparatus 1000 outputs a sheet reception response signal 404b with a pulse width T12 as a second pulse width at the time when the processing in which the sheet is discharged onto the purge tray 1053. That is, the sheet reception response signal 404b has a second waveform different from the first waveform and is outputted when the processing of the sheet for which discrimination that the image defect occurs is made in the inspection processing is ended.

Incidentally, a relationship between the pulse widths of the sheet reception response signals 404a and 404b is T1<T12, and a method of discriminating the sheet reception response signals 404a and 404b is similar to a method of discriminating the discharge timing signals 401a and 401b by the CPU 601. That is, at timing of a lapse of a period of (T1l+T12)/2 from rising edges of the sheet reception response signals 404a and 404b, logical values of these sheet reception response signals 404a and 404b are checked, so that these signals can be discriminated.

FIG. 24 is a timing chart showing a waveform of the discharge timing signal 401 outputted from the image forming apparatus 10 and a waveform of the sheet reception response signal 404 outputted from the sheet processing apparatus 1000. For example, as shown in FIG. 24, the signal outputted from the image forming apparatus 10 includes the discharge timing signal 401a corresponding to a first sheet, the discharge timing signal 401b corresponding to a second sheet, and the discharge timing signal 401a corresponding to a third sheet. This signal shows that inspection results of the first and third sheets are "OK" and that an inspection result of the second sheet is "NG".

Further, the signal outputted from the sheet processing apparatus 1000 includes the sheet reception response signal 404a corresponding to the first sheet, the sheet reception response signal 404b corresponding to the second sheet, and the sheet reception response signal 404a corresponding to the third sheet. This signal shows that the first and third sheets are subjected to the sheet accommodating processing and that the second sheet is escape-discharged onto the purge tray 1053. That is, the sheet for which the inspection result is "OK" is discharged as a product to the first discharge tray 1012 or the second discharge tray 1014, but the sheet for which the inspection result is "NG" cannot be used as the product, and therefore is discharged to the purge tray 1053.

[Processing of Notification of Post-Processing Result]

FIGS. 25 and 26 are flowcharts for illustrating processing for notifying the image forming apparatus 10 of a post-processing result in a sheet unit by the sheet processing apparatus 1000 according to this embodiment.

First, as shown in FIG. 25, the CPU 601 of the sheet processing apparatus 1000 discriminates whether or not the operation instruction signal 403 is turned on through the communication I/F 604 as a communication unit (step S161). In the case where the operation instruction signal 403 is turned on is made step S161: Yes), the CPU 601 performs initialization processing (step to S162). Then, the CPU 601 sets a "good (sheet) bundle flag" (step S163). The "good bundle flag" is a variable indicating whether or not the product is a good product as the (sheet) bundle and is used for sorting the products as the bundles. Entirety of the "good bundle flag" is stored in, for example, the RAM 602 of the post-processing controller 600. In the step S162, by setting the "good bundle flag", a bundle of the sheets received from now on by the sheet processing apparatus 1000 can be treated as a good bundle (product) in advance, and at a time when a defective sheet is received, a bundle including the defective sheet can be treated as a defective bundle (product).

Subsequently, the CPU 601 awaits detection of rise of the discharge timing signal 401 (step S164). In the case where the rise of the discharge timing signal 401 is detected (step S164: Yes), the CPU 601 awaits for a period of (T1+T2)/2 (step S165). Then, the CPU 601 conducts sampling of a logical value of the discharge timing signal 401 (step S166).

Next, the CPU 601 discriminates whether or not the sampled logical value of the discharge timing signal 401 is "Low" (step S167). In the case where the result of the sampling is "Low" (step S167: Yes), the CPU 601 sets the pulse width of the sheet reception response signal 404 at T11 (step S168). Then, the CPU 601 carries out the sheet accommodating processing for accommodating the sheet in the sheet accommodating portion 1003 (step S169), and discriminates whether or not the sheet accommodating processing is completed (step S170). In the case where the sheet accommodating processing is completed (step S170: Yes), the sequence goes to a step S175.

On the other hand, in the case where the result of the sampling is "High" (step S167: No), the CPU 601 sets the pulse width of the sheet reception response signal 404 at T12 (step S171). Then, the CPU 161 carries out the escape discharge processing for discharging the sheet to the purge tray 1053 (step S172), and discriminates whether or not the escape discharge processing is completed (step S173). In the case where the escape discharge processing is completed (step S173: Yes), the CPU 161 clears the "good bundle flag" (step S174), and the sequence goes to the step S175. Subsequently, the CPU 601 outputs the sheet reception response signal 404 to the image forming apparatus 10 (step S175). The pulse width of the sheet reception response signal 404 at this time is the pulse width set in the step S168 or S171. Subsequently, the CPU 601 discriminates whether or not the final sheet signal 402 is received (step S176). In the case where the final sheet signal 402 is not detected (step S176: No), the CPU 601 returns to the step S164. On the other hand, in the case where the final sheet signal 402 is received (step S176: Yes), the CPU 601 performs the post-processing in bundle unit as shown in FIG. 26 (step S177).

Next, the CPU 601 discriminates whether or not the "good bundle flag" is set (step S178). In the case where the "good bundle flag" is set (step S178: Yes), the CPU 601 provides an instruction to discharge loads such as a motor and a roller so that the product is discharged onto the first discharge tray 1012 (step S179). Further, in the case where the "good bundle flag" is not set (step S178: No), the CPU 601 provides an instruction to discharge loads such as a motor and a roller so that the product is discharged onto the second discharge tray 1014 (step S180). Incidentally, in the bundle (sheet bundle) discharged to the second discharge tray 1014, the sheet discharged to the purge tray 1053 in the step S172 is not included.

Next, the CPU 601 sets the "good bundle flag" (step S181), and outputs the final sheet processing end signal 405 to the image forming apparatus 10 (step S182). Subsequently, the CPU 601 discriminates whether or not rise of the discharge timing signal 401 is detected (step S183). In the case where discrimination that the rise of the discharge timing signal 401 is detected is made (step S183: Yes), the CPU 601 returns to the step S165. On the other hand, discrimination that the rise of the discharge timing signal 401 is not detected is made (step S183: No), the CPU 601 discriminates whether or not the operation instruction signal 403 is turned off (step S184).

In the case where discrimination that the operation instruction signal 403 is turned on is made (step S184: No), the CPU 601 returns to the step S183. Further, in the case where discrimination that the operation instruction signal 403 is turned off is made, (step S184: Yes), the CPU 601 performs stop processing (step S185), and ends the flow. Here, the stop processing refers to a stop of drive of the inlet roller pair 1001 or the like processing.

[Notification of Escape Discharge Processing]

Next, processing for notifying the operating portion 20 of that the sheet processing apparatus 1000 carried out the escape discharge processing will be described using FIG. 27. As shown in FIG. 27, the CPU 201 of the image forming apparatus 10 awaits detection of rising of the sheet reception response signal 404 (step S191).

In the case where the rising of the sheet reception response signal 404 is detected (step S191: Yes), the CPU 201 awaits the period of (T11+T12)/2 (step S192). Then, the CPU 201 conducts sampling of a logical value of the sheet reception response signal 404 (step S193).

Next, the CPU 201 discriminates whether or not the sampled logical value of the sheet reception response signal 404 is "Low" (step S194). In the case where the result of the sampling is "Low" (step S194: Yes), the CPU 201 discriminates that the kind of the post-processing carried out by the sheet processing apparatus 1000 is the sheet accommodating processing (step S195), and the sequence goes to a step S198. On the other hand, in the case where the result of the sampling is "High" (step S194: No), the CPU 201 discriminates that the kind of the post-processing carried out by the sheet processing apparatus 1000 is the escape discharge processing (step S196). Then, the CPU 201 causes the operating portion 20 as a notifying portion (unit) to display a message to the effect that the sheets are sorted and discharged in a manner in which the sheet is escape-discharged to the purge tray 1053 and the bundle (sheet bundle) is discharged to the second discharge tray 1014 (step S197).

Next, the CPU 201 discriminates whether or not the job is ended (step S198). The job is discriminated as being ended in the case where for example, the final sheet processing end signal 405 is received through the communication I/F 204. In the case where discrimination that the job is not ended is made (step S198: No), the sequence returns to the step S191, and in the case where discrimination that the job is ended is made (step S198: Yes), the flow is ended.

FIG. 28 is a schematic view showing an example of a screen displayed on the operating portion 20 in the step S197. As shown in FIG. 28, in the case where the escape discharge processing is carried out, the sheets are discharged to the purge tray 1053 and the second discharge tray 1014, and therefore, presence of the sheets on these trays is transmitted to a user by display of the operating portion 20. Then, upon reception of this display, the user discriminates whether or not the discharged sheet is capable of being used again or is required to be subjected to printing again.

As described above, on the basis of the inspection result, the image forming apparatus 10 is notified of the processing carried out by the sheet processing apparatus 1000, so that it is possible to notify the user of a proper message (information) without adding a new signal line. For this reason, it is possible to obtain the sheet processing apparatus 1000 and the image forming system which are improved in degree of freedom of a condition of apparatuses in an in-line constitution and in usability while suppressing the number of signals of the parallel L/F.

Incidentally, in this embodiment, notification to the user is made by displaying, on the operating portion 20, the message to the effect that the sheet escape-discharged to the purge tray 1053 and the bundle discharged to the second discharge tray 1014 exist, but the present invention is not limited thereto. That is, the notification is not limited to the screen display on the operating portion 20, but may also be notification to the user by notifying sound or lamp lighting, or the like.

Further, in this embodiment, the pulse width of the sheet reception response signal 404 is changed to T11 and T12, and the post-processing result is superposed on the sheet reception response signal 404, but the present invention is not limited thereto. For example, as in the second embodiment, the post-processing result may also be superposed on the sheet reception response signal 404 through a change in pulse number of the sheet reception response signal 404. Further, as in the third embodiment, the inspection result may also be superposed on the sheet reception response signal 404 through a charge in voltage of the sheet reception response signal 404.

Seventh Embodiment

Next, although a seventh embodiment will be described, the seventh embodiment is different from the sixth embodiment in interpretation of the sheet reception response signal 404 by the image forming apparatus 10 and in action on the sheet reception response signal 404. For this reason, constituent elements similar to those in the sixth embodiment will be omitted from illustration or will be described by adding the same reference numerals or symbols in the drawings. Incidentally, the image forming apparatus 10 in this embodiment is constituted so that an inspection result is superposed on the discharge timing signal 401 by setting the pulse width of the pulse signal at T1 and T2 similarly as in the sixth embodiment. Further, the sheet processing apparatus 1000 is constituted so that an inspection result is superposed on the sheet reception response signal 404 by setting the pulse width of the pulse signal at T11 and T12.

In an image forming system in which the image forming apparatus 10 cannot provide an instruction of the kind of the post-processing to the sheet processing apparatus 1000, the following constitution is expected. That is, in the case where the post-processing of the sheet processing apparatus 1000 changes depending on an image inspection result transmitted by the image forming apparatus 10, it is expected that the inspection result and the post-processing result are associated with each other.

Thereafter, in this embodiment, the image forming apparatus 10 holds the kind of the post-processing, in the ROM 205 in advance, which depends on the inspection result and which is expected for the sheet processing apparatus 1000. Then, post-processing kind information superposed on the sheet reception response signal 404 from the sheet processing apparatus 1000 is checked against an expected result in the ROM 205, so that whether or not expected post-processing is performed can be checked. In the following, contents thereof will be specifically described.

FIG. 29 is a table showing a combination of the inspection result and expected sorting processing (kind of post-processing) stored in the ROM 205. A pattern 1 shows the case where the inspection result is "OK" and defines that an expected operation as the post-processing of the sheet processing apparatus 1000 is the sheet accommodating processing. A pattern 2 shows the case where the inspection result is "NG" and defines that the expected operation as the post-processing of the sheet processing apparatus 1000 is the escape discharge processing.

[Output Processing of Discharge Timing Signal on the Basis of Inspection Result]

FIGS. 30 and 31 are flowcharts showing an operation relating to transmission and reception of signals of the image forming apparatus 10 in the case where the inspection processing is performed. First, as shown in FIG. 30, the CPU 201 of the printer controller 200 turns on the operation instruction signal 403 through the communication I/F 204 (step S201). Then, the CPU 201 discriminates whether or not a trailing end of the sheet passes through the sheet reading sensor 121 (step S202). In the case where discrimination that the sheet trailing end passes through the sheet reading sensor 121 is made (step S202: Yes), the CPU 201 obtains the inspection result from the inspection processing portion 210 (step S203). Thereafter, the CPU 201 stores the obtained inspection result at the tail end of an inspection result queue which is stored in the RAM 202 and in which inspection results are sequentially held (step S204).

Next, the CPU 201 discriminates whether or not the obtained inspection result is "OK" (step S205). In the case where the inspection result is "OK" (step S205: Yes), the CPU 201 sets the pulse width of the discharge timing signal at T1 (step S206). In the case where the inspection result is "NG" (step S205: No), the CPU 201 sets the pulse width of the discharge timing signal at T2 (step S207).

Then, the CPU 201 awaits, as shown in FIG. 31, that the sheet corresponding to the inspection result obtained in the step S203 reaches the discharge opening of the image forming apparatus 10 (step S208). In the case where discrimination that the sheet leading end reaches the discharge opening of the image forming apparatus 10 is made (step S208: Yes), the CPU 201 outputs the discharge timing signal 401 through the communication I/F 204 (step S209). At this time, the pulse width of the discharge timing signal 401 becomes a width set in the step S206 or S207. That is, in the step S209, when the inspection result of the sheet is "OK", the discharge timing signal 401*a* (part (b) of FIG. 8) is outputted, and when the inspection result of the sheet is "NG", the discharge timing signal 401*b* (part (c) of FIG. 8) is outputted.

Subsequently, the CPU 201 discriminates whether or not the sheet is the final sheet of the sheet bundle (step S210). In the case where the sheet is discriminated being the final sheet of the sheet bundle (step S210: Yes), the CPU 201 outputs the final sheet signal 402 toner the communication I/F (step S211). On the other hand, in the case where the sheet is discriminated as being not the final sheet of the sheet bundle (step S210: No), the CPU 201 does not provide an instruction to output the final sheet signal 402 through the communication I/F 204.

Next, the CPU 201 discriminates whether or not the sheet is the final sheet of the job (step S212). In the case where the sheet is discriminated as being the final sheet of the job (step S212: Yes), the CPU 201 awaits reception of the final sheet processing end signal 405 through the communication I/F 204 (step S213). In the case where the final sheet processing end signal 405 is received (step S213: Yes), the CPU 201 turns off the operation instruction signal 403 (step S214) and ends the flow. On the other hand, in the step S212, in the case where the sheet is discriminated as being not the final sheet of the job (step S212: No), the CPU 201 returns to the processing of the step S202.

[Comparison Between Inspection Result and Expected Sorting Processing]

Next, processing for comparing the inspection result and expected sorting processing by the image forming apparatus 10 will be described using FIGS. 32 and 33. As shown in FIG. 32, the CPU 201 of the image forming apparatus 10 awaits detection of rising of the sheet reception response signal 404 (step S221).

In the case where the rising of the sheet reception response signal 404 is detected (step S221: Yes), the CPU 201 awaits the period of (T11+T12)/2 (step S222). Then, the CPU 201 conducts sampling of a logical value of the sheet reception response signal 404 (step S223).

Next, the CPU 201 discriminates whether or not the sampled logical value of the sheet reception response signal 404 is "Low" (step S224). In the case where the result of the sampling is "Low" (step S224: Yes), the CPU 201 discriminates that the kind of the post-processing carried out by the sheet processing apparatus 1000 is the sheet accommodating processing (step S225), and the sequence goes to a step S227. On the other hand, in the case where the result of the sampling is "High" (step S224: No), the CPU 201 discriminates that the kind of the post-processing carried out by the sheet processing apparatus 1000 is the escape discharge processing (step S226).

Next, the CPU 201 obtains a top inspection result from the contents of the inspection result queue existing in the RAM 202 (step S227). Then, the CPU 201 checks the inspection result obtained in the step S227 or the post-processing kind discriminated in the step S225 or in the step S226 against the table described with reference to FIG. 29.

Specifically, as shown in FIG. 33, the CPU 201 discriminates whether or not the inspection result obtained in the step S227 is "OK" (step S228). In the case wiere the inspection result is "OK" (step S228: Yes), the CPU 201 discriminated whether or not the post-processing kind discriminated in the step S225 or in the step S226 is the sheet accommodating processing (step S229). In the case where the post-processing kind is the sheet accommodating processing (step S229: Yes), this case coincides with the pattern 1 of FIG. 29, and therefore, it is understood that the post-processing is performed with no problem in the sheet processing apparatus 1000, and then the sequence goes to a step S233.

In the case where the post-processing kind is not the sheet accommodating processing (step S229: No), this case does not coincide with either one of the patterns 1 and 2 shown in FIG. 29, and therefore, it is understood that the expected post-processing is not performed in the sheet processing apparatus 1000. Then, the CPU 201 causes the operating portion 20 to display a check message described later (step S230), and the sequence goes to the step S233.

In the case where the inspection result is "NG" in the step S228 (step S228: No), the CPU 201 discriminates whether or not the post-processing kind discriminated in the step S225 or in the step S226 is the sheet accommodating processing (step S231). In the case where the post-processing kind is the sheet accommodating processing (step S231: Yes), this case does not correspond to either one of the patterns 1 and 2 shown in FIG. 29, and therefore, it is understood that the expected post-processing is not performed in the sheet processing apparatus 1000. Then, the CPU 201 causes the operating portion 20 to display the check message described later (step S232), and the sequence goes to the step S233.

In the case where the post-processing kind is not the sheet accommodating processing (step S231: No), this case corresponds to the pattern 2, and therefore, it is understood that the post-processing is performed with no problem in the sheet processing apparatus 1000, and then the sequence goes to the step S233.

Then, the CPU 201 deletes the top inspection result from the inspection result queue stored in the RAM 202 (S233). Further, the CPU 201 discriminates whether or not the job is ended (step S234). The job is discriminated as being ended in the case where for example, the final sheet processing end signal 405 is received through the communication I/F 204. In the case where discrimination that the job is not ended is made (step S234: No), the sequence returns to the step S221, and in the case where discrimination that the job is ended is made (step S234: Yes), the flow is ended.

FIG. 34 is a schematic view showing the check message displayed on the operating portion 20 in the steps S230 and S232. The check message is displayed on the operating portion 20 in the case where the post-processing expected for the inspection result of the inspection processing is not performed by the sheet processing apparatus 1000. Further, the check message includes the contents prompting the user to check for the setting of the sheet processing apparatus 1000.

Incidentally, in this embodiment, the combination of the inspection result and the expected sorting processing (post-processing kind) was stored in advance in the ROM 205, but the present invention is not limited thereto. For example, in the case where there is a need to change this combination by the user or depending on the kind of the sheet processing apparatus 1000, for example, a constitution in which this combination is capable of being changed from the operating portion 20 may also be employed.

As described above, by comparing the post-processing result superposed on the sheet reception response signal 404 with the inspection result, the image forming apparatus 10 is capable of grasping whether or not proper post-processing is performed in the sheet processing apparatus 1000. Specifically, in the case where the sheet reception response signal 404b is outputted correspondingly to the sheet discriminated as being that there is no image defect thereon or in the case where the sheet reception response signal 404a is outputted correspondingly to the sheet discriminated as being that the image defect occurs, the check message is displayed. By this, it is possible to notify the user of a proper message (information) without adding a new signal line. For this reason, it is possible to obtain the sheet processing apparatus 1000 and the image forming system which are improved in degree of freedom of a condition of apparatuses in an in-line constitution and in usability while suppressing the number of signals of the parallel I/F.

Incidentally, in this embodiment, notification to the user is made by displaying the check message shown in FIG. 34 on the operating portion 20, but the present invention is not limited thereto. That is, the notification is not limited to the screen display on the operating portion 20, but may also be notification to the user by notifying sound or lamp lighting, or the like.

Other Embodiments

Incidentally, in either one of the embodiments described above, the constitution in which the sheet and the bundle (sheet bundle) for which the inspection result is "OK" are discharged to the first discharge tray 1012 was employed. Further, the constitution in which the sheet and the sheet bundle for which the inspection result is "NG" are discharged to the second discharge tray 1014 or the purge tray 1053 was employed. However, the present invention is not limited to these constitutions. For example, a constitution in which the sheet and the sheet bundle for which the inspection result is "OK" are discharged to the second discharge tray 1014 or the purge tray 1053 may also be employed.

Further, in either one of the above-described embodiments, the three trays consisting of the first discharge tray 1012, the second discharge tray 1014 and the purge tray 1053 were provided, but the present invention is not limited thereto. For example, the number of the trays may also be two or four or more.

Further, in the above-described embodiments, the inspection mechanism including the sheet reading sensor 121 was provided in the image forming apparatus 10, but the present invention is not limited thereto. For example, another apparatus including the inspection mechanism may also be interposed between the image forming apparatus 10 and the sheet processing apparatus 1000. Further, the inspection mechanism may also be provided in the sheet processing apparatus 1000. Further, discrimination as to a good item or a defective item may also be performed outside the image forming system 1.

Further, in either one of the above-described embodiments, description was made by using the image forming apparatus 10 of the electrophotographic type, but the present invention is not limited thereto. For example, an image forming apparatus of an ink jet type in which an image is formed on a sheet by ejecting an ink liquid from nozzles may also be used.

Further, the above-described first to seventh embodiments may also be combined with each other in any manner.

The above-described embodiments of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-088244 filed on May 20, 2020, which is hereby incorporated by reference herein in its entirety.

What is claimed is:

1. An image reading apparatus connectable to a post-processing apparatus, comprising:
    an image reading unit configured to read an image on a sheet conveyed from an image forming unit and configured to transmit image data corresponding to the read image to an inspection processing unit so as to inspect the image formed on the sheet by said image forming unit; and
    a communication unit configured to output a discharge timing signal, indicating timing when the sheet is discharged to the post-processing apparatus, to the post-processing apparatus through a signal line,
    wherein said communication unit is configured to output the discharge timing signal including a first waveform in a case that the sheet determined to be normal by said inspection processing unit is discharged and is configured to output the discharge timing signal including a second waveform different from the first waveform in a case that the sheet determined to be abnormal by said inspection processing unit is discharged.

2. An image reading apparatus according to claim 1, wherein the discharge timing signal including the first waveform has a first pulse width, and the discharge timing signal including the second waveform has a second pulse width different from the first pulse width.

3. An image reading apparatus according to claim 1, wherein the discharge timing signal including the first waveform has a first pulse number, and the discharge timing signal including the second waveform has a second pulse number different from the first pulse number.

4. An image reading apparatus according to claim 1, wherein the discharge timing signal including the first waveform includes a first voltage, and the discharge timing signal including the second waveform includes a second voltage different form the first voltage.

5. An image reading apparatus according to claim 1, wherein said communication unit is constituted so as to output a final sheet signal, indicating a final sheet constituting a sheet bundle subjected to post-processing by the post-processing apparatus, to the post-processing apparatus through a final sheet signal line, and
    wherein said communication unit outputs the final sheet signal including a third waveform through the final sheet signal line when all sheets constituting the sheet bundle are determined to be normal by said inspection processing unit and outputs the final sheet signal including a fourth waveform different from the third waveform through the final sheet signal line when either one of the sheets constituting the sheet bundle is determined to be abnormal by said inspection processing unit.

6. An image forming system comprising:
    an image reading apparatus according to claim 1; and
    the post-processing apparatus.

7. An image forming system according to claim 6, wherein the post-processing apparatus performs first processing when the post-processing apparatus receives the discharge timing signal including the first waveform and performs second processing different from the first processing when the post-processing apparatus receives the discharge timing signal including the second waveform.

8. An image forming system according to claim 7, wherein the post-processing apparatus includes a first discharge tray and a second discharge tray,
   wherein the first processing is processing in which the sheet is discharged onto the first discharge tray, and
   wherein the second processing is processing in which the sheet is discharged onto the second discharge tray.

9. An image forming system according to claim 6, further comprising:
   a post-processing unit of said post-processing apparatus, said post-processing unit being configured to subject the sheet, discharged from said image reading apparatus, to the post-processing on the basis of the discharge timing signal outputted from said image reading apparatus; and
   another communication unit of said post-processing apparatus, said another communication unit being configured to output a post-processing end signal, indicating that said post-processing unit ends the post-processing of the sheet, to said image reading apparatus through a signal line,
   wherein said another communication unit outputs the post-processing end signal including a fifth waveform to the signal line when the post-processing of the sheet determined to be normal by said inspection processing unit is ended, and outputs the post-processing end signal including a sixth waveform different from the fifth waveform to the signal line when the post-processing of the sheet determined to be abnormal by said inspection processing unit is ended.

10. An image forming system according to claim 9, wherein the post-processing end signal including the fifth waveform has a third pulse width, and the discharge timing signal including the sixth waveform has a fourth pulse width different from the third pulse width.

11. An image forming system according to claim 9, wherein the post-processing end signal including the fifth waveform has a third pulse number, and the discharge timing signal including the sixth waveform has a fourth pulse number different from the third pulse number.

12. An image forming system according to claim 9, wherein the post-processing end signal including the fifth waveform includes a third voltage, and the discharge timing signal including the sixth waveform includes a fourth voltage different form the third voltage.

13. An image forming system according to claim 9, further comprising a display unit configured to display a check message when the post-processing end signal including the sixth waveform is outputted to the signal line.

14. An image forming system according to claim 9, further comprising a display unit configured to display a check message when the post-processing end signal including the sixth waveform is outputted to the signal line correspondingly to the sheet discharge determined to be normal by said inspection processing unit or when the post-processing end signal including the fifth waveform is outputted to the signal line correspondingly to the sheet determined to be abnormal by said inspection processing unit.

15. An image forming system connectable to a post-processing apparatus, comprising:
   an image forming unit configured to form an image on a sheet;
   an inspection processing unit configured to inspect the image formed on the sheet by said image forming unit;
   an image reading unit configured to read the image on the sheet conveyed from said image forming unit and configured to transmit image data corresponding to the read image to said inspection processing unit; and
   a communication unit configured to output a discharge timing signal, indicating timing when the sheet is discharged to the post-processing apparatus, to the post-processing apparatus through a signal line,
   wherein said communication unit is configured to output the discharge timing signal including a first waveform in a case that the sheet determined to be normal by said inspection processing unit is discharged and is configured to output the discharge timing signal including a second waveform different from the first waveform in a case that the sheet determined to be abnormal by said inspection processing unit is discharged.

* * * * *